(12) United States Patent
Shinkai et al.

(10) Patent No.: US 7,952,638 B2
(45) Date of Patent: May 31, 2011

(54) INFORMATION PROCESSING APPARATUS, INFORMATION PROCESSING METHOD, AND COMPUTER READABLE STORAGE MEDIUM FOR ACQUIRING STATE INFORMATION FROM A PHOTOGRAPHING APPARATUS

(75) Inventors: Mitsutoshi Shinkai, Kanagawa (JP); Fumihiro Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 901 days.

(21) Appl. No.: 11/558,218

(22) Filed: Nov. 9, 2006

(65) Prior Publication Data

US 2007/0122142 A1    May 31, 2007

(30) Foreign Application Priority Data

Nov. 29, 2005    (JP) .................................. 2005-343189

(51) Int. Cl.
*H04N 5/222*    (2006.01)
*H04N 5/232*    (2006.01)

(52) U.S. Cl. .............................. 348/333.01; 348/211.99

(58) Field of Classification Search ............... 348/207.1, 348/211.99, 211.1, 211.4, 211.8, 333.01, 348/333.02, 333.11
See application file for complete search history.

(56) References Cited

U.S. PATENT DOCUMENTS

| | | | | |
|---|---|---|---|---|
| 6,515,704 | B1 * | 2/2003 | Sato | 348/333.11 |
| 6,583,813 | B1 * | 6/2003 | Enright et al. | 348/150 |
| 7,289,143 | B2 * | 10/2007 | Takagi et al. | 348/222.1 |
| 2006/0284981 | A1 * | 12/2006 | Erol et al. | 348/207.1 |

FOREIGN PATENT DOCUMENTS

| | | |
|---|---|---|
| JP | 7-203265 | 8/1995 |
| JP | 2000-83209 | 3/2000 |
| JP | 2002-118811 | 4/2002 |
| JP | 2004-171719 | 6/2004 |

OTHER PUBLICATIONS

U.S. Appl. No. 11/559,088, filed Nov. 13, 2006, Shinkai, et al.
U.S. Appl. No. 11/561,219, filed Nov. 17, 2006, Shinkai, et al.

* cited by examiner

*Primary Examiner* — Nicholas G Giles
(74) *Attorney, Agent, or Firm* — Oblon, Spivak, McClelland, Maier & Neustadt, L.L.P.

(57) ABSTRACT

An information processing apparatus that acquires, from a photographing apparatus that photographs a subject and records image data obtained as a result of the photographing, state information indicating a present state of the photographing apparatus includes: a state acquiring unit that acquires the state information from the photographing apparatus on a real time basis; a data acquiring unit that acquires image data recorded in the photographing apparatus; a recording control unit that causes an accumulating unit that accumulates the image data acquired by the data acquiring unit to record the image data; and a presenting unit that presents the state information acquired by the state acquiring unit on a real time basis.

9 Claims, 42 Drawing Sheets

FIG. 6

1. GROUP TITLE
2. RECORDING ID
3. CLASSIFICATION
4. ORIGINAL
5. GROUP CREATION DATE AND TIME
6. TRANSMISSION DESTINATION
    (1) NAME
    (2) EMAIL ADDRESS
    (3) WEBSITE URL
7. PHOTOGRAPHING DATE AND TIME
    (1) PLANNED
    (2) EXECUTED
8. PHOTOGRAPHING PLACE
    (1) PLANNED
    (2) EXECUTED
9. PHOTOGRAPHER
    (1) PLANNED
    (2) EXECUTED
10. PHOTOGRAPHING CONTENTS
    (1) INSTRUCTED
    (2) ACTUAL (MEMO)
11. PHOTOGRAPHED MATERIAL (FILE)
    (1) TITLE
    (2) UMID
    (3) MEMO
    (4) TRANSMISSION HISTORY

FIG. 7 title, MT. FUJI VIEWED FROM LAKE YAMANAKA, category, RECORDING, original, Yes, date created, 2005/5/16, date directed, 2005/5/31, date carried out, 2005/5/31, place directed, LAKE YAMANAKA PLAIN, place carried out, LAKE YAMANAKA PLAIN, person directed, KAMEI, TAKEMURA, person carried out, KAMEI, TAKEMURA, description directed, xxxx, description occurred, xxxx, file title, xxxx, file ID, xxxx, memo, xxxx, file title, xxxx, file ID, xxxx, memo, xxxx, file title, xxxx, file ID, xxxx, memo, xxxx

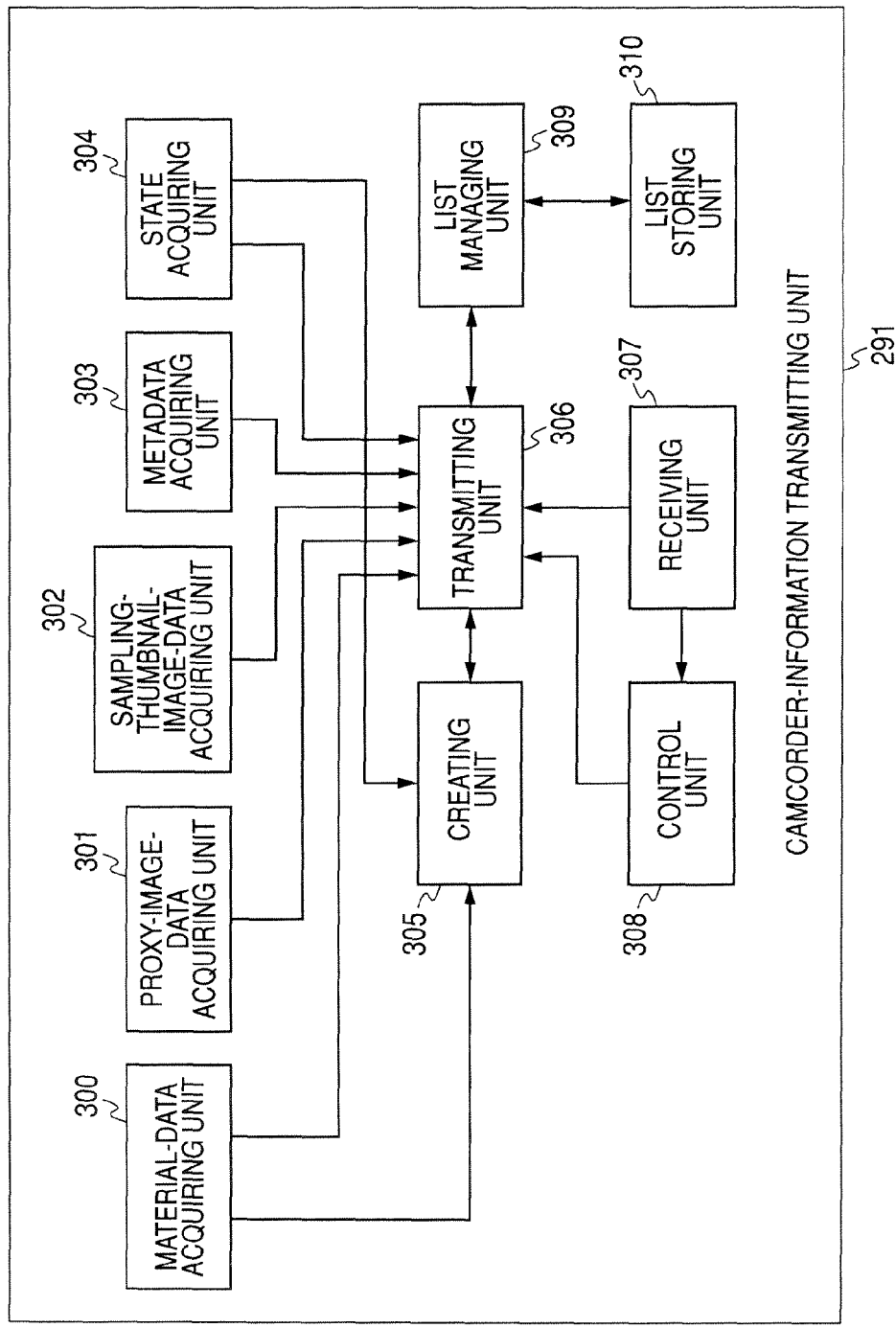

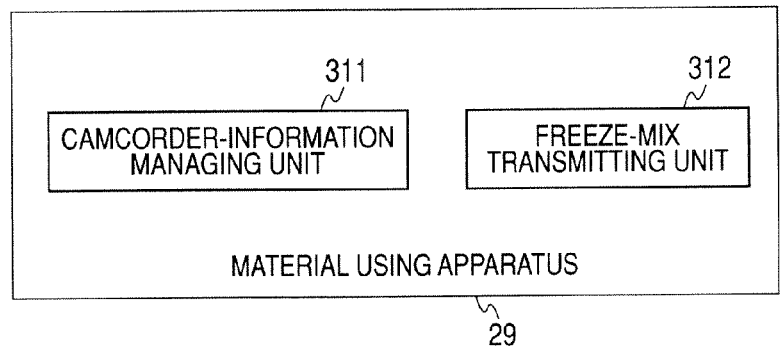
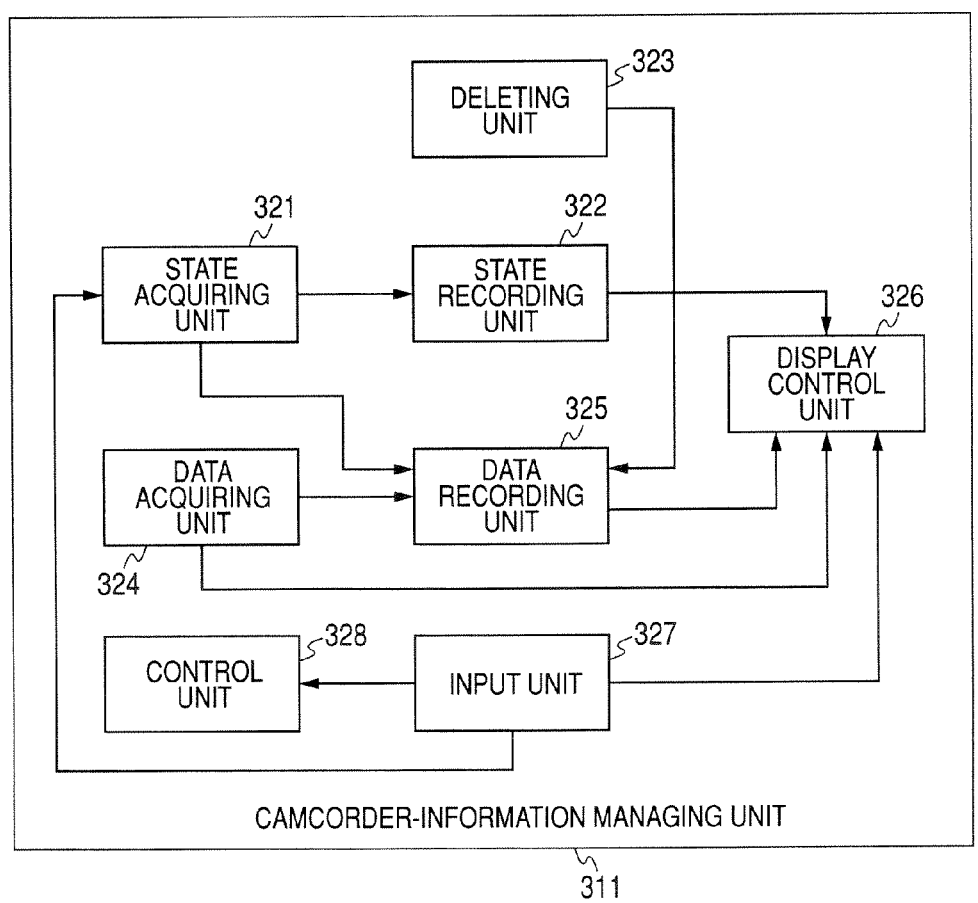

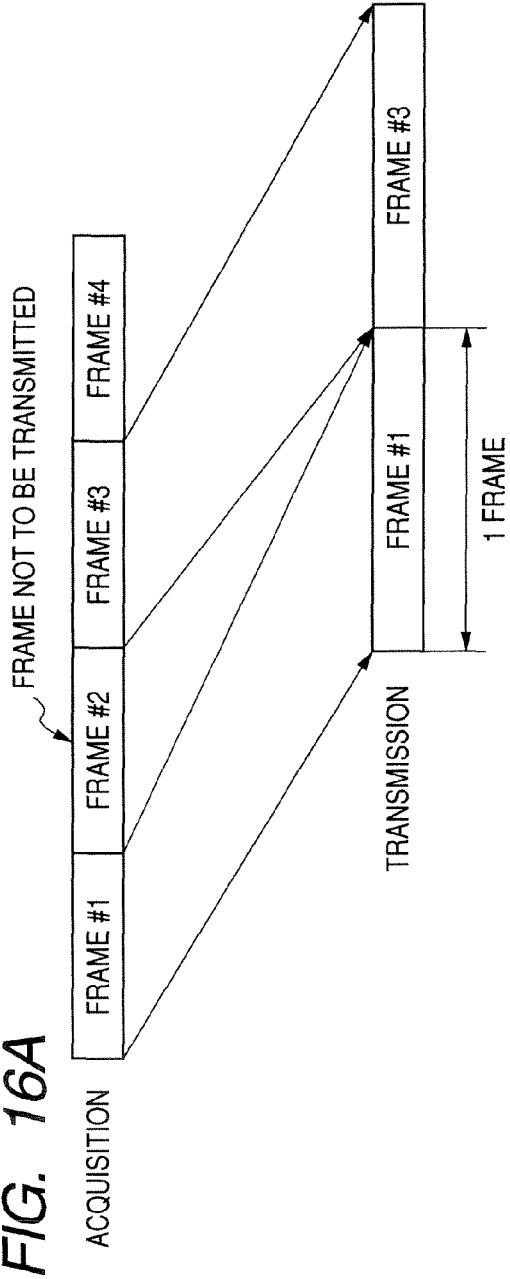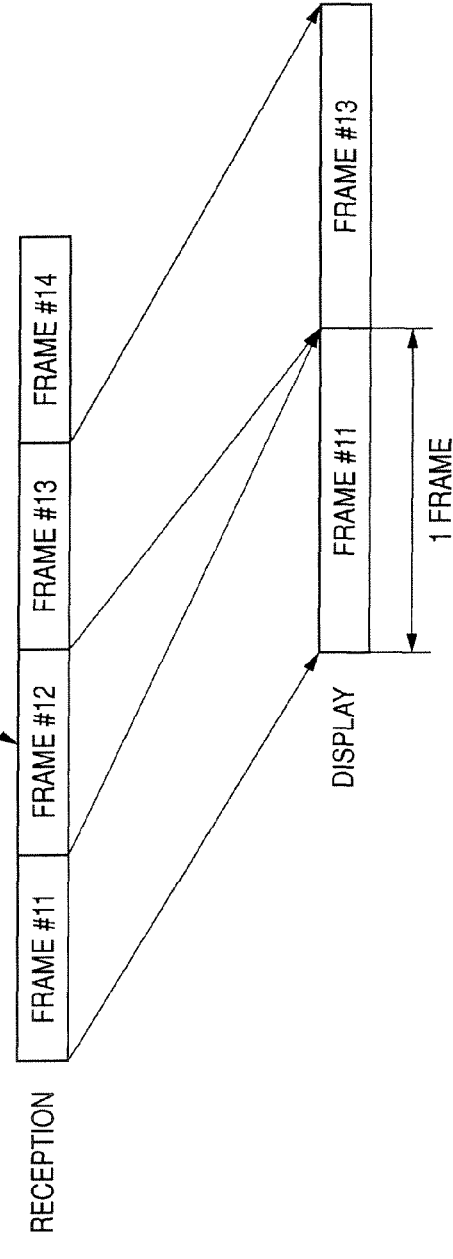

FIG. 25

TRANSMISSION MODE SETTING

DATE:
- ● THE DAY PREFERENCE
- PHOTOGRAPHING DATE ORDER

PHOTOGRAPHING ORDER:
- ● REGULAR ORDER
- REVERSE ORDER

PHOTOGRAPHING EQUIPMENT:
- THIS CAMCORDER IS GIVEN PRIORITY
- ● NO CONDITION

PRIORITY CONDITION:
- ● AUTOMATIC
- MANUAL

TREATMENT OF FILE BEING TRANSMITTED AT START OF RECORDING:
- ● ADD LATER
- TRANSMIT AS SEPARATE FILE LATER
- DISCARD FILE BEING TRANSMITTED
- COMPLETE TRANSMISSION

SELECT ITEM △ ~420a
△ ~421a CHANGE OPTION
▽ ~420b
▽ ~421b

DETERMINE ☐ ~422

FIG. 26

| UMID | PHOTOGRAPHING TIME | APPARATUS ID |
|---|---|---|
| UMID#1 | 9:50:15 | CID#2 |
| UMID#3 | 10:10:24 | CID#2 |
| UMID#4 | 10:25:30 | CID#1 |
| UMID#2 | 11:25:05 | CID#1 |

FIG. 27

| PRIORITY | UMID | PHOTOGRAPHING TIME | APPARATUS ID |
|---|---|---|---|
| 1 | UMID#1 | 9:50:15 | CID#2 |
| 2 | UMID#3 | 10:10:24 | CID#2 |
| 3 | UMID#4 | 10:25:30 | CID#1 |
| 4 | UMID#2 | 11:25:05 | CID#1 |

| PRIORITY | UMID | PHOTOGRAPHING TIME | APPARATUS ID |
|---|---|---|---|
| 1 | UMID#4 | 10:25:30 | CID#1 |
| 2 | UMID#2 | 11:25:05 | CID#1 |
| 3 | UMID#1 | 9:50:15 | CID#2 |
| 4 | UMID#3 | 10:10:24 | CID#2 |

| PRIORITY | UMID | PHOTOGRAPHING TIME | APPARATUS ID | MANUAL INPUT |
|---|---|---|---|---|
| 1 | UMID#2 | 11:25:05 | CID#1 | 1 |
| 2 | UMID#1 | 9:50:15 | CID#2 | 2 |
| 3 | UMID#4 | 10:25:30 | CID#1 | 3 |
| 4 | UMID#3 | 10:10:24 | CID#2 | 4 |

FIG. 40 title, MT. FUJI, category, FreezeMix, original, No, date created, 2004/8/16, date directed, 2004/8/31, date carried out, 2004/8/31, place directed, LAKE YAMANAKA PLAIN, place carried out, LAKE YAMANAKA PLAIN, person directed, KOIZUMI, OKADA, person carried out, KOIZUMI, OKADA, description directed, xxxx, description occurred, xxxx, file title, MT. FUJI VIEWED FROM LAKE YAMANAKA, file ID, xxxx, memo, xxxx, file title, MT. FUJI VIEWED FROM LAKE KAWAGUCHI, file ID, xxxx, memo, xxxx ...

FIG. 41

GROUP NAME: MT. FUJI

CLIP LIST:

● 1. MT. FUJI VIEWED FROM LAKE YAMANAKA
2. MT. FUJI VIEWED FROM LAKE KAWAGUCHI
3. MT. FUJI VIEWED FROM LAKE SAI
4. MT. FUJI VIEWED FROM LAKE SHOJI
5. MT. FUJI VIEWED FROM LAKE MOTOSU
6. MT. FUJI VIEWED FROM OHSE-SAKI

541

REPRODUCE CLIP

INFORMATION PROCESSING APPARATUS, INFORMATION PROCESSING METHOD, AND COMPUTER READABLE STORAGE MEDIUM FOR ACQUIRING STATE INFORMATION FROM A PHOTOGRAPHING APPARATUS

CROSS-REFERENCES TO RELATED APPLICATIONS

This application contains subject matter related to Japanese Patent Application JP 2005-343189 filed in the Japanese Patent Office on Nov. 29, 2005, the entire contents of which being incorporated herein by reference.

BACKGROUND OF THE INVENTION

1. Field of the Invention

The present invention relates to an information processing apparatus, an information processing method, and a computer program, and, more particularly to an information processing apparatus, an information processing method, and a computer program adapted to be capable of acquiring and recording data obtained as a result of being photographed by other apparatuses and presenting states of other apparatuses on a real time basis.

2. Description of the Related Art

In recent years, there is a recording apparatus that acquires, from a camcorder (registered trademark) that acquires and records material data such as image data and sound data obtained by photographing and recording, the material data via a network and the like and records the material data.

For example, there is a disk recorder that acquires, from a videotape recorder integrated with a camera that acquires image data and records the image data on a videotape, the image data and dubs the image data on an optical disk (see, for example, JP-A-2004-171719).

SUMMARY OF THE INVENTION

However, in the recording apparatus, presentation of a state of the camcorder is not considered. Therefore, it is difficult for a user of the recording apparatus to, for example, learn an acquisition state of the material data in the camcorder. Thus, it is difficult for the user to grasp contents of the material data acquired by the camcorder until the material data is transmitted from the camcorder. Consequently, for example, it is difficult for the user of the recording apparatus to quickly transmit an instruction concerning acquisition of the material data to the camcorder. Material data not conforming to an intension of the user may be acquired by the camcorder.

It is desirable to make it possible to acquire and record data obtained as a result of being photographed by other apparatuses and present states of other apparatuses on a real time basis.

According to an embodiment of the invention, there is provided an information processing apparatus that acquires, from a photographing apparatus that photographs a subject and records image data obtained as a result of the photographing, state information indicating a present state of the photographing apparatus. The information processing apparatus includes: a state acquiring unit configured to acquire the state information from the photographing apparatus on a real time basis; a data acquiring unit configured to acquire image data recorded in the photographing apparatus; a recording control unit configured to cause an accumulating unit configured to accumulate the image data acquired by the data acquiring unit to record the image data; and a presenting unit configured to present the state information acquired by the state acquiring unit on a real time basis.

The recording control unit can further cause a recording unit configured to temporarily store the image data to record image data identical with the image data recorded by the accumulating unit.

The information processing apparatus can further include a deleting unit configured to delete image data, which is deleted from the photographing apparatus, from the recording unit.

The state information can be information indicating a present operation state of the photographing apparatus.

According to another embodiment of the invention, there is provided an information processing method for an information processing apparatus that acquires, from a photographing apparatus that photographs a subject and records image data obtained as a result of the photographing, state information indicating a present state of the photographing apparatus. The information processing method includes the steps of: acquiring the state information from the photographing apparatus on a real time basis; acquiring image data recorded in the photographing apparatus; causing an accumulating unit configured to accumulate the image data acquired to record the image data; and presenting the state information acquired on a real time basis.

According to still another embodiment of the invention, there is provided a computer program that causes a computer to execute processing for acquiring, from a photographing apparatus that photographs a subject and records image data obtained as a result of the photographing, state information indicating a present state of the photographing apparatus. The computer program causes the computer to execute processing including the steps of: acquiring the state information from the photographing apparatus on a real time basis; acquiring image data recorded in the photographing apparatus; causing an accumulating unit configured to accumulate the image data acquired to record the image data; and presenting the state information acquired on a real time basis.

According to still another embodiment of the invention, from a photographing apparatus that photographs a subject and records image data obtained as a result of the photographing, state information indicating a present state of the photographing apparatus on a real time basis, image data recorded in the photographing apparatus is acquired, the image data acquired is recorded in an accumulating unit configured to accumulate the image data, and the state information acquired is presented on a real time basis.

BRIEF DESCRIPTION OF THE DRAWINGS

In the accompanying drawings:

FIG. 6 is a diagram showing an example of contents of items of grouping metadata;

FIG. 7 is a diagram showing an example of grouping metadata;

FIG. 13 is a block diagram showing an example of a detailed structure of a camcorder-information transmitting unit;

FIG. 14 is a block diagram showing an example of a functional structure of the material using apparatus;

FIG. 15 is a block diagram showing an example of a detailed structure of a camcorder-information managing unit;

FIG. 16 is a diagram for explaining communication of material data of a clip presently being acquired;

FIG. 25 is a diagram showing an example of a screen for setting a transmission mode;

FIG. 26 is a diagram showing an example of a transmission object clip;

FIG. 27 is a diagram showing an example of a transmission list;

FIG. 40 is a diagram showing an example of freeze-mix metadata;

FIG. 41 is a diagram showing an example of a screen for designating a freeze-mix image;

DESCRIPTION OF THE PREFERRED EMBODIMENTS

Figure 1:
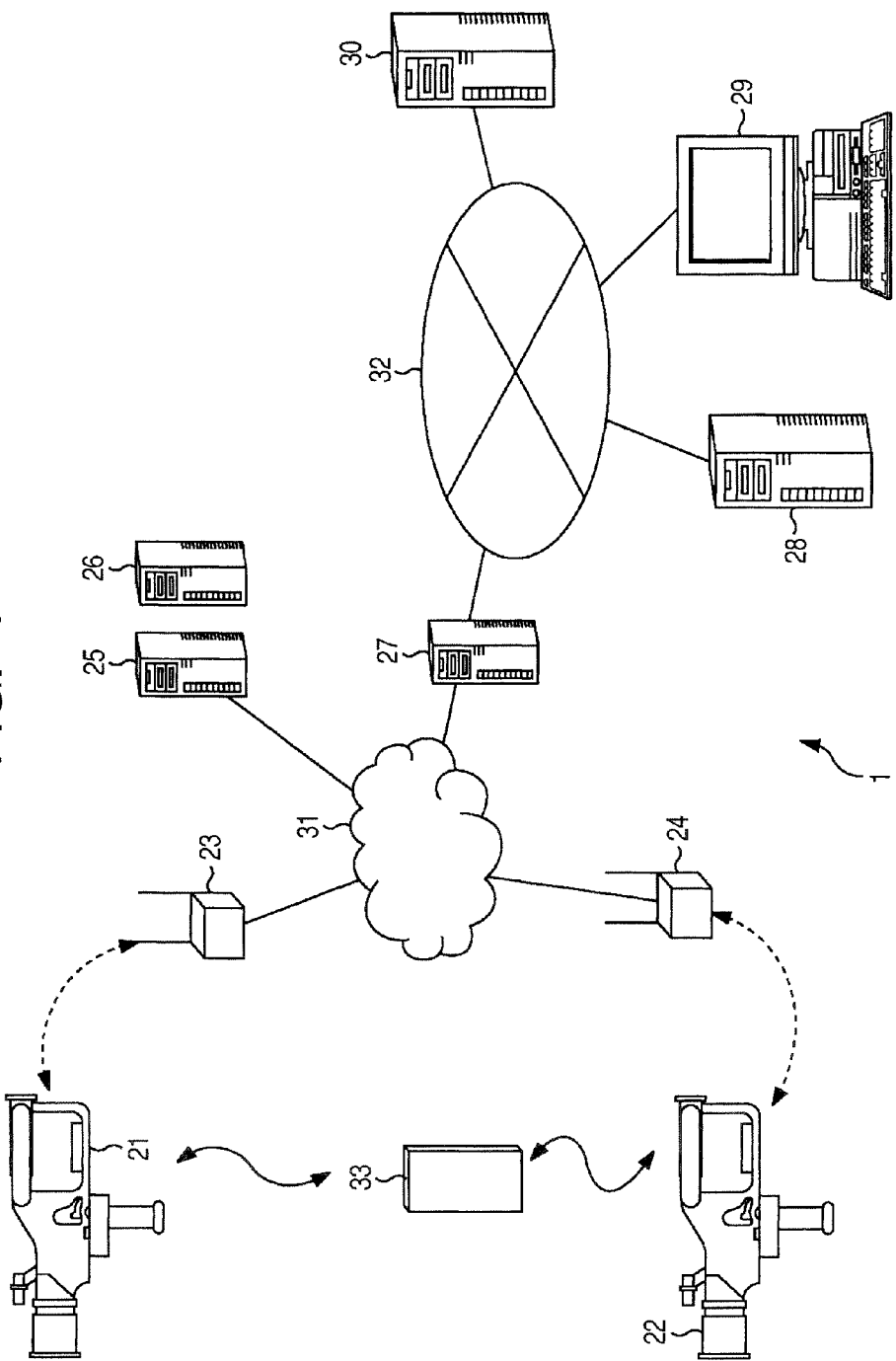
FIG. 1 is a diagram showing an example of a structure of a network system to which the invention is applied.

Embodiments of the invention will be hereinafter explained. A correspondence relation between elements of the invention and embodiments shown in the figures is illustrated as follows. This description is a description for confirming that embodiments supporting the invention are described in the specification and shown in the drawings. Therefore, even if there is an embodiment that is described in the specification or shown in the figures but is not described herein as an embodiment corresponding to an element of the invention, this does not mean that the embodiment does not correspond to the element. On the contrary, even if an embodiment is described herein as an embodiment corresponding to an element of the invention, this does not mean that the embodiment does not correspond to elements other than the element.

According to an embodiment of the invention, there is provided an information processing apparatus (e.g., a material using apparatus 29 in FIG. 1) that acquires, from a photographing apparatus (e.g., a camcorder 21 in FIG. 1) that photographs a subject and records image data obtained as a result of the photographing, state information indicating a present state of the photographing apparatus. The information processing apparatus includes: a state acquiring unit (e.g., a state acquiring unit 321 in FIG. 15) that acquires the state information from the photographing apparatus on a real time basis; a data acquiring unit (e.g., a data acquiring unit 324 in FIG. 15) that acquires image data recorded in the photographing apparatus; a recording control unit (e.g., a data recording unit 325 in FIG. 15) that causes an accumulating unit (e.g., an accumulation directory 236 in FIG. 8) that accumulates the image data acquired by the data acquiring unit to record the image data; and a presenting unit (e.g., the display control unit 326 in FIG. 15) that presents the state information acquired by the state acquiring unit on a real time basis.

In the information processing apparatus, the recording control unit further causes a recording unit (e.g., a temporary saving directory 235 in FIG. 8) that temporarily stores the image data to record image data identical with the image data recorded by the accumulating unit.

The information processing apparatus further includes a deleting unit (e.g., a deleting unit 323 in FIG. 15) that deletes image data, which is deleted from the photographing apparatus, from the recording unit.

According to another embodiment of the invention, there is provided an information processing method for an information processing apparatus (e.g., the material using apparatus 29 in FIG. 1) that acquires, from a photographing apparatus (e.g., the camcorder 21 in FIG. 1) that photographs a subject and records image data obtained as a result of the photographing, state information indicating a present state of the photographing apparatus. The information processing method includes the steps of: acquiring the state information from the photographing apparatus on a real time basis (e.g., step S25 in FIG. 17); acquiring image data recorded in the photographing apparatus (e.g., acquisition processing in step S84 in FIG. 18); causing an accumulating unit that accumulates the image data acquired to record the image data (e.g., recording processing in step S84 in FIG. 18); and presenting the state information acquired on a real time basis (e.g., step S26 in FIG. 17).

According to still another embodiment of the invention, there is provided a computer program that causes a computer to execute processing for acquiring, from a photographing apparatus (e.g., the camcorder 21 in FIG. 1) that photographs a subject and records image data obtained as a result of the photographing, state information indicating a present state of the photographing apparatus. The computer program causes the computer to execute processing including the steps of: acquiring the state information from the photographing apparatus on a real time basis (e.g., step S25 in FIG. 17); acquiring image data recorded in the photographing apparatus (e.g., the acquisition processing in step S84 in FIG. 18); causing an accumulating unit that accumulates the image data acquired to record the image data (e.g., the recording processing in step S84 in FIG. 18); and presenting the state information acquired on a real time basis (e.g., step S26 in FIG. 17).

Specific embodiments to which the invention is applied will be hereinafter explained in detail with reference to the accompanying drawings.

FIG. 1 shows an example of a structure of a network system 1 to which the invention is applied.

The network system 1 in FIG. 1 is a program production support system used for production of television programs and the like. A process of production of a television program is basically classified into planning (structuring), recording, and edition (production). The planning (structuring) is a step of supervising the entire production of the television program and is a step of planning and designing the television program to be produced and creating a scenario (an outline) of the television program.

The recording is a step of actually performing recording in a production site in accordance with, for example, a production instruction and the scenario and is a step of acquiring material data such as image data and sound data in respective scenes forming the television program and recording a photographing (including acquisition of sound) situation. The edition (production) is a step of editing the material data obtained by the recording on the basis of the production instruction, the scenario, and the like and is a step of adding other information (CG/SI (Computer Graphics/SuperImpose), a narration, or material videos, music, etc) not obtained in the recording to the material data obtained by the recording or the material data after the edition (an edition result) to create a complete package, which is data completed as a television program (material data).

The network system 1 in FIG. 1 is a program production support system that supports work in such respective steps. The network system 1 includes camcorders 21 and 22, access points 23 and 24, servers 25 and 26, a firewall 27, a material server 28, a material using apparatus 29, a complete package server 30, a network 31, and an intranet 32.

Figure 3:
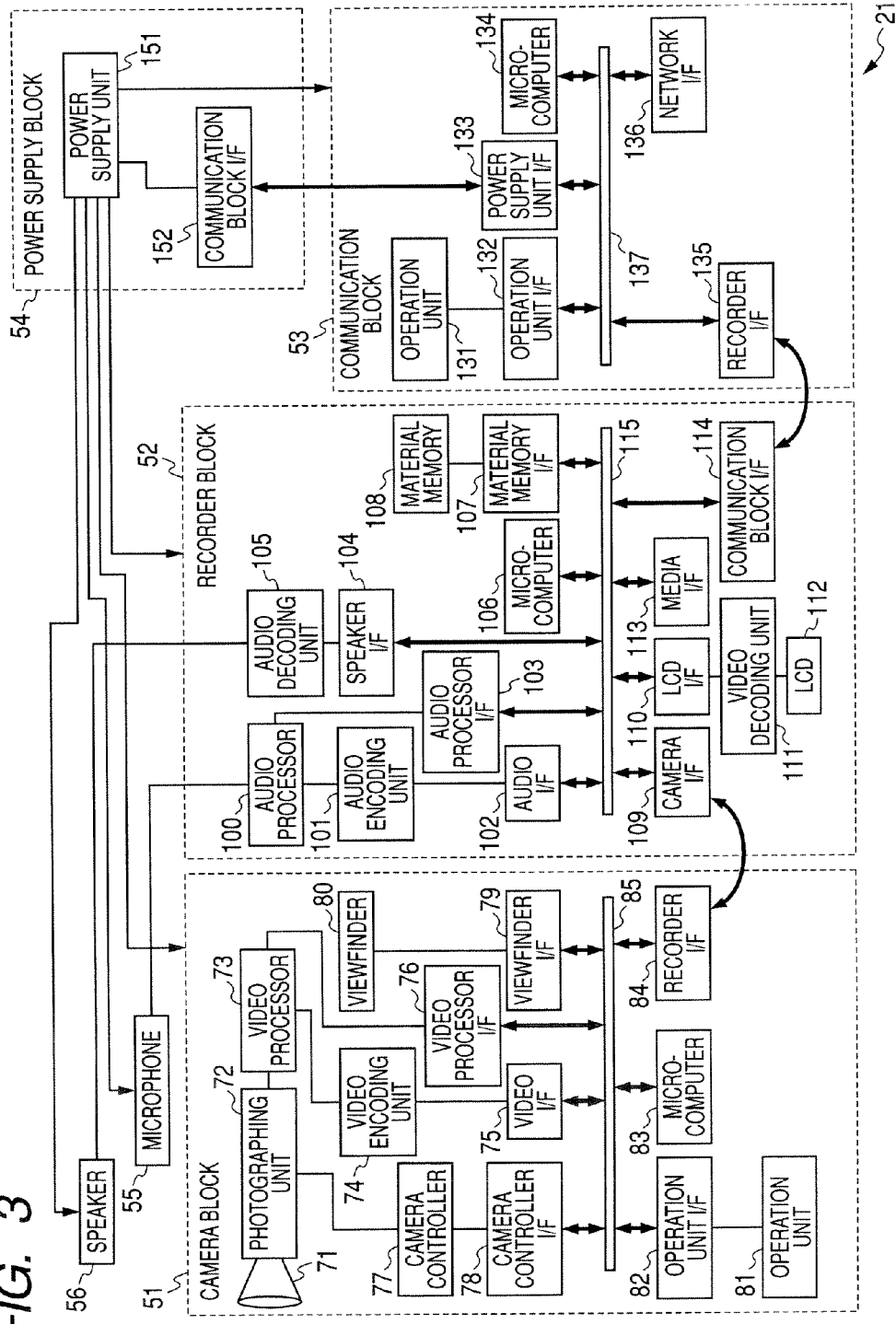
FIG. 3 is a block diagram showing an example of a hardware configuration of a camcorder in FIG. 1.

The camcorders 21 and 22 are apparatuses used for recording of a news program, which is a television program, and photographing (including acquisition of sound) of a state of a game of sports, a movie, and the like. The camcorders 21 and 22 record material data and the like obtained by photographing subjects in, for example, a removable media 33 such as a magnetic disk, an optical disk like a DVD (Digital Versatile disc), a magneto-optical disk, a memory card, or a detachable hard disk, or a material memory 108 (FIG. 3 referred to later). The camcorders 21 and 22 make connection to the access point 23 or 24 via radio and transmit the material data to other apparatuses (the material using apparatus 29, etc.) via the network 31 such as the Internet connected to the access points 23 and 24.

The camcorders 21 and 22 reproduce the material data from the removable medium 33 inserted therein and transmit the material data to the other apparatuses. Moreover, the camcorders 21 and 22 generate information or the like useful at the time of edition processing at a later stage such as information on the recording on the basis of an input of a user and associate the information or the like with the material data, which is obtained in the camcorders 21 and 22, as metadata.

The servers 25 and 26 are connected to the camcorders 21 and 22 via the access point 23 or 24 and the network 31. The material data acquired by the camcorders 21 and 22 is supplied to the servers 25 and 26 and recorded therein when necessary.

The intranet 32 is connected to the network 31 via the firewall 27. The firewall 27 prohibits illegal access from the network 31 to the intranet 32.

The material server 28, the material using apparatus 29, and the complete packet server 30 are also connected to the intranet 32.

The material server 28 accumulates material data supplied from the material using apparatus 29 via the intranet 32. The material using apparatus 29 records material data transmitted (uploaded) from the camcorders 21 and 22 via the access points 23 and 24, the network 31, the firewall 27, and the intranet 32. The material using apparatus 29 supplies the material data recorded therein to the material server 28.

The material using apparatus 29 reads out the material data stored therein or the material data accumulated in the material server 28 and creates a complete package. The material using apparatus 29 supplies the complete package to the complete package server 30 via the intranet 32. The complete package server 30 accumulates the complete package supplied from the material using apparatus 29.

In the following description, when it is unnecessary to distinguish the camcorders 21 and 22 from each other, the camcorders 21 and 22 are collectively referred to as the camcorder 21. When it is unnecessary to distinguish the access points 23 and 24 from each other, the access points 23 and 24 are collectively referred to as the access point 23.

Figure 2:
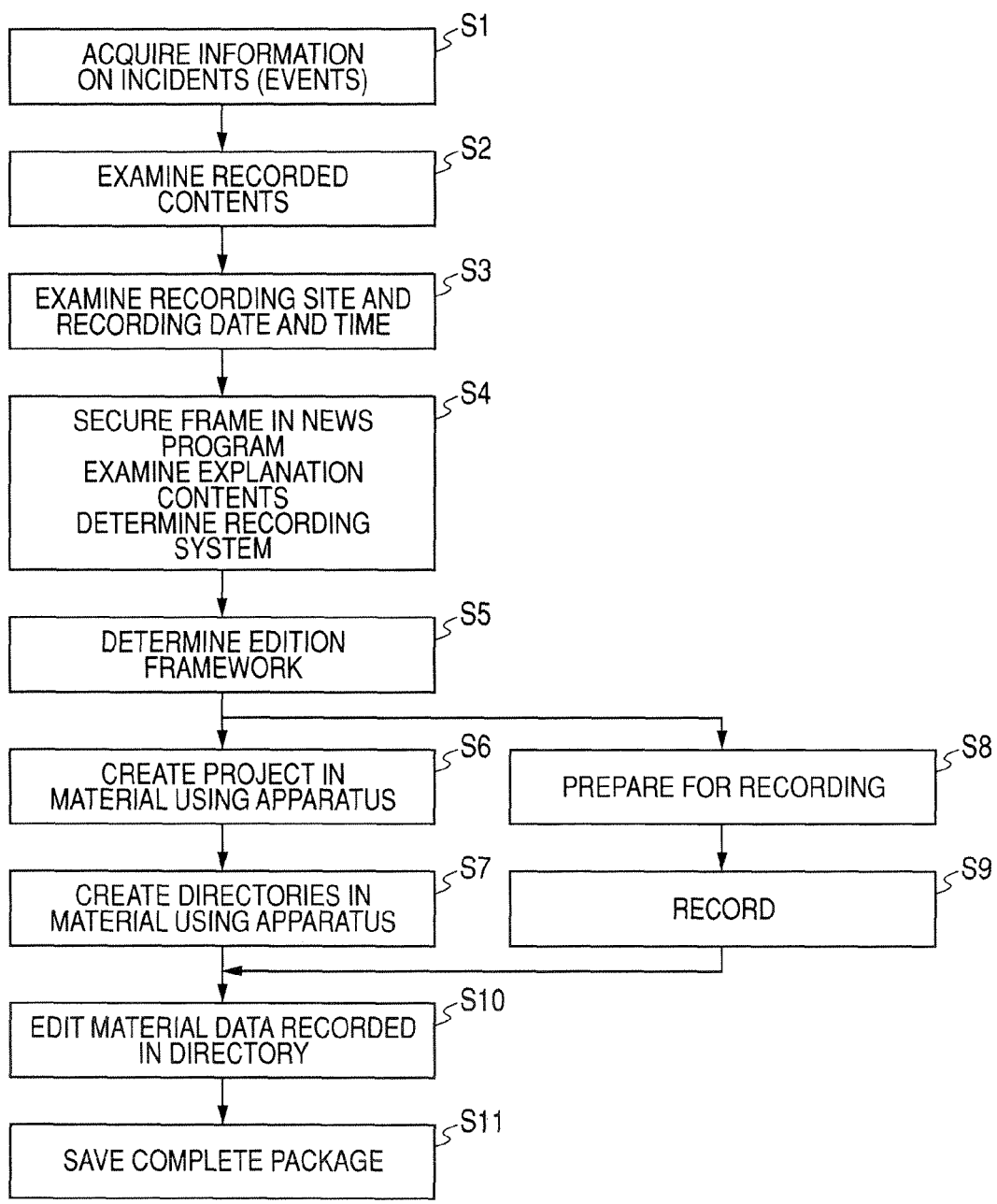
FIG. 2 is a diagram for explaining in detail a workflow of operators who produce a television program.

A workflow of operators who produce a television program in the network system 1 in FIG. 1 will be explained in detail with reference to FIG. 2. In FIG. 2, the operators create a news program.

As shown in FIG. 2, in step S1, a planning operator who performs a step of planning acquires information on incidents (events), which make news, and proceeds to step S2. In step S2, the planning operator examines (determines) recording contents on the basis of the information acquired in step S1.

The recording contents are distinguished from each other for each of the incidents (topics). It is assumed that there are plural recording contents determined in step S2. The planning operator acquires recording IDs, which are IDs peculiar to the recording contents, from a not-shown NRC (news room computer) that manages a television program for each of the recording contents.

After the processing in step S2, the planning operator proceeds to step S3 and examines a recording site (a photographing place) and a recording date and time (a photographing date and time). After the processing in step S3, the planning operator proceeds to step S4 and inputs a frame (a time frame) for broadcasting the recording contents examined in step S2 in a schedule of a news program managed (stored) by the NRC to secure a time frame in the news program. The planning operator examines explanation contents for explaining the recorded contents, creates a draft of the explanation contents, and causes the NRC to store the draft. Moreover, the planning operator determines a recording system such as a person in charge of recording (a cameraman), an ID of the camcorder 21 that performs recording (hereinafter referred to as apparatus ID), and a recording schedule (a timetable in the recording contents).

After the processing in step S4, the planning operator proceeds to step S5 and determines an edition framework representing a broadcasting order of the recording contents within the time frame secured in step S2. After the processing in step S5, an edition operator who performs a step of edition creates a project (an edition work unit) in the material using apparatus 29 on the basis of the time frame secured in step S4 and causes the material using apparatus 29 to store the draft of the explanation contents created in step S4.

After the processing in step S6, the edition operator proceeds to step S7 and creates a directory (a folder) and the like for each of the recording IDs in the material using apparatus 29. The recording ID is associated with this directory. After the processing in step S5, a recording operator who performs a step of recording proceeds to step S8 and performs preparation for recording. Specifically, the recording operator causes the camcorder 21, which records the recording contents corresponding to the recording ID acquired from the NRC, to record the recording ID. The recording operator causes the camcorder 21 to record metadata of a group (hereinafter referred to as grouping metadata) for each of the recording IDs described later on the basis of the edition framework determined in step S5.

After the processing in step S8, the recording operator proceeds to step S9, visits, for example, the recording site at the recording date and time examined in step S3, and records the recording contents examined in step S2 using the camcorder 21. The recording operator transmits material data obtained as a result of the recording and the recording ID from the camcorder 21 to the material using apparatus 29 via the access point 23, the network 31, and the like. Consequently, in the material using apparatus 29, the material data is recorded in a directory corresponding to the recording ID.

After the processing in steps S7 and S9, the edition operator proceeds to step S10 and edits the material data stored in the directory of the material using apparatus 29 and proceeds to step S11. In step S11, the edition operator saves (stores) the material data obtained as a result of the edition in the complete packet server 30 as a complete packet from the material using apparatus 29 via the intranet 32.

FIG. 3 is a block diagram showing an example of a hardware configuration of the camcorder 21 in FIG. 1.

The camcorder 21 in FIG. 3 includes a camera block 51, a recorder block 52, a communication block 53, a power supply block 54, a microphone 55, and a speaker 56.

The camera block 51 includes a lens unit 71, a photographing unit 72, a video processor 73, a video encoding unit 74, a video I/F (Interface) 75, a video processor I/F 76, a camera controller 77, a camera controller I/F 78, a viewfinder I/F 79, a viewfinder 80, an operation unit 81, an operation unit I/F 82, a microcomputer 83, a recorder I/F 84, and a bus 85. The camera block 51 photographs a subject and supplies image data (video data) obtained as a result of the photographing to the recorder block 52.

The photographing unit 72 includes a CCD (Charge Coupled Device). The photographing unit 72 acquires light from the subject via the lens unit 71 to photograph the subject. The photographing unit 72 supplies an analog image signal obtained as a result of the photographing to the video processor 73. The video processor 73 applies A/D (Analog/Digital) conversion, processing for adjusting an image, and the like to the image signal from the photographing unit 72. The video processor 73 supplies digital image data obtained as a result of the A/D conversion, the processing, and the like to the video encoding unit 74 or the video processor I/F 76.

The video encoding unit 74 compresses and encodes the image data from the video processor 73 in, for example, the MPEG (Moving Picture Experts Group) 2 system and supplies image data obtained as a result of the compression encoding to the video I/F 75.

The video I/F 75, the video processor I/F 76, the camera controller I/F 78, the viewfinder I/F 79, the operation unit I/F 82, the microcomputer 83, and the recorder I/F 84 are connected to one another via the bus 85.

The video I/F 75 supplies the image data from the video encoding unit 74 to the recorder I/F 84 via the bus 85. The video processor I/F 76 supplies the image data from the video processor 73 to the viewfinder I/F 79 via the bus 85.

The camera controller 77 controls the photographing unit 72 on the basis of a control signal supplied from the camera controller I/F 78 to control an aperture and zoom. The camera controller I/F 78 supplies a control signal supplied from the microcomputer 83 via the bus 85 to the camera controller 77.

The viewfinder I/F 79 supplies image data supplied from the video processor I/F 76 or the recorder I/F 84 or various metadata supplied from the recorder I/F 84 to the viewfinder 80. The viewfinder 80 displays an image corresponding to the image data or the metadata from the viewfinder I/F 79.

The operation unit 81 receives operation (e.g., an instruction for photographing) applied to the camera block 51 by the user and supplies a camera operation signal indicating the operation to the operation unit I/F 82. The operation unit I/F 82 supplies the camera operation signal supplied from the operation unit 81 to the microcomputer 83 and the recorder I/F 84 via the bus 85.

The microcomputer 83 includes a CPU (Central Processing Unit), a ROM (Read Only Memory), and a RAM (Random Access Memory). The CPU of the microcomputer 83 executes a computer program stored in the ROM to control the respective units of the camera block 51 on the basis of the camera operation signal from the operation unit 81. For example, the CPU supplies a control signal to the camera controller 77 via the bus 85 and the camera controller I/F 78 to control an aperture and zoom.

Programs to be executed by the CPU, data, and the like are appropriately stored in the RAM of the microcomputer 83. For example, set values concerning photographing in the camera block 51 (e.g., white balance, gain, filter, aperture, shutter speed, zoom, and focus) (hereinafter referred to as camera set values) are stored in the RAM of the microcomputer 83. The CPU of the microcomputer 83 supplies a control signal to the camera controller 77 on the basis of the camera set values. The CPU of the microcomputer 83 supplies the camera set values stored in the RAM to the recorder I/F 84.

The recorder I/F 84 exchanges data with the recorder block 52. For example, the recorder I/F 84 supplies image data or metadata supplied from a camera I/F 109 of the recorder block 52 to the viewfinder I/F 79 via the bus 85. The recorder I/F 84 supplies the image data supplied from the video I/F 75, the camera operation signal supplied from the operation unit I/F 82, and the camera set values from the microcomputer 83 to the recorder block 52.

The recorder block 52 includes an audio processor 100, an audio encoding unit 101, an audio I/F 102, an audio processor I/F 103, a speaker I/F 104, an audio decoding unit 105, a microcomputer 106, a material memory I/F 107, a material memory 108, a camera I/F 109, an LCD (Liquid Crystal Display) I/F 110, a video decoding unit 111, an LCD 112, a media I/F 113, a communication block I/F 114, and a bus 115. The recorder block 52 records material data such as image data obtained by the camera block 51 and sound data corresponding to an analog sound signal acquired by the microphone 55.

The audio processor 100 performs A/D conversion, processing for adjusting sound, and the like in response to the sound signal supplied from the microphone 55. The audio processor 100 supplies digital sound data (audio data) obtained as a result of the A/D conversion, the processing, and the like to the audio encoding unit 101 and the audio processor I/F 103. The audio encoding unit 101 encodes the sound data from the audio processor 100 in, for example, the linear PCM (Pulse Code Modulation) system and supplies sound data obtained as a result of the encoding to the audio I/F 102.

The audio I/F 102, the audio processor I/F 103, the speaker I/F 104, the microcomputer 106, the material memory I/F 107, the camera I/F 109, the LCD I/F 110, the media I/F 113, and the communication block I/F 114 are connected to one another via the bus 115.

The audio I/F 102 supplies the sound data from the audio encoding unit 101 to the material memory 108 or the media I/F 113 via the bus 115. The audio processor I/F 103 supplies the sound data from the audio processor 100 to the speaker I/F 104 via the bus 115 as it is.

The speaker I/F 104 supplies the sound data supplied from the audio processor I/F 103, the material memory I/F 107, or the media I/F 113 to the audio decoding unit 105. The audio decoding unit 105 decodes the sound data when necessary. The audio decoding unit 105 supplies sound data obtained as a result of the decoding to the speaker 56 and causes the speaker 56 to output sound corresponding to the sound data.

The microcomputer 106 includes a CPU, a ROM, and a RAM. The CPU of the microcomputer 106 executes a computer program stored in the ROM to control the respective units of the recorder block 52 on the basis of a communication operation signal indicating operation of the operation unit 131 by the user supplied from the communication bock I/F 114.

For example, the CPU of the microcomputer 106 creates metadata (non-real time metadata or grouping metadata described later) of material data on the basis of information on recording and various set values supplied from the media I/F 113 and the like.

The CPU of the microcomputer 106 creates disk metadata or the like that is metadata for all data recorded in the removable medium 33. The CPU of the microcomputer 106 creates, on the basis of image data supplied from the camera I/F 109, proxy image data having low resolution compared with the image data.

The CPU of the microcomputer 106 samples (extracts at a fixed interval) the image data supplied from the camera I/F 109 when necessary and creates thumbnail image data (image data of a still image) as sampling thumbnail image data on the basis of the image data sampled.

Moreover, the CPU of the microcomputer 106 controls recording in or reproduction from the material memory 108 and the removable medium 33.

The microcomputer 106 simultaneously performs recording in and reproduction from the material memory 108 or the removable medium 33 when necessary. In this case, the microcomputer 106 is capable of reproducing recorded data among files currently recorded in the material memory 108 or the removable medium 33.

The CPU of the microcomputer 106 creates image data for displaying various screens and supplies the image data to the LCD I/F 110. The CPU of the microcomputer 106 judges an operation state of the camcorder 21 (e.g., recording, play, slow play, fast play, or stop) on the basis of a camera operation signal supplied from the camera I/F 109 and a communication operation signal supplied from the communication block I/F 114 and creates data indicating the operation state. The CPU of the microcomputer 106 supplies the data representing the operation state of the camcorder 21 (hereinafter referred to as operation state data) and the camera set values supplied from the recorder I/F 84 to the communication block I/F 136 via the bus 115. Programs to be executed by the CPU, data, and the like are appropriately stored in the RAM of the microcomputer 106.

For example, the material memory I/F 107 accesses the material memory 108 at high speed and records data in or reproduces data from the material memory 108.

For example, the material memory I/F 107 supplies material data to the material memory 108 according to the control by the microcomputer 106 and causes the material memory 108 to store the material data as a file. The material memory I/F 107 supplies proxy image data to the material memory 108 according to the control by the microcomputer 106 and causes the material memory 108 to store the proxy image data as a file. The material memory I/F 107 supplies metadata (metadata of the material data, sampling thumbnail image data, disk metadata, etc.) to the material memory 108 according to the control by the microcomputer 106 and causes the material memory 108 to store the metadata as a file.

The material memory I/F 107 reproduces material data from the material memory 108 and supplies sound data and image data in the material data to the speaker I/F 104 and the LCD I/F 110, respectively. Moreover, the material memory I/F 107 reproduces material data, proxy image data, metadata, and the like from the material memory 108 and supplies the data to the communication block I/F 114.

The camera I/F 109 is connected to the recorder I/F 84 of the camera block 51 and, for example, receives image data, a camera operation signal, and camera set values from the recorder I/F 84. The camera I/F 109 supplies the image data, the camera operation signal, and the camera set values to the microcomputer 106 via the bus 115 and supplies the image data to the material memory I/F 107 or the media I/F 113. The LCD I/F 110 supplies the image data supplied from the material memory I/F 107 or the media I/F 113 to the video decoding unit 111.

The video decoding unit 111 decodes the image data from the LCD I/F 110 when necessary and supplies image data obtained as a result of the decoding to the LCD 112. The LCD 112 displays an image corresponding to the image data from the video decoding unit 111.

The media I/F 113 supplies material data to the removable medium 33 according to the control by the microcomputer 106 and causes the removable medium 33 to store the material data as a file. The media I/F 113 supplies proxy image data to the removable medium 33 according to the control by the microcomputer 106 and causes the removable medium 33 to store the proxy image data as a file. The media I/F 113 supplies metadata (metadata, sampling thumbnail image data, disk metadata, etc. of the material data) to the removable medium 33 according to the control by the microcomputer 106 and causes the removable medium 33 to store the metadata as a file.

Moreover, the media I/F 113 reads out information on recording and various set values stored in the removable medium 33 inserted in the camcorder 21 and supplies the information and the various set values to the microcomputer 106.

The information on recording, the various set values, and the like are explained as being inputted to the microcomputer 106 from the removable medium 33 via the media I/F 113. However, the user may operate the operation unit 131 to input the information on recording, the various set values, and the like to the microcomputer 106.

The media I/F 113 reproduces material data from the removable medium 33 and supplies sound data and image data in the material data to the speaker I/F 104 and the LCD I/F 110, respectively. The media I/F 113 reproduces material data, proxy image data, metadata, and the like from the removable medium 33 and supplies the data to the communication block I/F 114.

The communication block I/F 114 is connected to a recorder I/F 135 (described later) of the communication block 53 and exchanges data with the communication block 53. For example, the communication block I/F 114 supplies image data or the like of an image to be an object of freeze-mix (hereinafter referred to as freeze-mix image) supplied from the recorder I/F 135 of the communication block 53 to the material memory I/F 107 or the media I/F 113 and causes the material memory 108 or the removable medium 33 to store the image data.

The freeze-mix unit processing for causing the viewfinder 80 to display an image photographed in the past in a translucent state as a sample image used as a sample at the time of photographing. In other words, an image to be an object of the freeze-mix is a sample image in the freeze-mix.

The communication block I/F 114 supplies a communication operation signal supplied from the recorder I/F 135 to the microcomputer 106 via the bus 115.

The communication block I/F 114 supplies material data, proxy image data, metadata, and the like supplied from the material memory I/F 107 or the media I/F 113 to the recorder I/F 135 and supplies operation state data and camera set values supplied from the microcomputer 104 to the recorder I/F 135.

The communication block 53 includes an operation unit 131, an operation unit I/F 132, a power supply unit I/F 133, a microcomputer 134, a recorder I/F 135, a network I/F 136, and a bus 137. The communication block 53 performs communication of data with other apparatuses via the access point 23 and the network 31 in FIG. 1 and controls a power supply for the recorder block 52.

The operation unit 131 receives operation applied to the recorder block 52 and the communication block 53 (e.g., an instruction of reproduction) and supplies a communication operation signal indicating the operation to the operation unit I/F 132. The operation unit I/F 132, the power supply unit I/F 133, the microcomputer 134, the recorder I/F 135, and the network I/F 136 are connected to one another via the bus 137.

The operation unit I/F 132 supplies the communication operation signal from the operation unit 131 to the microcomputer 134 or the recorder I/F 135 via the bus 137. The power supply unit I/F 133 supplies a power supply control signal for controlling supply of power to the recorder block 52, which is supplied from the microcomputer 134 via the bus 137, to the communication block I/F 152 of the power supply block 54.

The microcomputer 134 includes a CPU, a ROM, and a RAM. The CPU of the microcomputer 134 executes a computer program stored in the ROM to control the respective units of the communication block 53 on the basis of the communication operation signal supplied from the operation unit 13. The CPU of the microcomputer 134 generates a power supply control signal on the basis of a detection signal indicating a result of detection of the access point 23 supplied from the network I/F 136 and supplies the power supply control signal to the power supply unit I/F 133.

Programs to be executed by the CPU and data are stored in the RAM of the microcomputer 134. For example, material data, proxy image data, or metadata supplied via the recorder I/F 135 and transmitted via the network I/F 136 is temporarily stored in the RAM. Consequently, even when speed of reproduction of the data from the removable medium 33 exceeds transmission speed, it is possible to surely transmit the data.

The recorder I/F 135 is connected to the communication block I/F 114 of the recorder block 52 and supplies, for example, image data of a freeze-mix image supplied from the network I/F 136 and the communication control signal from the operation unit 132 to the communication block I/F 114.

The recorder I/F 135 supplies the material data, the proxy image data, the metadata, the operation state data, the camera set values, and the like supplied from the communication block I/F 114 to the microcomputer 134 via the bus 137.

The network I/F 136 performs communication with other apparatuses (e.g., the material using apparatus 29) via the access point 23, the network 31, and the like in FIG. 1 in accordance with an FTP (File Transfer Protocol), a UDP (User Datagram Protocol), or the like. For example, the network I/F 136 transmits material data, proxy image data, metadata, and the like supplied from the recorder I/F 135 to the material using apparatus 29 via the access point 23, the network 31, the firewall 27, and the intranet 32 in an order of the metadata, the proxy image data, and the material data. In other words, the network I/F 136 transmits data related to the material data having less data quantity compared with the material data such as the metadata and the proxy image data earlier than the material data.

The network I/F 136 transmits operation state data, camera set values, and the like supplied from the microcomputer 134 to the material using apparatus 29.

For example, the network I/F 136 receives image data of a freeze-mix image transmitted from the material using apparatus 29 via the intranet 32, the firewall 27, the network 31, and the access point 23 and supplies the image data to the recorder I/F 135 via the bus 137. Moreover, the network I/F 136 detects the access point 23 and supplies a detection signal indicating a result of the detection to the microcomputer 134.

The power supply block 54 includes a power supply unit 151 and a communication block I/F 152. The power supply block 54 supplies power (electric power) to the camera block 51, the recorder block 52, the communication block 53, the microphone 55, and the speaker 56.

The power supply unit 151 controls the supply of power to the recorder block 52 on the basis of a power supply control signal supplied from the communication block I/F 152. The communication block I/F 152 supplies a power supply control signal supplied from the power supply unit I/F 133 of the communication block 53 to the power supply unit 151.

In the following description, for convenience of explanation, it is assumed that data such as material data, proxy image data, and metadata are recorded in the removable medium 33.

Figure 4:
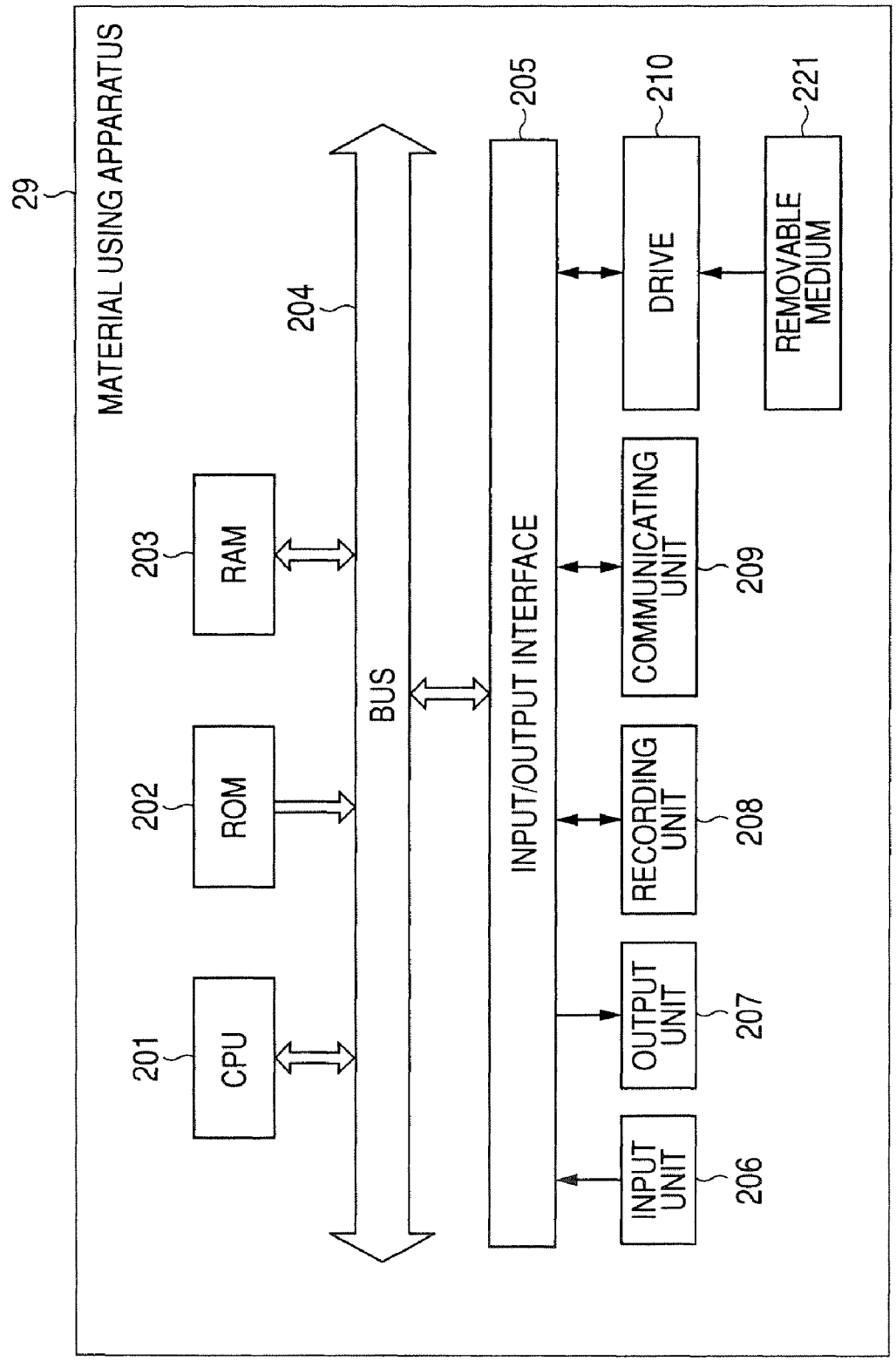
FIG. 4 is a block diagram showing an example of a hardware configuration of a material using apparatus in FIG. 1.

FIG. 4 is a block diagram showing an example of a hardware configuration of the material using apparatus 29 in FIG. 1.

A CPU 201 executes various kinds of processing in accordance with programs recorded in a ROM 202 or a recording unit 208. Programs to be executed by the CPU 201, data, and the like are appropriately stored in a RAM 203. The CPU 201, the ROM 202, and the RAM 203 are connected to one another via a bus 204.

An input/output interface 205 is also connected to the CPU 201 via the bus 204. An input unit 206 including a keyboard, a mouse, a microphone, and a receiving unit that receives a command transmitted from a not-shown remote controller and an output unit 207 including a display and a speaker are connected to the input/output interface 205. The CPU 201 executes various kinds of processing in response to commands inputted from the input unit 206. The CPU 201 outputs results of the processing to the output unit 207. For example, the CPU 201 creates image data for displaying various screens and causes the output unit 207 to display the screens.

The recording unit 208 connected to the input/output interface 205 includes a hard disk and records programs to be executed by the CPU 201 and various data. A communicating unit 209 communicates with external apparatuses via the intranet 32. The communicating unit 209 may acquire a computer program via the intranet 32 and record the computer program in the recording unit 208.

A drive 210 connected to the input/output interface 205 drives, when a removable medium 211 such as a magnetic disk, an optical disk, a magneto-optical disk, or a semiconductor memory is inserted therein, the removable medium 211 and acquires a computer program, data, and the like recorded in the removable medium 211. The computer program and the data acquired are transferred to the recording unit 208 when necessary and recorded in the recording unit 208.

Figure 5:
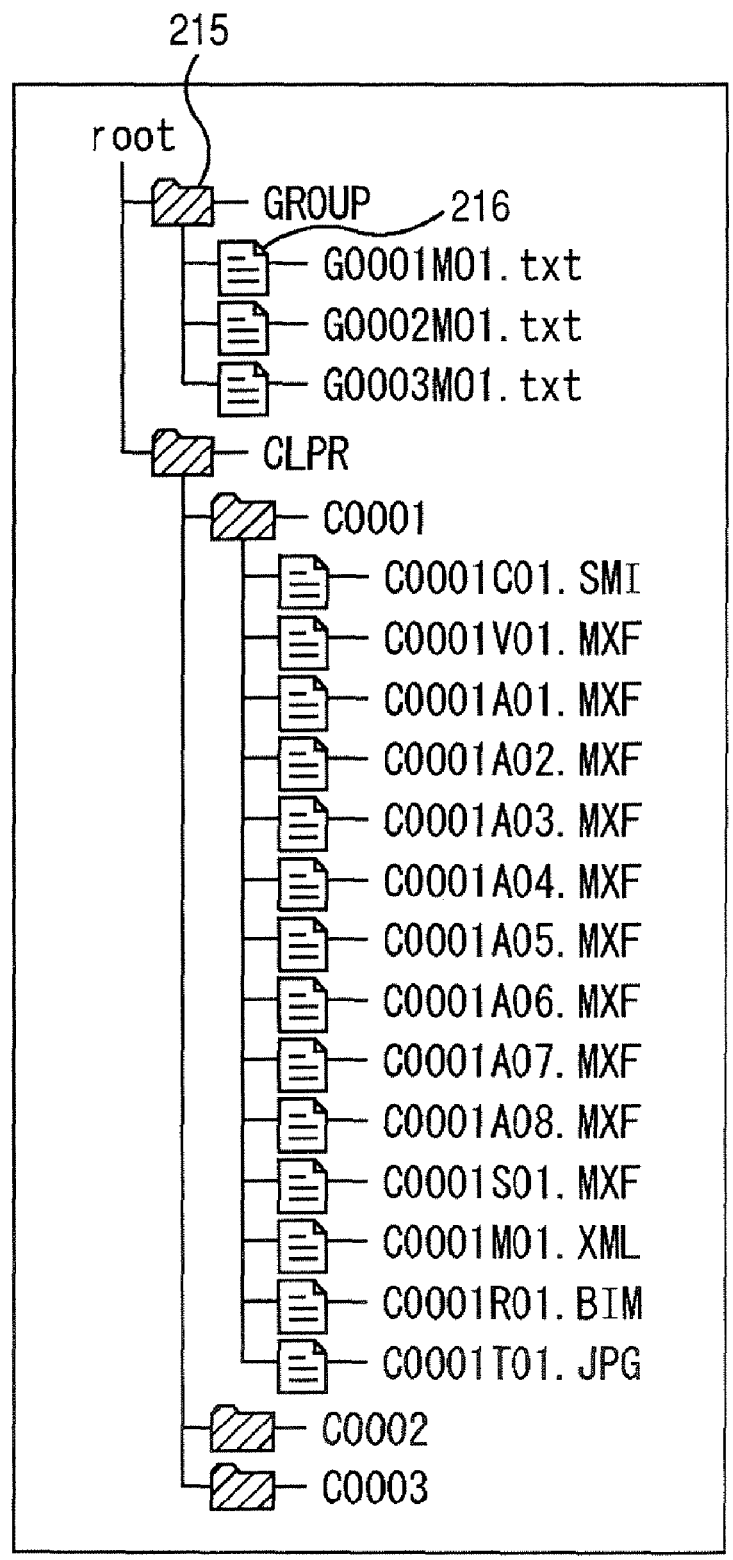
FIG. 5 is a diagram showing an example of a screen that shows a directory structure of files recorded in a removable medium.

FIG. 5 is a diagram showing an example of a screen showing a directory structure of files, which are recorded in the removable medium 33 in FIG. 1, displayed on the LCD 112 in FIG. 3.

In FIG. 5, a symbol 215 represents one directory. Although not denoted by a reference numeral, each of other symbols identical with the symbol (directory) 215 also represents one directory. A symbol 216 indicates one file. Although not denoted by a reference numeral, each of other symbols identical with the symbol (file) 216 also indicates one file.

In the following description, unless specifically noted otherwise, a directory and a symbol of the directory are regarded as identical. Similarly, a file and a symbol of the file are regarded as identical. To facilitate identification of each of the directories and each of the files, parentheses are written behind the file and the directory and names of the file and the directory are described in the parentheses.

In the example in FIG. 5, a GROUP directory 215 and a clip root directory (CLPR) are provided in the removable medium 33.

Grouping metadata files 216 (G0001M01.txt to G0003M01.txt), which are files of grouping metadata (FIGS. 6 and 7 referred to later) of a group for each of recording IDs of all clips (details of the clips are described later) recorded in the removable medium 33, are provided in the GROUP directory 215.

Specifically, for example, FIG. 5 shows an example in the case in which data of clips corresponding to three recording IDs is recorded in the removable medium 33. Each of grouping metadata of a group for each three recording IDs is divided into three files, namely, a first grouping metadata file (G0001M01.txt), a second grouping metadata file (G0002M01.txt), and a third grouping metadata file (G0003M01.txt), and recorded.

Data of the clips recorded in the removable medium 33 are divided into different directories for each of the clips and managed in the clip root directory (CLPR).

The clip is a unit of the number of times of photographing processing of the camcorder 21. Besides, the clip also indicates a unit indicating time from the start till the end of photographing of the photographing processing, indicates a unit indicating length of various data obtained by the photographing processing, and indicates a unit indicating a data quantity of the various data obtained by the photographing processing. Moreover, the clip may indicate an aggregate itself of the various data.

Here, the clip indicates, for example, an aggregate of image data obtained by one photographing processing (photographing processing from the start till the end of photographing), sound data corresponding to the image data, and metadata, and the like.

Specifically, for example, FIG. 5 shows an example of the case in which data of three clips are recorded in the removable medium 33. Each of the data of the three clips is divided into three directories, namely, a first clip directory (C0001), a second clip directory (C0002), and a third clip directory (C0003) and managed.

In other words, each data of a first clip recorded in the removable medium 33 is managed as files of the first clip directory (C0001) and the subsequent clip directories.

Specifically, for example, as shown in FIG. 5, in this first clip directory (C0001), the following files are provided: a master file (C0001C01.SMI) that is a file for managing this clip, an image file (C0001V01.MXF) that is a file including image data of this clip, sound files (C0001A01.MXF to C0001A08.MXF) that are eight files including sound data of respective channels of this clip, a proxy image data file (C0001S01.MXF) that is a file including proxy image data of this clip, a non-real time metadata file (C0001M01.XML) that is a file including metadata that does not need to have a real time nature (hereinafter referred to as non-real time metadata) such as a type (e.g., camcorder) and an apparatus ID of an apparatus that has acquired this clip, camera set values at the time of photographing (acquisition) of the clip, and a photographing date and time, a real time metadata file (C0001R01.BIM) that is a file including metadata that needs to have a real time nature (hereinafter referred to as real time metadata) of this clip, and a sampling thumbnail image file (C0001T01.JPG) that is a file including sampling thumbnail image data.

In this way, in the example in FIG. 5, each of the image data, the proxy image data, and the real time metadata, which are data that need to have a real time nature at the time of reproduction, is managed as one file to prevent a readout time from increasing when the data are necessary separately.

As described above, the sound data also needs to have a real time nature at the time of reproduction. However, in order to cope with multi-channeling of sound such as a 7.1 channel, eight channels are prepared and the sound data is managed as different files, respectively. In other words, although the sound data is explained as being managed as eight files here, the number of files corresponding to the sound data may be seven or less or may be nine or more.

Similarly, the image data, the proxy image data, and the real time metadata may be managed as two or more files, respectively, depending on a case.

In the example in FIG. 5, the non-real time metadata file (C0001M01.XML) is described in the XML format in order to give universality to the file. However, the real time metadata file (C0001R01.BIM) is a file of an BIM (Binary format for MPEG-7 data) format obtained by compiling files of the XML format in order to reduce processing time for reproduction processing and loads necessary for the processing.

In the example of a structure of files of the first clip directory (C0001) described above, in all the clip directories, that is, in the example in FIG. 5, in the second clip directory (C0002) and the third clip directory (C0003), it is possible to apply the same example of a structure of files. Therefore, explanations of the clip directories are omitted. The sampling thumbnail image file (C0001T01.JPG), which is a file including sampling thumbnail image data, does not have to be recorded.

Grouping metadata will be explained with reference to FIGS. 6 and 7.

FIG. 6 shows an example of items of contents of grouping metadata.

In the example in FIG. 6, the items of the contents of the grouping metadata are "group title", "recording ID", "classification", "original", "group creation date and time", "transmission destination", "photographing date and time", "photographing place", "photographer", "photographing contents", and "photographed material (file)".

A detail of the item "group title" is a title indicating recording contents of the group. A detail of the item "recording ID" is the recording ID acquired from the NRC in step S2 in FIG. 2. A detail of the item "classification" is a type (e.g., freeze-mix or recording) of clips classified into the group. A detail of the item "original" is information indicating whether data of clips classified into the group is original data as recorded or data processed after recording. A detail of the item "group creation date and time" is information on a date and time when the grouping metadata is created.

The item "transmission destination" includes an item "name", an item "Email address", and an item "website URL (Uniform Resource Locator)". A detail of the item "name" is a name of a transmission destination of clips classified into the group. A detail of the item "Email address" is an Email address of the transmission destination. A detail of the item "website URL" is a URL of a website of the transmission destination.

As a detail of the item "Email address", plural Email addresses may be described. As a detail of the item "website URL", URLs of plural websites may be described.

The item "photographing date and time" includes an item "planned" and an item "executed". A detail of the item "planned" is information on the recording date and time examined in step S3 in FIG. 2. A detail of the item "executed" is information of actual recording date and time. The item "photographing place" includes an item "planned" and an item "executed". A detail of the item "planned" is information on the recording site examined in step S3. A detail of the item "executed" is information on an actual recording site. This actual recording site is positional information indicating an actual position of the camcorder 21 acquired at the time of recording by, for example, a not-shown GPS (Global Positioning System) provided in the camcorder 21.

The item "photographer" includes an item "planned" and an item "executed". A detail of the item "planned" is a name of the person in charge of recording determined in step S4. A detail of the item "executed" is a name of an actual person in charge of recording. A detail of the item "photographing contents" includes an item "instructed" and an item "actual (memo)". A detail of the item "instructed" is information on recording contents such as a recording schedule. A detail of the item "actual (memo)" is information on actual recording contents.

The item "photographed material" includes an item "title", an item "UMID (Unique Material Identifier)", an item "memo", and an item "transmission history". A detail of the item "title" is names (titles) of the clip directories (C0001 to C0003) of the clips classified into the group. A detail of the item "UMID" is UMIDs (details will be described later) of the clips. A detail of the item "memo" is arbitrary information inputted by the user. A detail of the item "transmission history" is information indicating presence or absence of transmission of the respective clips classified into the group.

The UMID is an identifier peculiar to each clip for identifying the clip globally uniquely and indicates an identifier set by the SMPTE (Society of Motion Picture and Television Engineers). This UMID is included in, for example, an image file or a non-real time metadata.

FIG. 7 indicates an example of grouping metadata described in the text format.

In the grouping metadata in FIG. 7, following an item, a detail of the item is described. Details of items are punctuated by ", (comma)".

Specifically, in the example in FIG. 7, following "title" indicating the item "group title", "Mt. Fuji viewed from Lake Yamanaka", which is a detail of the item "group title", is described. After that, "category" indicating the item "classification", "recording", which is a detail of the item "classification", "original" indicating the item "original", and "Yes" indicating original data, which is a detail of the item "original", are described in order.

After that, in the same manner, "date created" indicating the item "group creation date and time", "2005/5/16", which is a detail of the item "group creation date and time", "date directed" indicating the item "planned" of the item "photographing date and time", "2005/5/31", which is a detail of the item "planned", "date carried out" indicating the item "executed" of the item "photographing date and time", "2005/5/31", which is a detail of the item "executed", "place directed" indicating the item "planned" of the item "photographing place", "Lake Yamanaka Plain", which is a detail of the item "planned", "place carried out" indicating the item "executed" of the item "photographing place", and "Lake Yamanaka Plain", which is a detail of the item "executed", are described in order.

After that, "person directed" indicating the item "planned" of the item "photographer", "Kamei, Takemura", which is a detail of the item "planned", "person carried out" indicating the item "executed" of the item "photographer", "Kamei, Takemura", which is a detail of the item "executed", "description directed" indicating the item "instructed" of the item "photographing contents", "XXXX", which is a detail of the item "instructed", "description occurred" indicating the item "actual (memo)" of the item "photographing content", and "XXXX", which is a detail of the item "actual (memo)" are described in order.

Moreover, after that, "file title" indicating the item "title" of the item "photographed material (file)", "XXXX", which is a title of a first file of clips classified into the group in a detail of the item "title", "file ID" indicating the item "UMID" of the item "photographed material", "XXXX", which is a UMID of the first file in a detail of the item "UMID", "memo" indicating the item "memo" of the item "photographed material", and "XXXX", which is a detail of the item "memo", are described in order.

After that, as in the first file, the item "title", the item "UMID", and the item "memo" of second and third files, as well as details of the items are described.

Figure 8:
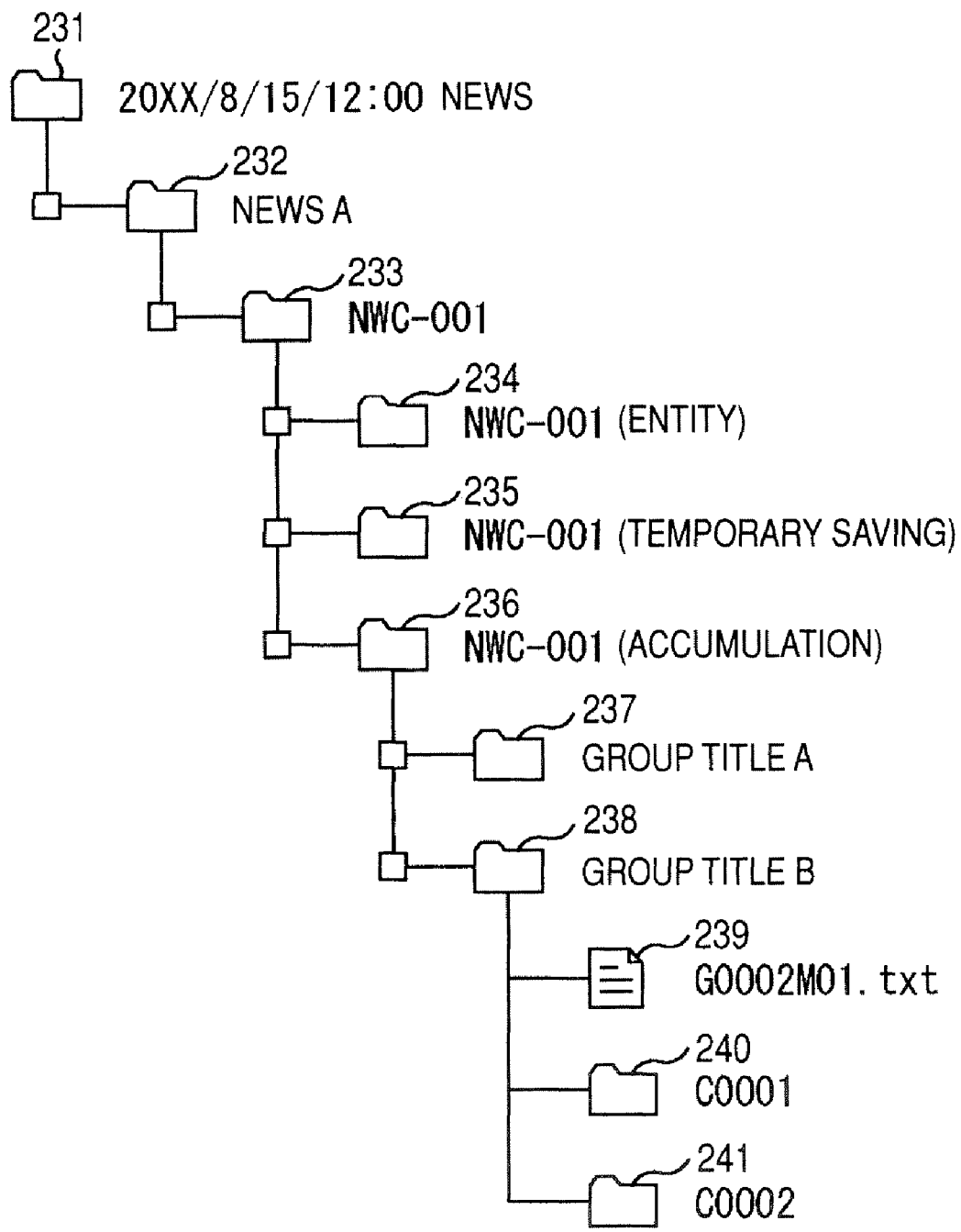
FIG. 8 is a diagram showing an example of a screen that shows a directory structure of files recorded in recording unit.

FIG. 8 shows an example of a screen showing a directory structure of files, which are recorded in the recording unit 208, displayed on the output unit 207 of the material using apparatus 29 in FIG. 4.

Directories shown in FIG. 8 are created by the edition operators performing work for creation in step S7 in FIG. 2.

As shown in FIG. 8, a program directory 231 is provided in the recording unit 208. In this program directory 231, files of clips forming a television program are subordinate directories. In the example in FIG. 8, in the program directory 231, files of clips forming a news program at noon on Aug. 15, 20XX are provided in subordinate directories.

A news A directory 232 corresponding to a frame in the news program is provided in the program directory 231. Directories of the camcorder 21 that records recording contents forming the news A are provided in subordinate directories of the news A directory 232.

In the example in FIG. 8, one camcorder directory 233 (NWC-001) is provided. An entity directory 234, a temporary saving directory 235, and an accumulation directory 236 are provided under the camcorder directory 233.

File indicating a present (real time) state of the camcorder 21 are provided under the entity directory 234.

Specifically, files (imaginary files) corresponding to data indicating a present operation state of the camcorder 21, present camera block set values of the camcorder 21, material data of a clip being currently acquired or reproduced in the camcorder 21, display of contents and the like of files being currently recorded the removable medium 33 inserted in the camcorder 21, and control (e.g., recording, play, slow play, fast play, and stop) of the camcorder 21 are provided under the entity directory 234.

In this way, since the files indicating a real time state of the camcorder 21 are recorded in the entity directory 234, a user of the material using apparatus 29 can grasp a present recording state in the camcorder 21 according to the entity directory 234.

The entity directory 234 is displayed when the material using apparatus 29 is capable of communicating with the camcorder 21. Consequently, the user of the material using apparatus 29 can recognize whether the material using apparatus 29 is capable of communicating with the camcorder 21.

A symbol of the entity directory 234 only has to be displayed to allow the user to visually recognize whether the material using apparatus 29 is capable of communicating with the camcorder 21. A display method is not limited to the method described above. For example, a color of the symbol of the entity directory 234 displayed may be different when the material using apparatus 29 is incapable of communicating with the camcorder 21 and when the material using apparatus 29 is capable of communicating with the camcorder 21.

A file of operation state data, a file of camera set values of the camcorder 21, and a file of clips recorded in the movable medium 33 are temporarily provided under the temporary saving directory 235. A file of clips recorded in the temporary saving directory 235 is identical with a file of clips recorded in the accumulation directory 236.

In this way, when the connection of the camcorder 21 and the material using apparatus 29 is suspended and clips are not transmitted from the camcorder 21 to the material using apparatus 29, the user can read out the temporary saving directory 235 and grasp clips recorded in the camcorder 21 at the point when the connection is suspended.

The clips recorded in the removable medium 33 are divided into directories of groups for each of recording contents and managed in the accumulation directory 236.

In the example in FIG. 8, clips of two groups are recorded in the accumulation directory 236. A clip group directory 237, which is a directory of a first group, and a clip group directory 238, which is a directory of a second group, are provided in the accumulation directory 236. As names of the clip group directories 237 and 238, contents (group titles A and B in the example in FIG. 8) of the item "group title" (FIG. 6) of grouping metadata of the first and the second groups corresponding to the directories are used.

Grouping metadata files of the corresponding first and the second groups and directories of clips classified into the first and the second groups are provided under the clip group directories 237 and 238. In the example in FIG. 8, a grouping metadata file 239 of the second group and clip directories 240 and 241 are provided under the clip group directory 238.

The grouping metadata file 239 is the grouping metadata file (G0002M01.txt) in FIG. 5, which is recorded in the removable medium 33, transmitted to and recorded in the material using apparatus 29. The clip directories 237 and 238 are the clips of the clip directories (C0001 and C0002) in FIG. 5, which are recorded in the removable medium 33, transmitted to and recorded in the material using apparatus 29.

In the following description, when it is unnecessary to distinguish the clip group directories 237 and 238 from each other, the clip group directories 237 and 238 are collectively referred to as the clip group directory 238. When it is unnecessary to distinguish the clip directories 240 and 241 from each other, the clip directories 240 and 241 are collectively referred to as the clip directory 240.

In the example in FIG. 8, the clip directory 240 is classified and recorded in the clip group directory 137 for each recording ID. However, the clip directory 240 may be classified and recorded in a directory for each cameraman or a keyword of a recording instruction (e.g., interview or site photographing). In this case, the clip directory 240 is classified on the basis of a detail of the item "executed" of the item "photographer" of the grouping metadata (FIG. 6) of the group into which the clips of the clip directory 240 are classified and a detail of the item "instructed" of the item "photographing contents".

Details of the entity directory 234 in FIG. 8 will be explained with reference to FIG. 9.

Figure 9:
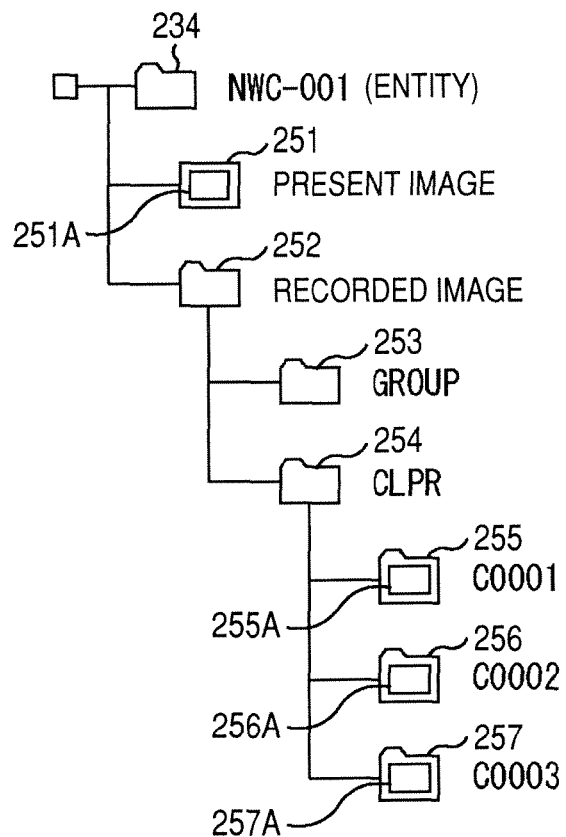
FIG. 9 is a diagram showing a structure of an entity directory in FIG. 8.

In FIG. 9, a present image file 251 and a recorded image directory 252 are provided under the entity directory 234.

The present image file 251 is a file (an imaginary file) corresponding to material data being currently acquired (photographed) by the camera block 51. A thumbnail image, which is a still image corresponding to image data for a fixed time, in image data being currently acquired by the camera block 51 is displayed in a display area 251A in a symbol of the present image file 251.

The recorded image directory 252 is a directory corresponding to directories of files recorded in the removable medium 33. In other words, a group directory 253 corresponding to the group directory 215 provided in the removable medium 33 and a clip root directory 254 corresponding to the clip root directory (CLPR) in FIG. 5 are provided under the recorded image directory 252.

Clip directories 255 to 257 corresponding to the clip directories (C0001 to C0003) in FIG. 5 are provided under the clip root directory 254. Thumbnail images in predetermined frames of image data of clips of the clip directories 255 to 257 are displayed in display areas 255A to 257A in symbols of the clip directories 255 to 257.

Figure 10:
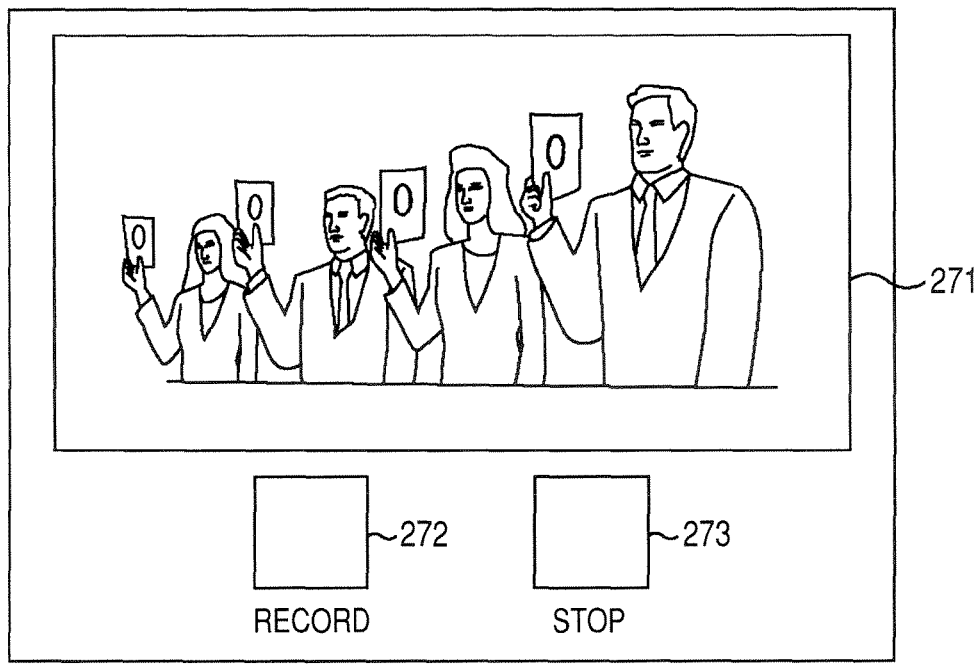
FIG. 10 is a diagram showing an example of a screen displayed when a present image file is opened.

When the user operates the input unit 206 in FIG. 4 and double-clicks the present image file 251, a screen shown in FIG. 10 is displayed (presented) on the output unit 207.

As shown in FIG. 10, a display section 271, a record button 272, and a stop button 273 are displayed on the output unit 207. An image corresponding to image data being currently acquired by the camera block 51 is displayed in the display section 271. The user operates the record button 272 when the user instructs recording of material data, which corresponds to the image displayed in the display section 271, in the removable medium 33. The user operates the stop button 273 when the user instructs stop of the recording.

Figure 11:
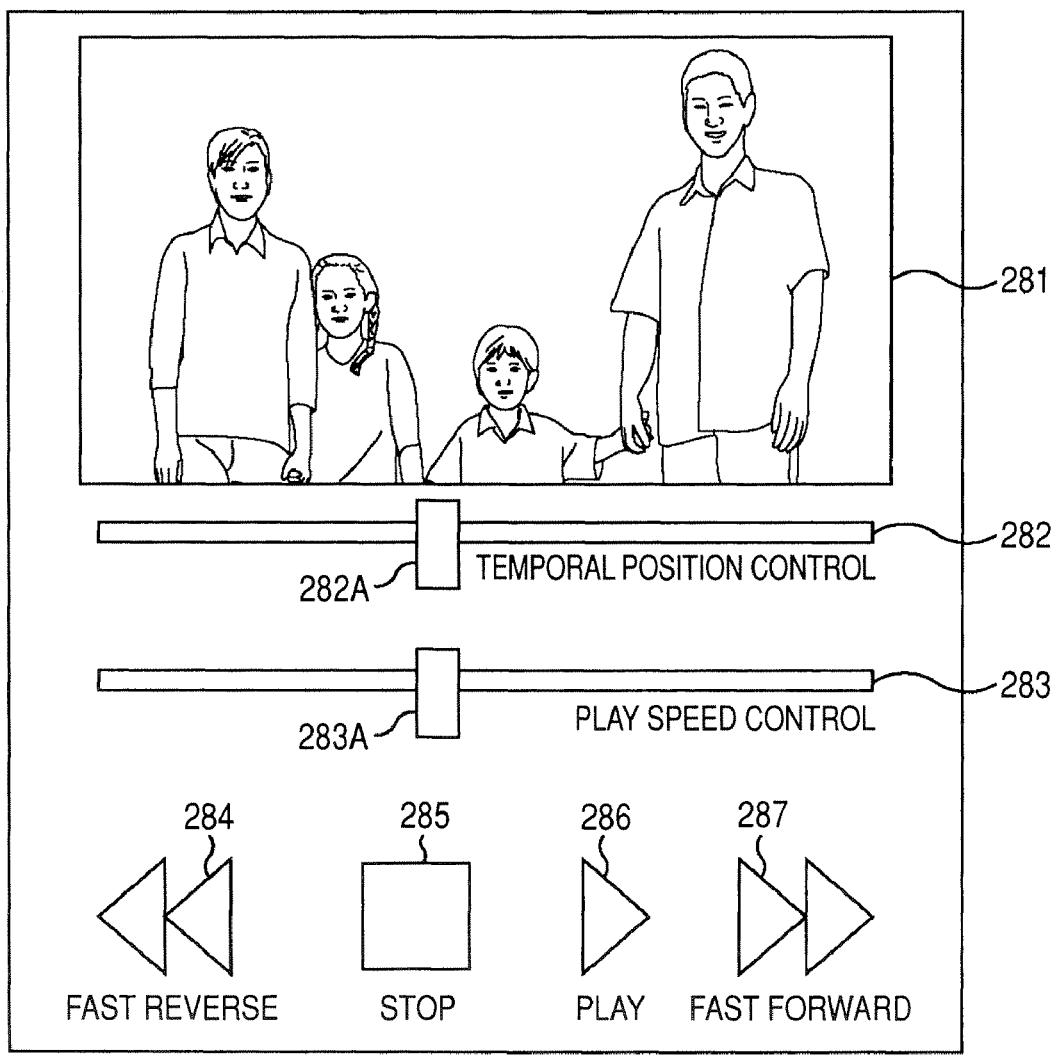
FIG. 11 is a diagram showing an example of a screen displayed when a clip directory is opened.

When the user operates the input unit 206 and double-clicks the clip directories 255 to 257 in FIG. 9, a screen shown in FIG. 11 is displayed on the output unit 207.

As shown in FIG. 11, a display section 281, a temporal position control bar 282, a play speed control bar 283, a fast reverse button 284, a stop button 285, a play button 286, and a fast forward button 287 are displayed on the output unit 207.

An image based on the image file (C0001V01.MXF or C0002V02.MXF) of the clip directory (C0001 or C0002) corresponding to the clip directories 255 to 257, which is recorded in the removable medium 33, is displayed in the display section 281. The user operates temporal position control bar 282 when the user designates a time stamp of image data corresponding to the image displayed in the display section 281. Specifically, the user moves a knob 282A provided in the temporal position control bar 282 to designate (change) the time stamp of the image data corresponding to the image displayed in the display section 281.

The user operates the play speed control bar 283 when the user designates play speed for reproducing image data from the removable medium 33. Specifically, the user moves a knob 283A provided in the play speed control bar 283 to designate (change) play speed. For example, the user moves the knob 283A to the center of the play speed control bar 283 to designate play speed zero, that is, stop. The user moves the knob 283A in the right direction to designate play speed of play in the regular direction and moves the knob 283A in the left direction to designate play speed of play in the reverse direction.

The user operates the fast reverse button 284 when the user reversely reproduces image data from the removable medium 33 at high speed and displays an image corresponding to the image data reversely reproduced in the display section 281. The user operates the stop button 285 when the user stops the reproduction of the image data from the removable medium 33. The user operates the play button 296 when the user reproduces image data from the removable medium 33 at normal speed and displays an image corresponding to the image data reproduced in the display section 281.

The user operates the fast forward button 285 when the user reproduces image data from the removable medium 33 at high speed and displays an image corresponding to the image data reproduced in the display section 281.

Figure 12:
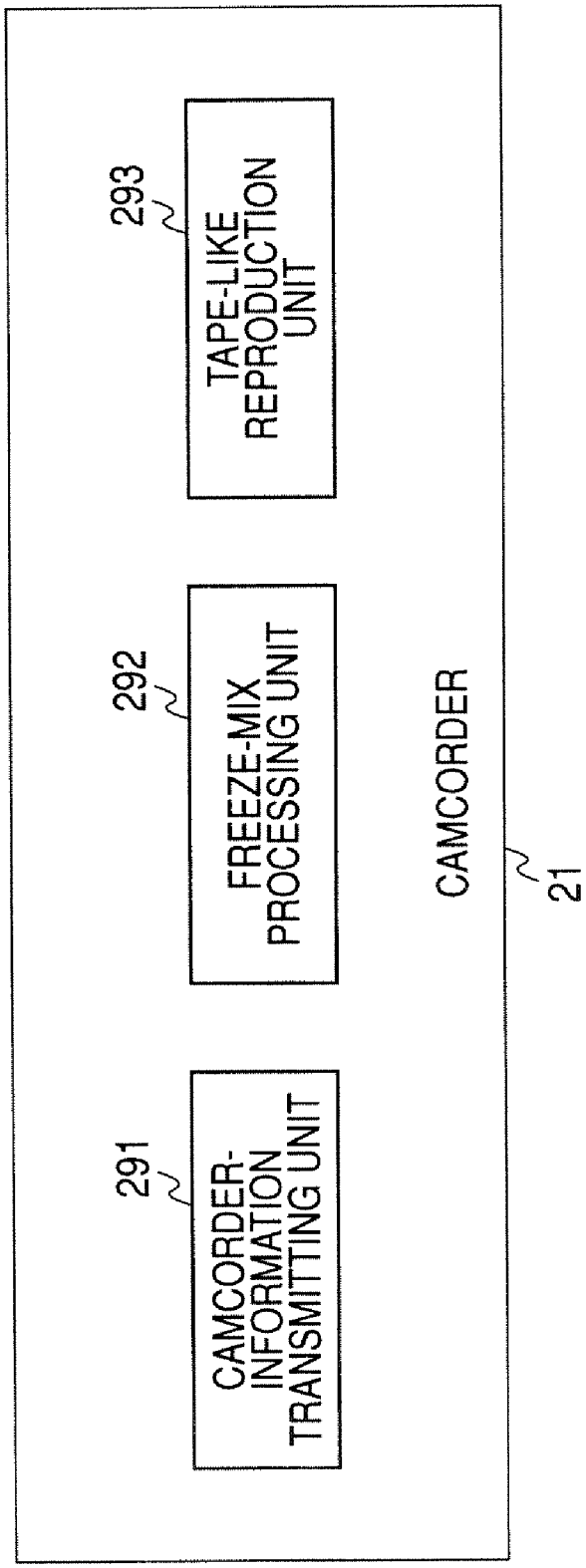
FIG. 12 is a block diagram showing an example of a functional structure of the camcorder.

FIG. 12 is a block diagram showing an example of a functional structure of the camcorder 21 in FIG. 3.

The camcorder 21 in FIG. 12 includes a camcorder-information transmitting unit 291, a freeze-mix processing unit 292, and a tape-like reproduction unit 293.

The camcorder-information transmitting unit 291 transmits a file recorded in the removable medium 33 and state information indicating a real time state of the camcorder 21.

The freeze-mix processing unit 292 performs freeze-mix on the basis of a freeze-mix image transmitted from the material using apparatus 29.

The tape-like reproduction unit 293 performs tape-like reproduction of clips recorded in the removable medium 33. The tape-like reproduction unit reproduction of the clips in an order of recording in the removable medium 33.

FIG. 13 is a block diagram showing an example of a detailed structure of the camcorder-information transmitting unit 291 in FIG. 12.

The camcorder-information transmitting unit 291 in FIG. 13 includes a material-data acquiring unit 300, a proxy-image-data acquiring unit 301, a sampling-thumbnail-image-data acquiring unit 302, a metadata acquiring unit 303, a state acquiring unit 304, a creating unit 305, a transmitting unit 306, a receiving unit 307, a control unit 308, a list managing unit 309, and a list storing unit 310.

The material-data acquiring unit 300, the proxy-image-data acquiring unit 301, the metadata acquiring unit 303, the state acquiring unit 304, the creating unit 305, the control unit 308, the list managing unit 309, and the list storing unit 310 correspond to, for example, the microcomputer 106 in FIG. 3. The transmitting unit 306 and the receiving unit 307 correspond to, for example, the communication block 53.

The material-data acquiring unit 300 reproduces the files (C0001V01.MXF to C0001A08.MXF) of material data of clips from the removable medium 33 and acquires the material data of the clips. The material-data acquiring unit 300 supplies the material data of the clips to the transmitting unit 306 and supplies representative image data of the clips to the creating unit 305. The representative image data is, for example, top image data, image data of a frame of an essence mark (electronic mark) added to image data, image data for every fixed time, and the like.

The proxy-image-data acquiring unit 301 reproduces the proxy image data file (C0001S01.MXF) from the removable medium 33 and acquires proxy image data. The proxy-image-data acquiring unit 301 supplies the proxy image data to the transmitting unit 306.

The sampling-thumbnail-image-data acquiring unit 302 reproduces the sampling thumbnail image file (C0001T01.JPG) from the removable medium 33 and acquires sampling thumbnail image data. The sampling-thumbnail-image-data acquiring unit 302 supplies the sampling thumbnail image data to the transmitting unit 306.

The metadata acquiring unit 303 reproduces the grouping metadata files (G0001M01.txt to G0003M01.txt), the non-real time metadata file (C0001M01.XML), and the real time metadata file (C0001R01.BIM) from the removable medium 33 and acquires grouping metadata, non-real time metadata, and real time metadata. The metadata acquiring unit 303 supplies the grouping metadata to the transmitting unit 306 and supplies the non-real time metadata and the real time metadata to the transmitting unit 306 as clip metadata. The metadata acquiring unit 303 reproduces and acquires directory information indicating the directory structure (FIG. 5) of the files, which are recorded in the removable medium 33, from the removable medium 33 and supplies the directory information to the transmitting unit 306.

The state acquiring unit 304 reads out and acquires camera set values from the RAM of the microcomputers 83 of the camera block 51. The state acquiring unit 304 creates operation state data on the basis of a camera operation signal from the operation unit 81 and a communication operation signal from the operation unit 131. The state acquiring unit 304 acquires material data of a clip being currently acquired or reproduced. The state acquiring unit 304 supplies the camera set values, the operation state data, and the material data of the clip being currently acquired or reproduced to the transmitting unit 306. Moreover, the state acquiring unit 304 supplies representative image data in the material data of the clip being currently acquired or reproduced to the creating unit 305.

The creating unit 305 creates, on the basis of a result of judgment on whether a transmission time necessary for transmission of proxy image data is equal to or longer than a predetermined time supplied from the transmitting unit 306, a request from the transmitting unit 306, and image data from the material-data acquiring unit 300, thumbnail image data of the image data and supplies the thumbnail image data to the transmitting unit 306. The creating unit 305 creates, in response to a request from the transmitting unit 306, thumbnail image data of image data of a clip being currently acquired or reproduced supplied from the state acquiring unit 304 and supplies the thumbnail image data to the transmitting unit 306.

The transmitting unit 306 calculates, on the basis of the proxy image data from the proxy-image-data acquiring unit 301, a transmission time necessary for transmission of the proxy image data to the material using apparatus 29 and judges whether the transmission time is equal to or longer than the predetermined time. The transmitting unit 306 supplies a result of the judgment to the creating unit 305.

The transmitting unit 306 extracts a type and an apparatus ID of an apparatus as apparatus information from the non-real time metadata of the clip metadata supplied from the metadata acquiring unit 303 and extracts a recording ID from the grouping metadata.

The transmitting unit 306 transmits, on the basis of a transmission list serving as a list of transmission object clips supplied from the list managing unit 309, apparatus information, directory information, metadata, proxy image data, and material data of the clips to the material using apparatus 29 in order according to the FTP. The transmitting unit 306 transmits, according to a result of the judgment on a transmission time, the thumbnail image data supplied from the creating unit 305 instead of the proxy image data. The transmitting unit 306 updates a detail corresponding to the transmitted clip of the item "transmission history" of grouping metadata of the clip to "transmitted". The transmitting unit 306 notifies the list managing unit 309 of completion of the transmission of the transmission object clips.

The transmitting unit 306 transmits, in response to an acquisition request supplied from the receiving unit 307, camera set values, operation state data, material data of the clip being currently acquired or reproduced, or respective data of a clip recorded in the removable medium 33 to the material using apparatus 29 as state information.

Moreover, the transmitting unit 306 requests, in response to an acquisition request from the receiving unit 307, the creating unit 305 to create thumbnail image data of the clip recorded in the removable medium 33 and thumbnail image data of the clip being currently acquired or reproduced. The transmitting unit 306 transmits the thumbnail image data and directory information supplied from the creating unit 305 in response to the request to the material using apparatus 29.

The transmitting unit 306 may exclusively perform transmission of the respective data (including the apparatus information, a recording ID and directory information) of the transmission object clip, the state information, and the thumbnail image data and improve transmission speed.

The receiving unit 307 supplies a control signal for controlling the camcorder 21 transmitted from the material using apparatus 29 to the control unit 308. The receiving unit 307 receives an acquisition request for state information transmitted from the material using apparatus 29 and supplies the acquisition request to the transmitting unit 306. The receiving unit 307 receives acquisition requests for directory information and thumbnail image data and supplies the acquisition requests to the transmitting unit 306.

The control unit 308 controls photographing, recording, deletion, reproduction, or the like on the basis of the control signal from the receiving unit 307. For example, the control unit 308 changes the camera set values held in the RAM of the microcomputer 83 on the basis of the control signal and controls photographing. The control unit 308 deletes a clip recorded in the removable medium 33 according to the control signal. The control unit 308 transmits completion of processing corresponding to the control signal (e.g., processing for controlling photographing, recording, deletion, or reproduction) to the material using apparatus 29 via the transmitting unit 306 when necessary.

The list managing unit 309 extracts an un-transmitted clip on the basis of a detail of the item "transmission history" (FIG. 6) of the item "photographed material" of the grouping metadata of the clip, creates a transmission list with the clip as a transmission object, and supplies the transmission list to the list storing unit 310.

The list managing unit 309 reads out a transmission list from the list storing unit 310 and supplies the transmission list to the transmitting unit 306. The list managing unit 309 deletes the transmission list stored in the list storing unit 310 according to the notification of completion of transmission of the transmission object clip supplied from the transmitting unit 306. The list storing unit 310 stores the transmission list from the list managing unit 309.

FIG. 14 is a block diagram showing an example of a functional structure of the material using apparatus 29 in FIG. 4.

The material using apparatus 29 in FIG. 14 includes a camcorder-information managing unit 311 and a freeze-mix transmitting unit 312.

The camcorder-information managing unit 311 manages files recorded in the removable medium 33 and state information, which are transmitted from (the transmitting unit 306 of) the camcorder-information transmitting unit 291 in FIG. 12.

The freeze-mix transmitting unit 312 transmits an image designated by the user among the images (the data) recorded in the recording unit 208 in FIG. 4 to the freeze-mix processing unit 292 of the camcorder 21 as a freeze-mix image.

FIG. 15 is a block diagram showing an example of a detailed structure of the camcorder-information managing unit 311 in FIG. 14.

The camcorder-information managing unit 311 in FIG. 15 includes a state acquiring unit 321, a state recording unit 322, a deleting unit 323, a data acquiring unit 324, a data recording unit 325, a display control unit 326, an input unit 327, and a control unit 328. The state acquiring unit 321, the deleting unit 323, the data acquiring unit 324, the display control unit 326, and the control unit 328 correspond to, for example, the CPU 201 in FIG. 4. The state recording unit 322 corresponds to, for example, the RAM 203. The data recording unit 322 corresponds to, for example, the recording unit 208. The input unit 327 corresponds to, for example, the input unit 206.

The state acquiring unit 321 transmits an acquisition request for state information to the receiving unit 307 of the camcorder 21 according to a command from the input unit 327. The state acquiring unit 321 transmits an acquisition request for directory information and thumbnail image data to the receiving unit 307 of the camcorder 21.

Moreover, the state acquiring unit 321 acquires (receives) state information, directory information, thumbnail image data of the clips recorded in the removable medium 33, and thumbnail image data of a clip being currently acquired or reproduced, which are transmitted from the transmitting unit 306 in FIG. 13, and supplies the state information, the directory information, and the thumbnail image data to the state recording unit 322. The state acquiring unit 321 supplies camera set values and operation state data in the state information to the data recording unit 325.

The state recording unit 322 records the state information, the directory information, the thumbnail image data of the clips recorded in the removable medium 33, and the thumbnail image data of the clip being currently acquired or reproduced, which are supplied from the state acquiring unit 321.

The deleting unit 323 deletes respective data of a clip deleted from the removable medium 33, which is recorded in the temporary saving directory 235 of the data recording unit 325, according to notification of completion of deletion transmitted from the transmitting unit 306. The data acquiring unit 324 acquires respective data of a clip supplied from the transmitting unit 306 and supplies the data to the data recording unit 325.

The data recording unit 325 records the respective data of the clip from the data acquiring unit 324 in the temporary saving directory 235 and the accumulation directory 236 in FIG. 8. The data recording unit 325 records the camera set values and the operation state data from the state acquiring unit 321 in the temporary saving directory 235.

When a volume of data recordable in the accumulation directory 236 is determined, the data acquiring unit 324 may read out clips, which have been recorded for a predetermined number of days or more after being acquired (photographed) by the camcorder 21, in the clip directory 240 recorded in the accumulation directory 236, transmits the clips to the material server 28 or the like in FIG. 1, and causes the material server 28 or the like to store the clips. For example, when the predetermined number of days is one, only the clip directory 240 of clips acquired today (a present date) is recorded in the accumulation directory 236. As a result, it is possible to collectively display only the clip directory 240 of the clips acquired today on the screen in FIG. 8.

The data acquiring unit 324 controls the display control unit 326 according to an acquisition state (a reception state) of the respective data of the clips and notifies the user of the reception state of the clips.

The display control unit 326 reads out the state information recorded in the state information or material data of the clip being currently acquired or reproduced, which are recorded in the state recording unit 322, according to a command from the input unit 327 and causes the output unit 207 (FIG. 4) to display an image on the basis of the state information or the material data. The display control unit 326 reads out the respective data of the clips recorded in the data recording unit 325 according to a command from the input unit 327 and causes the output unit 207 to display an image on the basis of the data.

The input unit 327 receives operation from the user and supplies a command corresponding to the operation to the state acquiring unit 321, the display control unit 326, or the control unit 328. The control unit 328 generates a control signal for controlling the camcorder 21 according to a command from the input unit 327 and transmits the control signal to (the receiving unit 307 of) the camcorder 21.

Communication of the material data of the clip being currently acquired of the state information will be explained with reference to FIGS. 16A and 16B.

FIG. 16A is a diagram for explaining transmission of the material data of the clip being currently acquired in the transmitting unit 306 of the camcorder 21. In FIG. 16A, it is assumed that frames #1 to #4 of the material data are acquired in order. A frame #i indicates an ith frame acquired.

As shown in FIG. 16A, the transmitting unit 306 adds an error correction code to each frame of image data of the clip being currently acquired and transmits the material data in frame units. When the image data is encoded in the MPEG system, the error correction code may be added for each GOP.

As shown in FIG. 16A, when a frame #1 of the material data is acquired, the transmitting unit 306 starts transmission conforming to a UDP of the frame #1. When frames #2 and #3 of the material data are acquired and acquisition of a frame #4 is started by the time when the transmission of the frame #1 is completed, the transmitting unit 306 starts, after the end of the transmission of the frame #1, transmission conforming to a UDP of a frame acquired immediately before the end of the transmission of the frame #1 (in the case of the example in FIG. 16A, the frame #3). In other words, the transmitting unit 306 does not transmit the frame #2.

As described above, the transmitting unit 306 transmits only a frame acquire immediately before the start of transmission of a new frame (the end of transmission of a previous frame) rather than transmitting all the frames of the material data in an order of acquisition. Thus, even when communication speed in the network 31 is low and plural frames are acquired by the time when transmission of one frame of the material data is completed, it is possible to transmit a frame acquired latest. In other words, it is possible to transmit the material data acquired on a real time basis.

Since the transmitting unit 306 transmits a frame in accordance with a UDP, it is possible to reduce loads in transmission processing and transmit the frame quickly.

FIG. 16B is a diagram for explaining reception (acquisition) of the material data of the clip being currently acquired in the state acquiring unit 321 of the material using apparatus 29. In FIG. 16B, it is assumed that frames #11 to #14 of the material data are received in order. A frame #j indicates a jth frame received from the camcorder 21.

As shown in FIG. 16B, the state acquiring unit 321 supplies the material data received from the camcorder 21 to the display control unit 326 via the state recording unit 322. The display control unit 326 displays, on the basis of image data of the material data supplied from the state acquiring unit 321, an image corresponding to the image data for a predetermined time (e.g., time corresponding to one frame or one GOP) in the display section 271 in FIG. 10.

Specifically, as shown in FIG. 16B, when a frame #11 of the material data is received from the state acquiring unit 321 as the material data of the clip being currently acquired, the display control unit 326 starts display of an image corresponding to the frame #11. When frames #12 and #13 of the material data are received in the state acquiring unit 321 and reception of a frame #14 is started by the time when the display of the frame #11 is completed, the display control unit 326 starts, after the end of the display of the image corresponding to the frame #11, display of an image corresponding to a frame received immediately before the end of the display of the image (in the case of the example in FIG. 16B, the frame #13). In other words, the display control unit 326 does not display an image corresponding to the frame #12.

In this way, the display control unit 326 displays only an image corresponding to a frame received immediately before the start of display of an image corresponding to a new frame (the end of display of an image corresponding to a previous frame) rather than displaying images corresponding to all the frames received as the material data of the clip being currently acquired in an order of reception of the frames. Thus, even when communication speed in the network 31 is high and plural frames are received by the time when display of an image corresponding to one frame of the material data is completed, it is possible to display an image corresponding to a frame received latest. In other words, it is possible to display an image corresponding to the material data received on a real time basis.

In FIGS. 16A and 16B, the communication of the material data being currently acquired is explained. However, the same holds true for communication of material data being currently reproduced.

Display processing in which the material using apparatus 29 displays the present image file 251 in FIG. 9 will be explained with reference to FIG. 17. This display processing is started when the user designates (clicks) the entity directory 234 in FIG. 8.

In step S21, the state acquiring unit 321 of the material using apparatus 29 requests the camcorder 21 to acquire directory information, thumbnail image data of the clips recorded in the removable medium 33, and thumbnail image data of the clip being currently acquired or reproduced. The state acquiring unit 321 proceeds to step S22.

In step S41, the receiving unit 307 of the camcorder 21 receives the acquisition request from the state acquiring unit 321 and supplies the acquisition request to the creating unit 305 via the transmitting unit 306. The creating unit 305 creates, on the basis of the acquisition request, image data from the material-data acquiring unit 300, and image data from the state acquiring unit 304, thumbnail image data of the clips recorded in the removable medium 33 and thumbnail image data of the clip being currently acquired or reproduced and supplies the thumbnail image data to the transmitting unit 306.

After the processing in step S41, the transmitting unit 306 proceeds to step S42. The transmitting unit 306 transmits the thumbnail image data of the clips recorded in the removable medium 33, the thumbnail image data of the clip being currently acquired or reproduced, and the directory information, which are supplied from the creating unit 305, to the material using apparatus 29. The transmitting unit 306 proceeds to step S43.

In step S22, the state acquiring unit 321 of the material using apparatus 29 receives the directory information, and the thumbnail image data of the clips recorded in the removable medium 33, and the thumbnail image data of the clip being currently acquired or reproduced, supplies the directory information and the thumbnail image data to the state recording unit 322, and causes the state recording unit 322 to store the same. After the processing in step S22, the state acquiring unit 321 proceeds to step S23. The display control unit 326 reads out the directory information, the thumbnail image data of the clips recorded in the removable medium 33, and the thumbnail image data of the clip being currently acquired or reproduced, which are stored in step S22, and causes the output unit 207 to display the screen shown in FIG. 9 on the basis of the directory information and the thumbnail image data.

At this point, the user operates the input unit 327 (206) and double-clicks a desired symbol among the symbol of the present image file 251 and the symbols of the clip directories 255 to 257 in FIG. 9. It is assumed that the user has double-clicked the present image file 251.

After the processing in step S23, the state acquiring unit 321 proceeds to step S24. The state acquiring unit 321 requests the camcorder 21 to acquire material data of the clip being currently acquired according to a command corresponding to the operation of the input unit 327 by the user. The state acquiring unit 321 proceeds to step S25.

In step S43, the receiving unit 307 receives the acquisition request for the material data of the clip being currently acquired from the state acquiring unit 321 and supplies the acquisition request to the transmitting unit 306. The transmitting unit 306 proceeds to step S44. In step S44, the transmitting unit 306 transmits the material data of the clip being currently acquired in the state information supplied from the state acquiring unit 304 to the material using apparatus 29 and proceeds to step S45.

In step S25, the state acquiring unit 321 receives the material data of the clip being currently acquired, which is transmitted from the transmitting unit 306, supplies the material data to the state recording unit 322, causes the state recording unit 322 to store the material data, and proceeds to step S26. In step S26, the display control unit 326 displays the screen shown in FIG. 10 on the basis of the material data stored in step S25. Consequently, an image corresponding to the material data stored in step S25 is displayed on the display section 271 in FIG. 10.

The user operates the input unit 327 and selects a desired button of the record button 272 and the stop button 273. It is assumed that the user has selected the record button 272.

After the processing in step S26, the control unit 328 proceeds to step S27. The control unit 328 transmits a control signal for causing the camcorder 21 to record respective data of the clip being currently acquired to the camcorder 21 according to a command from the input unit 327 and completes the processing.

In step S45, the receiving unit 307 supplies the control signal transmitted from the control unit 328 to the control unit 308. The control unit 328 proceeds to step S46. In step S46, the control unit 308 causes the removable medium 33 to record the respective data of the clip being currently acquired according to the control signal and completes the processing.

Figure 17:
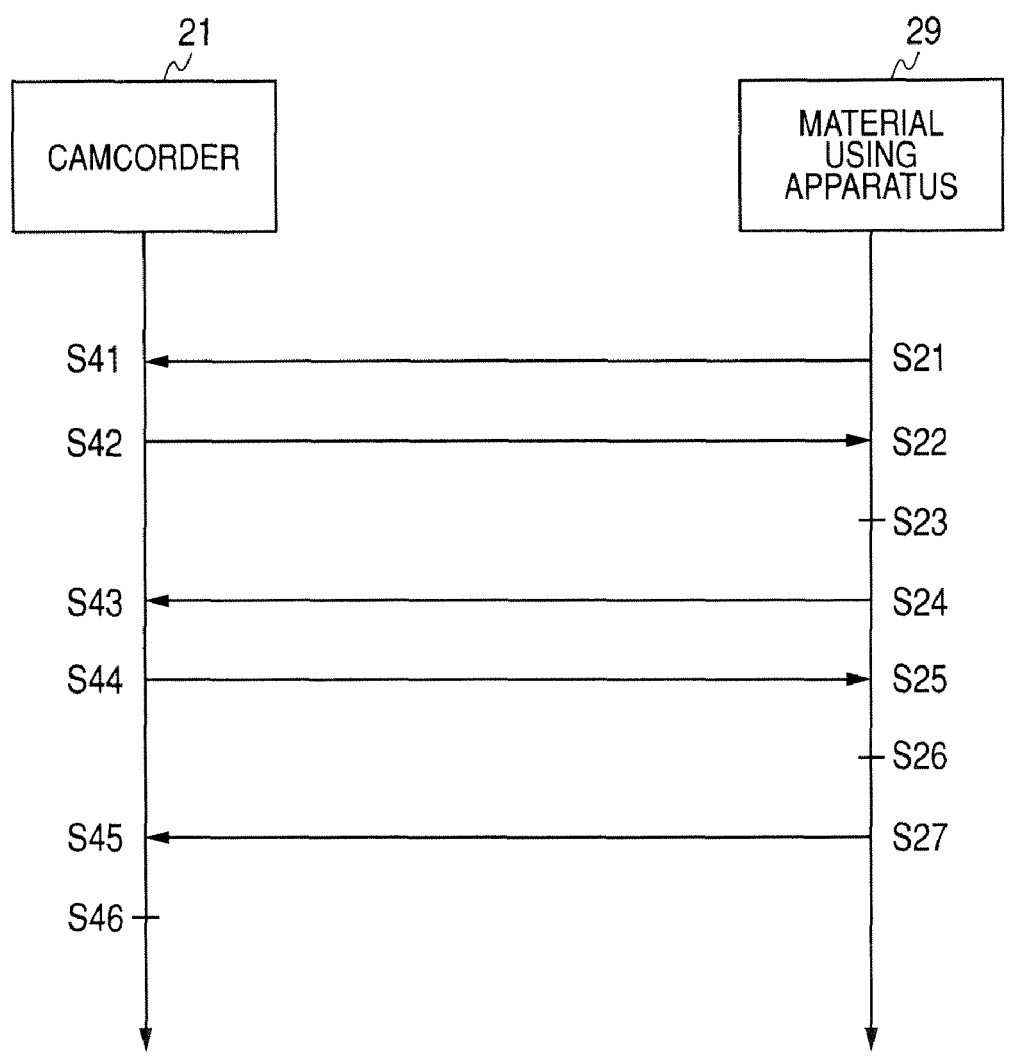
FIG. 17 is a flowchart for explaining display processing.

In FIG. 17, it is assumed that the user double-clicks the present image file 251. However, when the user double-clicks the clip directories 255 to 257, the state acquiring unit 321 requests acquisition of material data of the clip directories (C0001 to C0003) corresponding to the clip directories 255 to 257 recorded in the removable medium 33. The display control unit 326 displays the screen shown in FIG. 11 on the basis of image data of the material data transmitted according to the request. In this screen, when the user operates the input unit 327 to operate the knob 282A or 283B, the fast reverse button 284, the stop button 285, the play button 286, or the fast forward button 287, the control unit 328 transmits a control signal corresponding to a command from the input unit 327 to the camcorder 21. The control unit 308 controls reproduction of a clip directory according to this control signal.

In FIG. 17, it is assumed that the user selects the record button 272. However when the user selects the stop button 273, the same processing is performed. The control unit 308 transmits a control signal for stopping recording of the respective data of the clip being currently acquired to the camcorder 21. The control unit 328 of the camcorder 21 stops the recording of the respective data of the clip being currently acquired in the removable medium 33 according to the control signal.

File transmission processing in which the camcorder 21 transmits a file recorded in the removable medium 33 will be explained with reference to FIG. 18.

In step S61, the transmitting unit 306 of the camcorder 21 extracts apparatus information from non-real time metadata of a transmission object clip, which is supplied from the metadata acquiring unit 303, extracts a recording ID from clip metadata, and transmits the apparatus information and the recording ID to the material using apparatus 29 together with a reception request for a file.

In step S62, the data acquiring unit 324 of the material using apparatus 29 receives the apparatus information, the recording ID, and the transmission request for a file transmitted from the transmitting unit 306. The data acquiring unit 324 proceeds to step S82. In step S82, the data acquiring unit 324 determines, on the basis of the apparatus information and the recording ID received, a recording destination of the transmission object clip. For example, the data acquiring unit 324 determines the clip group directory 238, which corresponds to the recording ID of the camcorder directory 233 (FIG. 8) corresponding to an apparatus ID of the apparatus information, as a recording destination of the transmission object clip.

After the processing in step S82, the data acquiring unit 324 of the material using apparatus 29 proceeds to step S83. The data acquiring unit 324 requests the camcorder 21 to transmit a file. The data acquiring unit 324 proceeds to step S84.

After the processing in step S61, the receiving unit 307 of the camcorder 21 proceeds to step S62. The receiving unit 307 receives the transmission request for a file transmitted from the data acquiring unit 324 and proceeds to step S63. In step S63, the transmitting unit 306 transmits material data, proxy image data or thumbnail image data, grouping metadata, and clip metadata (including sampling thumbnail image data) in an order of the grouping metadata, the clip metadata, the proxy image data or the thumbnail image data, and the material data.

In step S84, the data acquiring unit 324 of the material using apparatus 29 acquires the grouping metadata, the clip metadata (including the sampling thumbnail image data), the proxy image data or the thumbnail image data, and the material data transmitted from the transmitting unit 306 and causes the recording destination determined in step S82 to record the data as the clip directory 240.

After the processing in step S84, the data acquiring unit 324 proceeds to step S85. The data acquiring unit 324 judges whether the reception has been completed, that is, whether all transmission object clips, which are transmitted from the transmitting unit 306, have been received. When it is judged that the reception has not been completed, the material using apparatus 29 returns to step S84 and repeats the reception. When it is judged in step S85 that the reception has been completed, the processing is completed.

Figure 18:
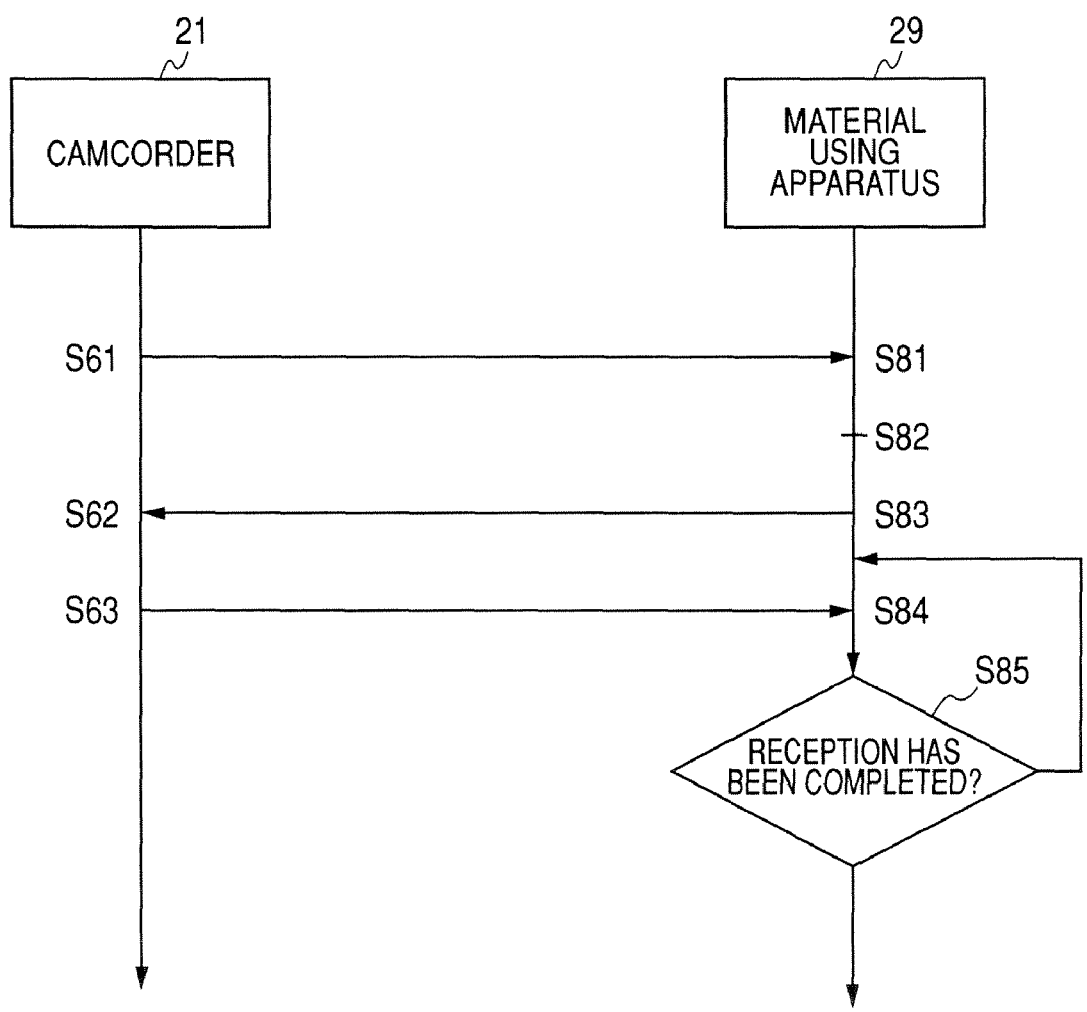
FIG. 18 is a flowchart for explaining file transmission processing.

In the explanation of FIG. 18, the file recorded in the removable medium 33, which is transmitted from the camcorder 21, is recorded in the accumulation directory 236. However, when the file is recorded in the temporary saving directory 235, the same processing is performed.

Figure 19:
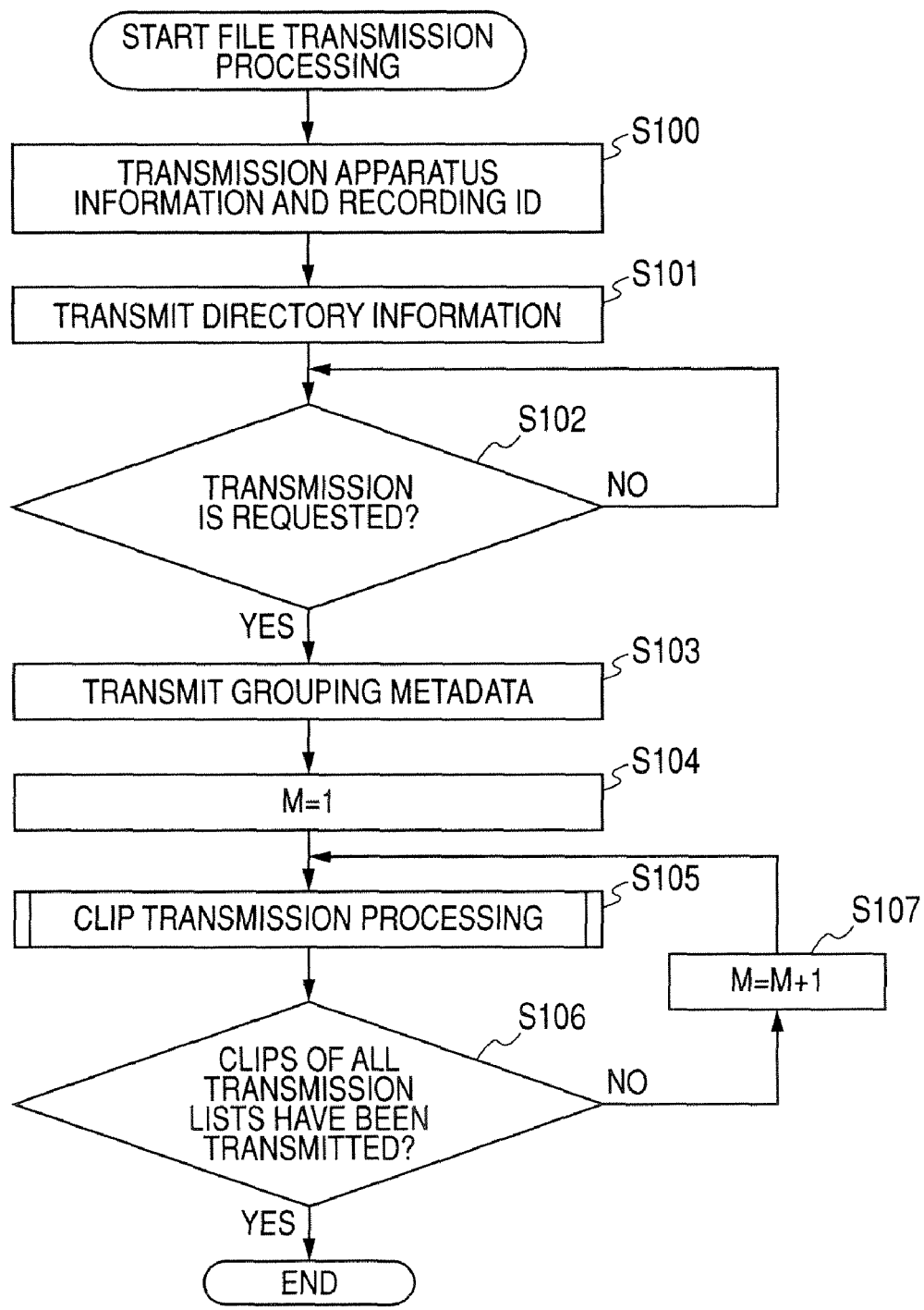
FIG. 19 is a flowchart for explaining the file transmission processing.

File transmission processing, which is processing on the camcorder 21 side in FIG. 18, will be explained in detail with reference to FIG. 19.

In step S100, the transmitting unit 306 transmits apparatus information and a recording ID to the material using apparatus 29 together with a reception request for a file and proceeds to step S101. In step S101, the transmitting unit 306 transmits the directory information to the material using apparatus 29 and proceeds to step S102.

In step S102, the receiving unit 307 judges whether transmission has been requested from the data acquiring unit 324 of the material using apparatus 29 according to the reception request for a file. When it is judged that transmission has not been requested, the receiving unit 307 stands by until it is judged that transmission has been requested.

On the other hand, when it is judged in step S102 that transmission has been requested, the transmitting unit 306 proceeds to step S103. The transmitting unit 306 transmits grouping metadata of all the transmission object clips, which are supplied from the metadata acquiring unit 303, to the material using apparatus 29 and proceeds to step S104.

In step S104, the transmitting unit 306 sets a count value M of a not-shown counter to 1 and proceeds to step S105. In step S105, the transmitting unit 306 performs clip transmission processing for transmitting respective data of all clips registered in an Mth transmission list supplied from the list managing unit 309. This clip transmission processing will be explained in detail using a flowchart in FIG. 20 described later.

After the processing in step S105, the transmitting unit 306 proceeds to step S106. The transmitting unit 306 judges whether clips of all transmission lists stored in the list storing unit 310 have been transmitted. When it is judged that the clips of all the transmission lists have not been transmitted, the transmitting unit 306 proceeds to step S107.

In step S107, the transmitting unit 306 increments the count value M by 1, returns to step S105, and repeats the processing described above. On the other hand, when it is judged in step S106 that the clips of all the transmission lists have been transmitted, the processing is completed.

The clip transmission processing in step S105 in FIG. 19 will be explained with reference to FIG. 20.

In step S121, the transmitting unit 306 sets a count value N of a not-shown counter to 1 and proceeds to step S122. In step S122, the transmitting unit 306 transmits clip metadata of an Nth clip from the top of an Mth transmission list from the top stored in the list storing unit 310 among clip metadata supplied from the data acquiring unit 303 to the material using apparatus 29.

When there is sampling thumbnail image data of the Nth clip from the top of the Mth transmission list from the top in sampling thumbnail image data supplied from the sampling-thumbnail-image-data acquiring unit 302, the transmitting unit 306 also transmits the sampling thumbnail image data to the material using apparatus 29. In this case, the transmitting unit 306 may transmit the sampling thumbnail image data earlier than the clip metadata or may transmit the clip metadata earlier than the sampling thumbnail image data.

After the processing in step S122, the transmitting unit 306 proceeds to step S123. The transmitting unit 306 judges whether clip metadata (including sampling thumbnail image data) of all clips of the Mth transmission list have been transmitted, that is, whether the Nth clip is the last clip of the Mth transmission list. When it is judged that the clip metadata of all the clips of the Mth transmission list have not been transmitted, the transmitting unit 306 proceeds to step S124.

In step S124, the transmitting unit 306 increments the count value N by 1, returns to step S122, and repeats the processing described above. On the other hand, when it is judged in step S123 that the clip metadata of all the clips of the Mth transmission list have been transmitted, the transmitting unit 306 proceeds to step S125.

In step S125, the transmitting unit 306 sets the count value N to 1 again and proceeds to step S126. In step S126, the transmitting unit 306 calculates a transmission time necessary for transmission of proxy image data of the Nth clip from the top of the Mth transmission list on the basis of a size of the proxy image data file (C0001S01.MXF) of the proxy image data and communication speed in the network 31 and the intranet 32.

After the processing in step S126, the transmitting unit 306 proceeds to step S127. The transmitting unit 306 judges whether the transmission time calculated in step S126 is within a set time set in advance and supplies a result of the judgment to the creating unit 305.

When it is judged in step S127 that the transmission time is within the set time set in advance, the transmitting unit 306 proceeds to step S128. The transmitting unit 306 transmits proxy image data of the Nth clip from the top of the Mth transmission list among proxy image data supplied from the proxy-image-data acquiring unit 301 to the material using apparatus 29 and proceeds to step S131.

On the other hand, when it is judged in step S127 that the transmission time is not within the set time, the creating unit 305 proceeds to step S129. The creating unit 305 creates, on the basis of a representative image data of the Nth clip from the top of the Mth transmission list among representative image data of the material data supplied from the material-data acquiring unit 300, thumbnail image data of the image data and supplies the thumbnail image data to the transmitting unit 306.

After the processing in step S129, the transmitting unit 306 proceeds to step S130. The transmitting unit 306 transmits the thumbnail image data from the creating unit 305 to the material using apparatus 29 and proceeds to step S131.

In step S131, the transmitting unit 306 judges whether image data or thumbnail image data of all clips of the Mth transmission list have been transmitted. When it is judged that the image data or the thumbnail image data of all the clips have not been transmitted, the transmitting unit 306 proceeds to step S132.

In step S132, the transmitting unit 306 increments the count value N by 1, returns to step S126, and repeats the processing described above. On the other hand, when it is judged in step S131 that the image data or the thumbnail image data of all the clips have been transmitted, the transmitting unit 306 proceeds to step S133. The transmitting unit 306 sets the count value N to 1 again.

After the processing in step S133, the transmitting unit 306 proceeds to step S134. The transmitting unit 306 transmits material data of the Nth clip of the Mth transmission list among material data supplied from the material-data acquiring unit 300 and proceeds to step S135. In step S135, the transmitting unit 306 judges whether material data of all the clips of the Mth transmission list have been transmitted. When it is judged that the material data of all the clips have not been transmitted, the transmitting unit 306 proceeds to step S136.

In step S136, the transmitting unit 306 increments the count value N by 1, returns to step S134, and repeats the processing described above. On the other hand, when it is judged in step S135 that the material data of all the clips have been transmitted, the transmitting unit 306 proceeds to step S106 in FIG. 19.

As described above, the transmitting unit 306 transmits, earlier than image data, data (metadata, proxy image data, etc.) related to the image data having a data quantity smaller than that of the image data to the material using apparatus 29. Thus, even when a data quantity of the image data is large, the material using apparatus 29 can quickly grasp contents of material data according to the related data transmitted earlier.

Figure 20:
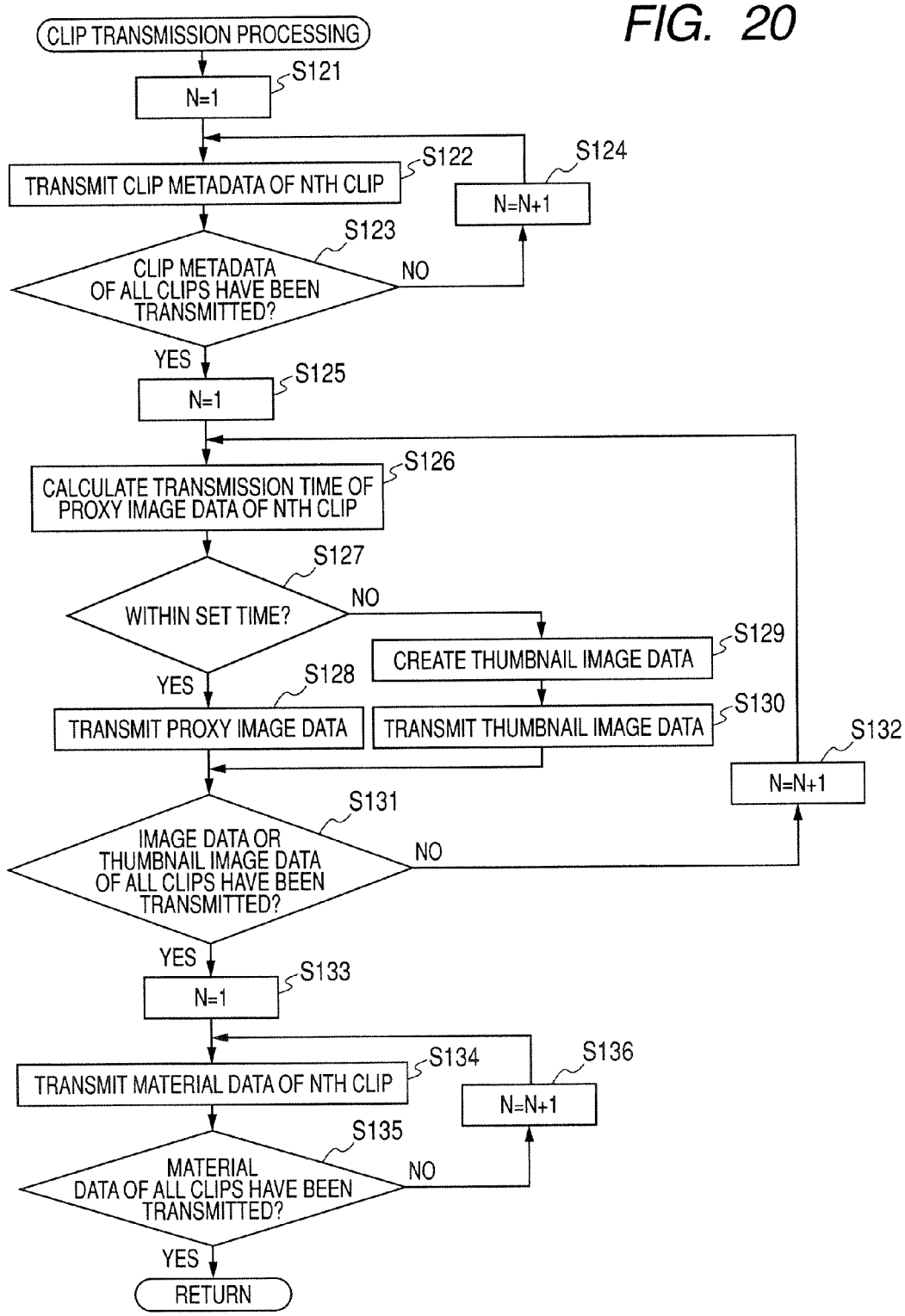
FIG. 20 is a flowchart for explaining clip transmission processing.

In FIG. 20, it is assumed that the set time used for the judgment in step S127 is set in advance. However, the set time does not have to be set in advance. In this case, the transmitting unit 306 proceeds to step S128 without performing the judgment in step S127 and transmits the proxy image data.

File reception processing, which is processing on the material using apparatus 29 side in FIG. 18, will be explained in detail with reference to FIG. 21.

In step S141, the data acquiring unit 324 controls the display control unit 326 to cause the output unit 207 in FIG. 4 to display the screen (FIG. 8) showing a directory structure and changes a color of symbols of all the clip group directories 238 in the screen to gray.

After the processing in step S141, the data acquiring unit 324 proceeds to step S142. The data acquiring unit 324 judges whether a reception request for a file has been transmitted from the transmitting unit 306 of the camcorder 21 in step S100 in FIG. 19. When it is judged that a reception request for a file has not been transmitted, the data acquiring unit 324 stands by until a reception request for a file is transmitted.

On the other hand, when it is judged in step S142 that a reception request for a file has been transmitted, the data acquiring unit 324 proceeds to step S143 and receives apparatus information and a recording ID transmitted together with the reception request for a file. After the processing in step S143, the data acquiring unit 324 proceeds to step S144. The data acquiring unit 324 determines, on the basis of the apparatus information and the recording ID received in step S143, a recording destination of a transmission object clip and proceeds to step S145.

In step S145, the data acquiring unit 324 judges whether all pieces of apparatus information and recording IDs transmitted from the transmitting unit 306 have been received. When it is judged that all the pieces of apparatus information and recording IDs have not been received, the data acquiring unit 324 returns to step S143 and repeats the processing described above.

On the other hand, when it is judged in step S145 that all the pieces of apparatus information and recording IDs have been received, the data acquiring unit 324 proceeds to step S146. The data acquiring unit 324 controls the display control unit 326 to change a color of a symbol of the clip group directory 238, which is a recording destination of the transmission object clip, displayed on the output unit 207 to red. After the processing in step S146, the data acquiring unit 324 proceeds to step S147. The data acquiring unit 324 receives directory information transmitted from the transmitting unit 306 and proceeds to step S148.

In step S148, the data acquiring unit 324 judges whether all pieces of directory information transmitted from the transmitting unit 306 have been received. When it is judged that all the pieces of directory information have not been received, the data acquiring unit 324 returns to step S147 and repeats the processing described above.

When it is judged in step S148 that all the pieces of directory information have been received, the data acquiring unit 324 proceeds to step S149. The data acquiring unit 324 requests the camcorder 21 to transmit respective data of the transmission object clip and proceeds to step S150. In step S150, the data acquiring unit 324 controls the display control unit 326 to change the color of the symbol of the clip group directory 238, which is the recording destination of the transmission object clip, to orange.

After the processing in step S150, the data acquiring unit 324 proceeds to step S151. The data acquiring unit 324 receives grouping metadata transmitted from the transmitting unit 306 and records the grouping metadata in the clip group directory 238, which is the recording destination determined in step S144, as the grouping metadata file 239. After the processing in step S151, the data acquiring unit 324 proceeds to step S152. The data acquiring unit 324 judges whether all grouping metadata transmitted from the transmitting unit 306 have been received. When it is judged that all the grouping metadata have not been received, the data acquiring unit 324 returns to step S151 and repeats the processing described above.

On the other hand, when it is judged in step S152 that all the grouping metadata have been received, the data acquiring unit 324 proceeds to step S153. The data acquiring unit 324 controls the display control unit 326 to change the color of the symbol of the clip group directory 238, which is the recording destination of the transmission object clip, to yellow. After the processing in step S153, the data acquiring unit 324 proceeds to step S154. The data acquiring unit 324 performs clip reception processing for receiving respective data of a clip for each of clips. This clip reception processing will be explained in detail with reference to FIG. 22 described later.

After the processing in step S154, the data acquiring unit 324 proceeds to step S155. The data acquiring unit 324 judges whether respective data of all clips transmitted from the transmitting unit 306 have been received. When it is judged that the respective data of all the clips have not been received, the data acquiring unit 324 stands by until it is judged that the respective data of all the clips have been received.

On the other hand, when it is judged in step S155 that the respective data of all the clips have been received, the data acquiring unit 324 proceeds to step S156. The data acquiring unit 324 controls the display control unit 326 to change the color of the symbol of the clip group directory 238, which is the recording destination of the transmission object clip, to green and completes the processing.

The clip reception processing in step S154 in FIG. 21 will be explained with reference to FIG. 22. This clip reception processing is performed for each clip.

Figure 21:
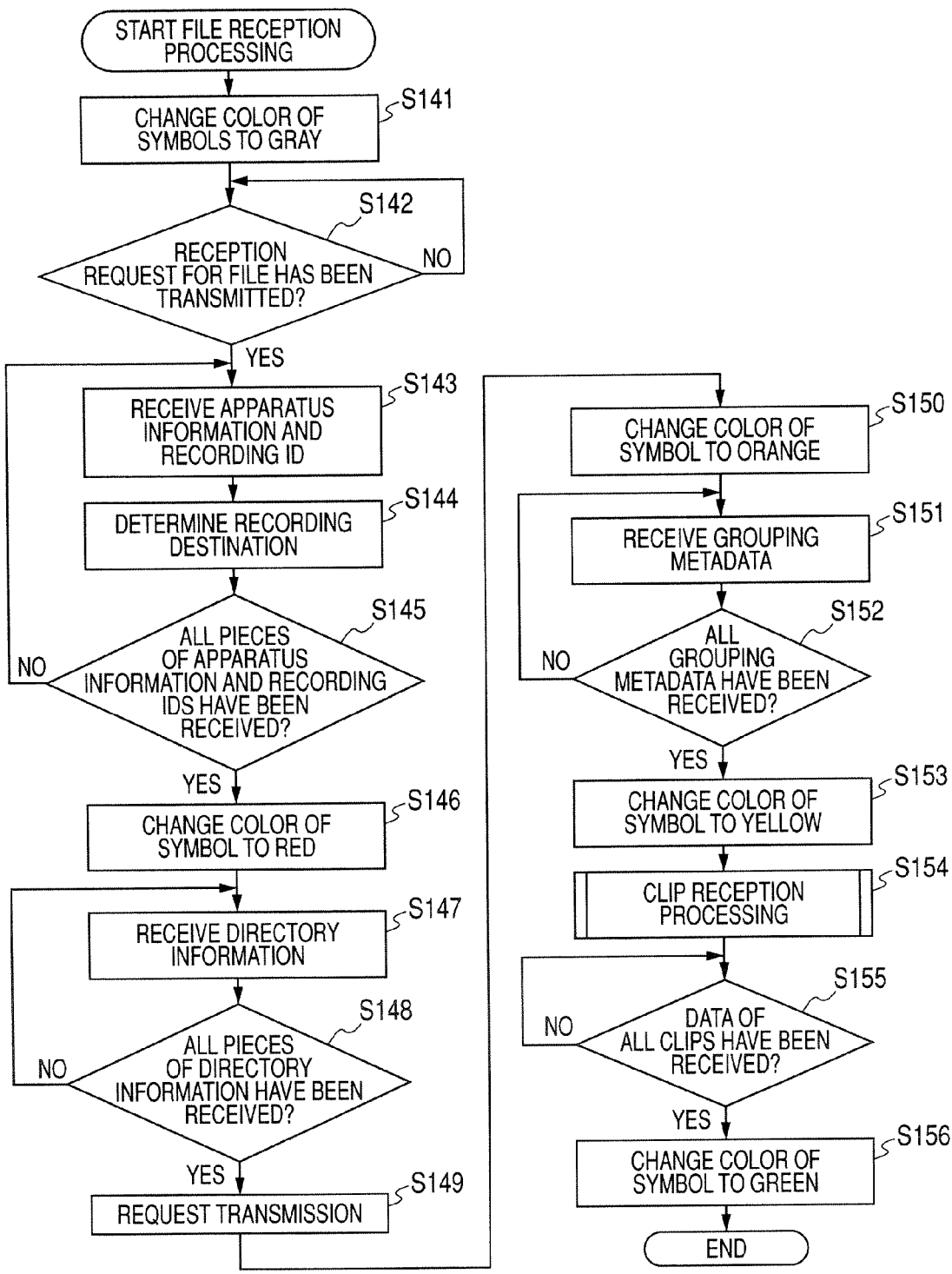
FIG. 21 is a flowchart for explaining file reception processing.

In step S161, the data acquiring unit 324 controls the display control unit 326 on the basis of the grouping metadata received in step S151 in FIG. 21 to display a symbol of the clip directory 240 under the clip group directory 238 and changes a color of the symbol of the clip directory 240 to gray.

After the processing in step S161, the data acquiring unit 324 proceeds to step S162. The data acquiring unit 324 judges whether clip metadata (including sampling thumbnail image data) transmitted from the transmitting unit 306 has been received. When it is judged that clip metadata has not been received, the data acquiring unit 324 stands by until the clip metadata is received. On the other hand, when it is judged in step S162 that the clip metadata has been received, the data acquiring unit 324 proceeds to step S163. The data acquiring unit 324 records the clip metadata in the clip directory 240, which is a recording destination of the clip metadata, as a clip metadata file and changes the color of the symbol of the clip directory 240 to red.

When sampling thumbnail image data is also received, the data acquiring unit 324 records the sampling thumbnail image data in the clip directory 240, which is a recording destination of the sampling thumbnail image data, as a sampling thumbnail image file.

After the processing in step S163, the data acquiring unit 324 proceeds to step S164. The data acquiring unit 324 judges whether thumbnail image data transmitted from the transmitting unit 306 has been received. When it is judge that the thumbnail image data has been received, the data acquiring unit 324 proceeds to step S165. The data acquiring unit 324 records the thumbnail image data in the clip directory 240, which is a recording destination of the thumbnail image data, as a thumbnail image data file and changes the color of the clip directory 240 to orange.

On the other hand, when it is judged in step S164 that thumbnail image data has not been received, the data acquiring unit 324 proceeds to step S166. The data acquiring unit 324 judges whether proxy image data transmitted from the transmitting unit 306 has been received. When it is judged that proxy image data has not been received, the data acquiring unit 324 returns to step S164 and repeats the processing described above.

When it is judged in step S166 that the proxy image data has been received, the data acquiring unit 324 proceeds to step S167. The data acquiring unit 324 records the proxy image data in the clip directory 240, which is a recording destination of the proxy image data, as a proxy image data file and changes the color of the symbol of the clip directory 240 to yellow.

After the processing in step S165 or S167, the data acquiring unit 324 proceeds to step S168. The data acquiring unit 324 judges whether material data transmitted from the transmitting unit 306 has been received. When it is judged that material data has not been received, the data acquiring unit 324 stands by until material data is received. On the other hand, when it is judged in step S168 that the material data has been received, the data acquiring unit 324 proceeds to step S169. The data acquiring unit 324 records the material data in the clip directory 240, which is a recording destination of the material data, as an image file or a music file, changes the color of the symbol of the clip directory 240 to green, and proceeds to step S155 in FIG. 21.

Figure 22:
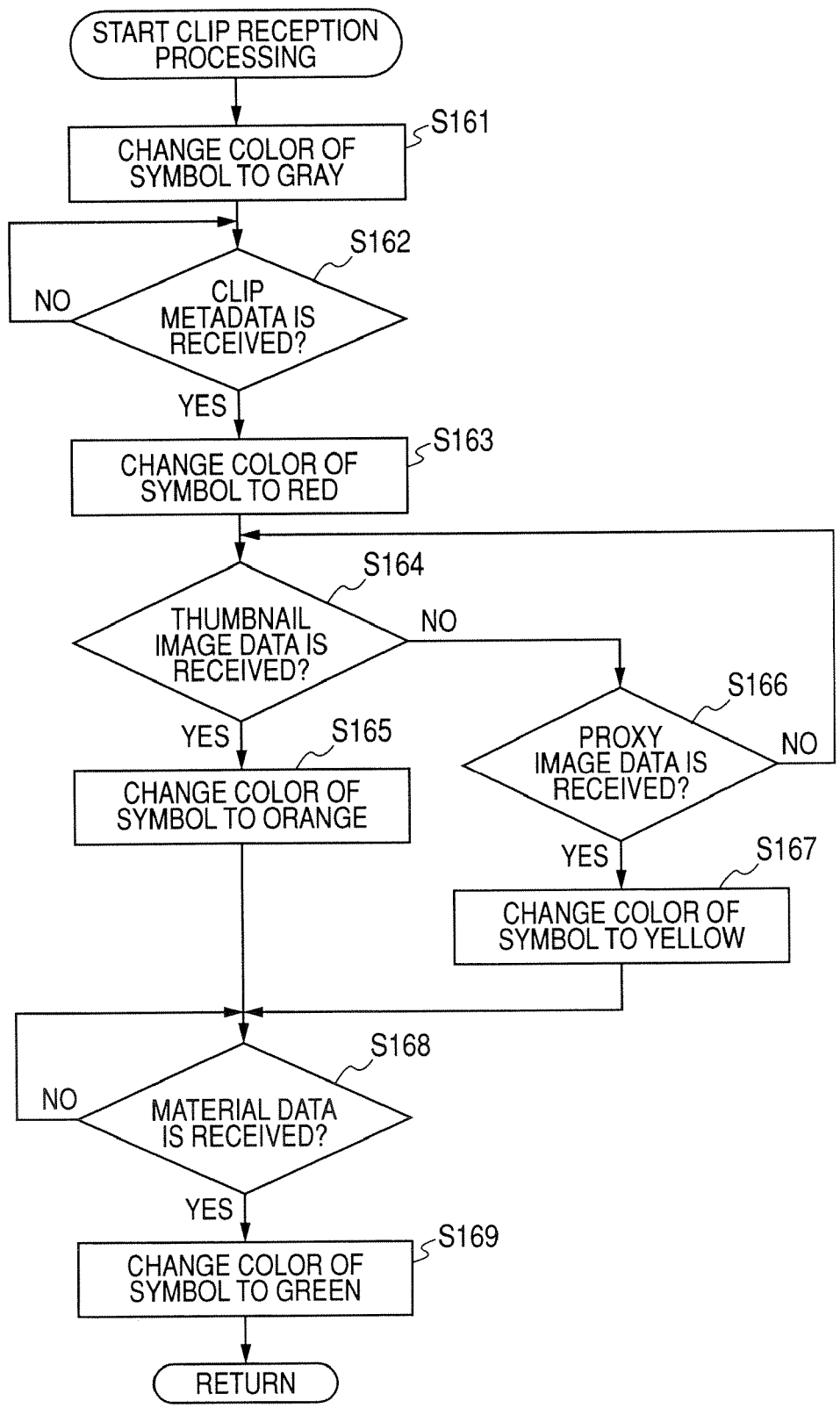
FIG. 22 is a flowchart for explaining clip reception processing.

In FIGS. 21 and 22, a color of a symbol is changed to indicate a transmission state of a file of a directory corresponding to the symbol. However, a method of indicating a transmission state is not limited to this. For example, a message indicating a transmission state of a file of a directory may be displayed around a symbol of the directory.

Deletion processing in which the material using apparatus 29 deletes respective data of a clip recorded in the removable medium 33 will be explained with reference to FIG. 23. This deletion processing is started when the user operates the input unit 327 (FIG. 15) to designate a clip to be deleted.

In step S181, the control unit 328 of the material using apparatus 29 transmits a control signal for causing the camcorder 21 to delete a clip designated as a deletion object by the user to the camcorder 21 according to a command supplied from the input unit 327 and proceeds to step S182.

In step S201, the receiving unit 307 of the camcorder 21 supplies the control signal supplied from the control unit 328 in step S181 to the control unit 308 and proceeds to step S202. In step S202, the control unit 308 deletes the clip to be deleted, which is recorded in the removable medium 33, on the basis of the control signal and notifies the transmitting unit 306 of completion of the deletion. After the processing in step S202, the transmitting unit 306 proceeds to step S203. The transmitting unit 306 notifies the material using apparatus 29 of the completion of the deletion and completes the processing.

In step S182, the deleting unit 323 of the material using apparatus 29 receives the notification of the completion of the deletion and proceeds to step S183. In step S183, the deleting unit 323 deletes respective data of the clip to be deleted in the temporary saving directory 235, which is stored in the data recording unit 325, and completes the processing.

Figure 23:
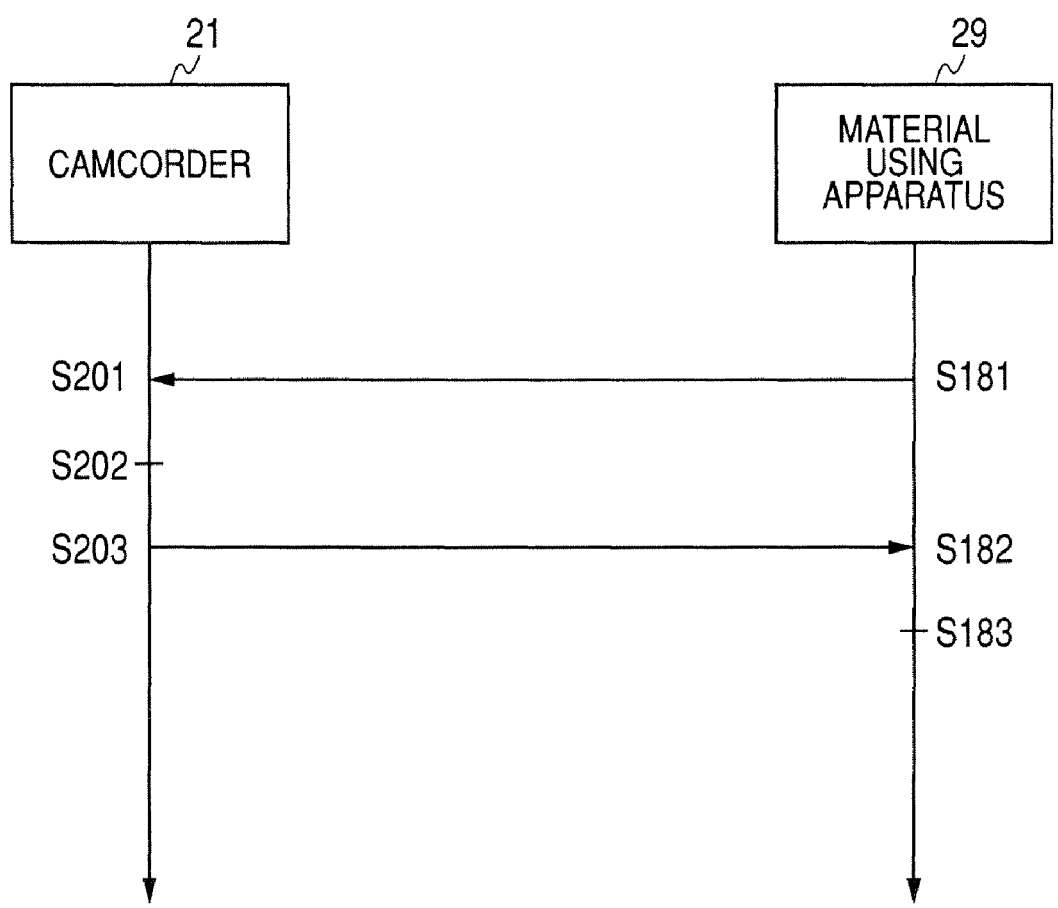
FIG. 23 is a flowchart for explaining deletion processing.

In FIG. 23, when the camcorder 21 receives the control signal for deleting the clip to be deleted from the material using apparatus 29, the camcorder 21 deletes the clip to be deleted. However, it is also possible that the material using apparatus 29 notifies a user of the camcorder 21 that a command for deletion is received from the user of the material using apparatus 29 and the user of the camcorder 21 who has received the notification instructs the camcorder 21 to delete the clip. The user may be allowed to set prohibition of deletion for each clip or each group in the camcorder 21. In this case, the camcorder 21 deletes only a deletion object for which the prohibition of deletion is not set.

In FIG. 23, when a clip to be deleted is designated by the user, the control unit 308 and the deleting unit 323 delete the deletion object. When a clip recorded in the removable medium 33 is copied to the accumulation directory 236, the control unit 308 and the deleting unit 323 may delete the clip.

As described above, when a clip recorded in the removable medium 33 inserted in the camcorder 21 is deleted, a clip recorded in the temporary saving directory 235 of the material using apparatus 29 is deleted but a clip recorded in the accumulation directory 236 is not deleted. In other words, a clip photographed (acquired) by the camcorder 21 is kept saved in the accumulation directory 236.

Therefore, even when a recording capacity of the removable medium 33 is small, the camcorder 21 can perform photographing for a long time by transmitting a clip obtained as a result of photographing and recorded in the removable medium 33 to the material using apparatus 29 and deleting the clip recorded in the removable medium 33.

Figure 24:
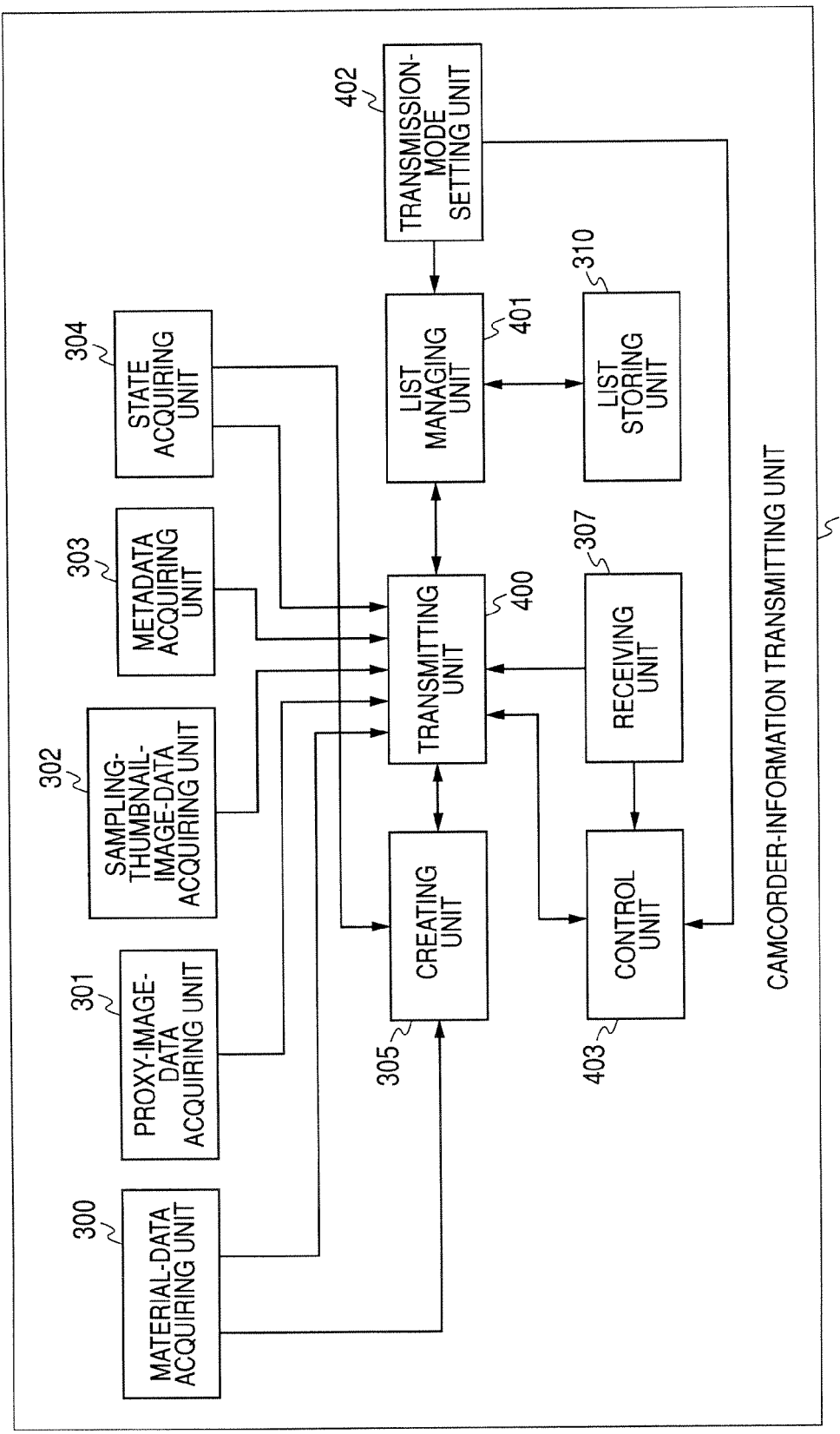
FIG. 24 is a block diagram showing another example of the detailed structure of the camcorder-information transmitting unit.

FIG. 24 is a block diagram showing another example of the detailed structure of the camcorder-information transmitting unit 291 in FIG. 13.

In the camcorder-information transmitting unit 291 in FIG. 24, a transmitting unit 400 and a list managing unit 401 are provided instead of the transmitting unit 306 and the list managing unit 309 and a transmission-mode setting unit 402 is additionally provided. Components identical with those in FIG. 13 are denoted by the identical reference numerals and explanations of the components are omitted to prevent redundant explanations. The transmitting unit 400 corresponds to, for example, the communication block 53 in FIG. 3. The list managing unit 401 and the transmission-mode setting unit 402 correspond to, for example, the microcomputer 106.

In the same manner as the transmitting unit 306 in FIG. 13, the transmitting unit 400 calculates, on the basis of proxy image data from the proxy-image-data acquiring unit 301, a transmission time necessary for transmission of the proxy image data to the material using apparatus 29 and judges whether the transmission time is equal to or longer than a predetermined time. The transmitting unit 400 supplies a result of the judgment to the creating unit 305.

In the same manner as the transmitting unit 306, the transmitting unit 400 extracts apparatus information from non-real time metadata of clip metadata supplied from the metadata acquiring unit 303 and extracts a recording ID from grouping metadata.

In the same manner as the transmitting unit 306, the transmitting unit 400 transmits, on the basis of a transmission list supplied from the list managing unit 401, apparatus information, directory information, metadata, proxy image data, and material data to the material using apparatus 29 in order. The transmitting unit 400 updates a detail corresponding to the transmitted clip of the item "transmission history" of grouping metadata of the clip to "transmitted". The transmitting unit 400 notifies the list managing unit 401 of completion of the transmission of the transmission object clips.

In the same manner as the transmitting unit 306, the transmitting unit 400 transmits, in response to an acquisition request supplied from the receiving unit 307, the camera set values, the operation state data, the material data of the clip being currently acquired or reproduced, or the respective data of the clips recorded in the removable medium 33 to the material using apparatus 29 as state information. The transmitting unit 400 requests, in response to an acquisition request from the receiving unit 307, the creating unit 305 to create thumbnail image data of the clips recorded in the removable medium 33 and thumbnail image data of the clip being currently acquired or reproduced. The transmitting unit 400 transmits the thumbnail image data and directory information supplied from the creating unit 305 in response to the request to the material using apparatus 29.

Moreover, the transmitting unit 400 judges, according to a command from the control unit 403, whether data of the clip recorded in the removable medium 33 is being transmitted. According to a result of the judgment, the transmitting unit 400 calculates a transmission time necessary for transmission of the clip being transmitted. The transmitting unit 400 controls transmission at the start of recording of the clip on the basis of the command from the control unit 403 and the transmission time of the clip being transmitted.

In the same manner as the list managing unit 309 in FIG. 13, the list managing unit 401 extracts an un-transmitted clip on the basis of a detail of the item "transmission history" (FIG. 6) of the item "photographed material" of the grouping metadata of the clips and sets the clip as a transmission object. The list managing unit 401 acquires clip metadata of the transmission object clip from the transmitting unit 400, creates a transmission list on the basis of the clip metadata, and supplies the transmission list to the list storing unit 310. The list managing unit 401 determines a priority of clips registered in the transmission list on the basis of a transmission mode of the clips supplied from the transmission mode setting unit 402. The list managing unit 401 changes the transmission list on the basis of the priority. For example, the list managing unit 401 creates a transmission list in which the clips are arranged from the top of the transmission list in order from one with a highest priority.

In the same manner as the list managing unit 309 in FIG. 13, the list managing unit 401 reads out a transmission list from the list storing unit 310 and supplies the transmission list to the transmitting unit 400. The list managing unit 401 deletes the transmission list stored in the list storing unit 310 according to the notification of completion of transmission of the transmission object clip supplied from the transmitting unit 400.

The transmission-mode setting unit 402 causes an LCD 112 in FIG. 3 to display a screen for setting a transmission mode (FIG. 25 referred to later). The user operates the operation unit 131 in FIG. 3 while looking at the screen to designate a transmission mode. The transmission-mode setting unit 402 sets a transmission mode on the basis of a communication operation signal corresponding to the operation, which is supplied from the operation unit 131, and supplies the transmission mode to the list managing unit 401 and the control unit 403.

In the same manner as the control unit 308 in FIG. 13, the control unit 403 controls photographing, recording, deletion, reproduction, or the like on the basis of a control signal from the receiving unit 307. The control unit 403 deletes a clip recorded in the removable medium 33 according to the control signal. The control unit 403 transmits completion of processing corresponding to the control signal to the material using apparatus 29 via the transmitting unit 400 when necessary.

Moreover, the control unit 403 supplies a command for controlling transmission to the transmitting unit 400 according to the control signal for recording a clip supplied from the receiving unit 307 and the transmission mode from the transmission-mode setting unit 402.

FIG. 25 shows an example of a screen for setting a transmission mode displayed on the LCD 112 in FIG. 3.

On the screen in FIG. 25, items "date", "photographing order", "photographing apparatus", "priority condition", and "treatment of a file being transmitted at the start of recording" and options corresponding to the items are displayed. The user operates an item selection button 420a or 420b, an option change button 421a or 421b, or a determine button 422 using the operation unit 131 in FIG. 3 and moves a black circle mark to the right side of a desired option of each of the items to issue a command to select a detail of each of the items.

The user operates the item selection button 420a when the user moves the black circle mark to be a moving object upward to select an item on which the black circle mark is arranged. The user operates the item selection button 420b when the user moves the black circle mark to be a moving object downward to select an item on which the black circle mark is arranged. The user operates the option change button 421a when the user moves the moving object black circle mark upward. The user operates the option change button 421b when the user moves the moving object black circle mark downward. The user operates the determine button 422 when the user issues a command for determination. In other words, the user operates the item selection button 420a or 420b to move the black circle mark to be a moving object upward and downward to select an item on which the black circle mark is arranged. The user moves the black circle mark, which is set as a moving object by the movement, upward and downward by operating the option change button 421a or 421b. When the black circle mark is arranged on the right side of a desired option, the user operates the determine button 422.

For example, when the user selects a detail of the item "date", first, the user operates the item selection button 420a or 420b and selects the item "date" as an item on which the moving object black circle mark is arranged. Subsequently, the user operates the option change button 421a or 421b to move the black circle mark to a desired option and operates the determine button 422.

In the example in FIG. 25, options "transmission date priority" and "photographing date order" are displayed in association with the item "date". The user selects the option "transmission date priority" when the user determines a priority such that the priority is higher for a later acquisition date (photographing date) of a clip, that is, the priority is lower for an acquisition date that goes further back from that day (a date of transmission). The user selects the option "photographing order" when the user determines a priority such that the priority is higher for an earlier acquisition date (photographing date) of a clip.

Options "regular order" and "reverse order" are displayed in association with the item "photographing order". The user selects the option "regular order" when the user determines a priority such that the priority is higher for earlier photographing time when a photographing date is the same. The user selects the option "reverse order" when the user determines a priority such that the priority is higher for later photographing time when a photographing date is the same.

Options "this camcorder is given priority" and "no condition" are displayed in association with the item "photographing apparatus". The user selects the option "this camcorder is given priority" when the user determines a priority such that a priority for a clip obtained as a result of photographing by the camcorder itself (the camcorder 21) is high compared with priorities of clips obtained from other camcorders 21. The user selects the option "no condition" when the user determines a priority such that the priority is not changed depending on an acquisition source of a clip.

Options "automatic" and "manual" are displayed in association with the item "priority". The user selects the option "automatic" when the user determines a priority on the basis of the options selected in the item "date", the item "photographing order", and the item "photographing apparatus". The user selects the option "manual" when the user inputs priorities of respective clips by operating the operation unit 131.

Options "add later", "transmit as a separate file later", "discard a file being transmitted", and "complete transmission" are displayed in association with the item "treatment of a file being transmitted at the start of recording". The user selects the option "add later" when the user suspends transmission of a file to the material using apparatus 29 at the start of recording and, after the recording is completed, transmits un-transmitted data of the file, for which the transmission is suspended, and adds the file to files transmitted.

The user selects the option "transmit as a separate file later" when the user suspends transmission of a file to the material using apparatus 29 at the start of recording and, after the recording is completed, transmits data of the file, for which the transmission is suspended, as a separate file from the top of the data. The user selects the option "discard a file being transmitted" when the user discards (deletes) transmitted data of a file being transmitted to the material using apparatus 29 at the start of recording from the material using apparatus 29. The user selects the option "complete transmission" when the user transmits all data of the file being transmitted to the material using apparatus 29 and, then, starts recording.

An example of a transmission object clip to be registered in the transmission list will be explained with reference to FIG. 26.

In a table in FIG. 26, a UMID, photographing time, and an apparatus ID of a clip are shown in order from the left side. Although the UMID is actually a number, in FIG. 26, for convenience of explanation, UMID#1 to UMID#4 are used instead numbers.

In the example in FIG. 26, clips with UMID#1 to UMID#4 are transmission objects. The clip with UMID#1 is a clip obtained as a result of being photographed by the camcorder 21 with an apparatus ID "CID#2" at 9:50:15 on that day (a date of transmission). The clip with UMID#3 is a clip obtained as a result of being photographed by the camcorder 21 with an apparatus ID "CID#2" at 10:10:24 on that day.

The clip with UMID#4 is a clip obtained as a result of being photographed by the camcorder 21 with an apparatus ID "CID#1" at 10:25:30 on that day. The clip with UMID#2 is a clip obtained as a result of being photographed by the camcorder 21 with an apparatus ID "CID#1" at 11:25:05 on that day.

In this case, when, in a transmission mode, the option "transmission date priority" is selected in the item "date", the option "regular order" is selected in the item "photographing order", the option "no condition" is selected in the item "photographing apparatus", and the option "automatic" is selected in the item "priority condition" by the user, the list managing unit 401 creates a transmission list in FIG. 27 on the basis of the transmission mode.

All the transmission object clips in FIG. 26 are obtained as being photographed on the same day, that is, that day. Thus, the list managing unit 401 creates a transmission list such that a priority is lower as photographing time is later, that is, a priority is higher as photographing time is earlier as shown in FIG. 27. In the transmission list in FIG. 27, a clip with a higher priority has a smaller value of the priority. Clips are arranged in order from one with a highest priority. This is the same in FIGS. 29, 31, and 33 referred to later.

In other words, in the transmission list in FIG. 27, a priority, a UMID, photographing time, and an apparatus ID of a transmission object clip are registered in order from the left side. Information on a UMID, photographing time, and an apparatus ID (hereinafter referred to as clip information) of transmission object clips is arranged in order from one with earliest photographing time, that is, in an order of UMID#1, UMID#3, UMID#4, and UMID#2.

Transmission list creation processing in which the list managing unit 401 creates a transmission list when, in a transmission mode, a detail of the item "date" is "transmission date priority", a detail of the item "photographing order" is "regular order", a detail of the item "photographing apparatus" is "no condition", and a detail of the item "priority condition" is "automatic" will be explained with reference to FIG. 28. This transmission list creation processing is started when, for example, an un-transmitted clip is extracted.

In step S221, the list managing unit 401 sets a count value L of a not-shown counter to 1 and proceeds to step S222. In step S222, the list managing unit 401 acquires clip metadata of a clip obtained as a result of being photographed (L−1) days, which is a value obtained by deducting 1 from the count value L from the transmitting unit 400, before the present date among un-transmitted clips and registers clip information in a transmission list on the basis of the clip metadata. In other words, the list managing unit 401 registers the clip obtained as a result of being photographed (L−1) days before the present among the un-transmitted clips in the transmission list as a transmission object.

After the processing in step S222, the list managing unit 401 proceeds to step S223. The list managing unit 401 rearranges the clip information registered in the transmission list in the immediately preceding step S222 in order from a clip with earliest photographing time. For example, when clip information of the clips shown in FIG. 26 is registered in the transmission list, the list managing unit 401 rearranges this clip information in order from a clip with earliest photographing time and creates the transmission list shown in FIG. 27.

After the processing in step S223, the list managing unit 401 proceeds to step S224. The list managing unit 401 judges whether clip information of all transmission object clips have been registered in the transmission list. When it is judged that the clip information of all the transmission object clips have not been registered in the transmission list, the list managing unit 401 proceeds to step S225. In step S225, the list managing unit 401 increments the count value L by 1, returns to step S222, and repeats the processing described above.

On the other hand, when it is judged in step S224 that the clip information of all the transmission object clips have been registered in the transmission list, the processing is completed.

Figures 28, 29:
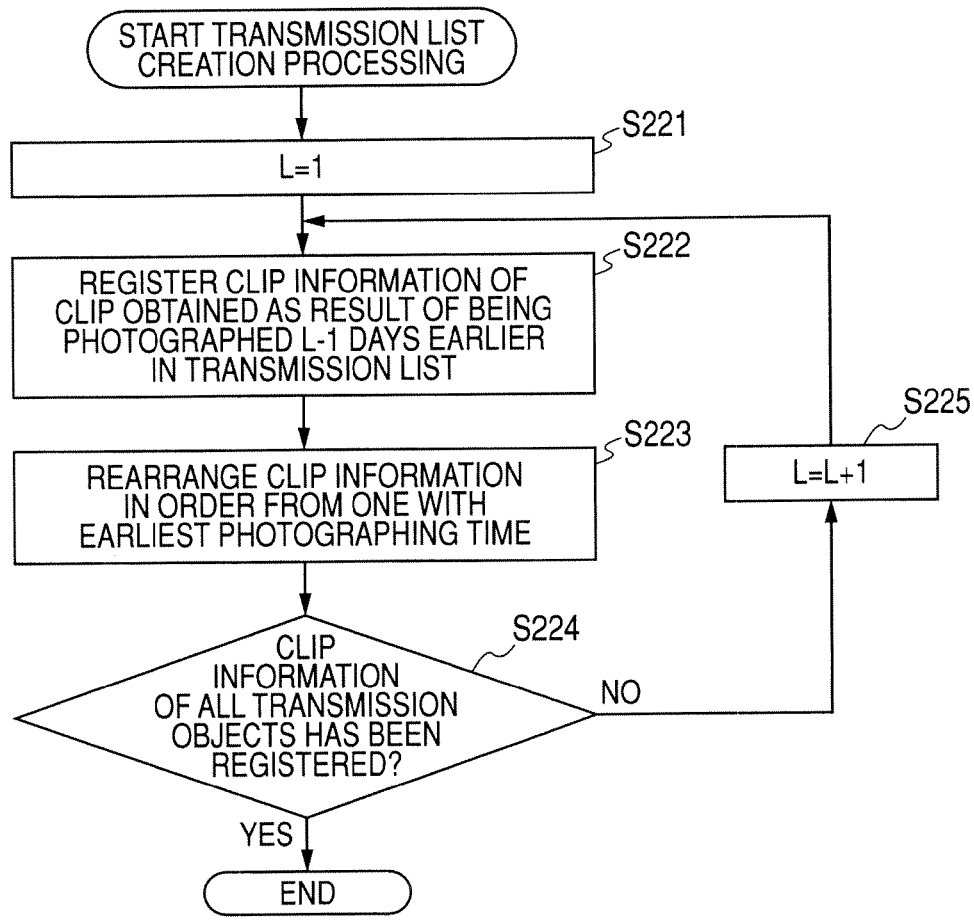
FIG. 28 is a flowchart for explaining transmission list creation processing.
FIG. 29 is a diagram showing another example of the transmission list.

When, in a transmission mode, the option "transmission date priority" is selected in the item "date", the option "regular order" is selected in the item "photographing order", the option "no condition" is selected in the item "photographing apparatus", and the option "automatic" is selected in the item "priority condition" by the user, the list managing unit 401 creates a transmission list in FIG. 29 on the basis of the transmission mode.

All the transmission object clips in FIG. 26 are obtained as a result of being photographed on the same day, that is, that day. Thus, the list managing unit 401 creates a transmission list such that the priority is lower for photographing time that goes further back from the present time as shown in FIG. 29, that is, the priority is higher for later photographing time. In other words, in the transmission list in FIG. 29, a priority, a UMID, photographing time, and an apparatus ID of a transmission object clip are registered in order from the left side. Clip information of transmission object clips is arranged in order from a clip with latest photographing time, that is, in an order of UMID#2, UMID#4, UMID#3, and UMID#1.

Transmission list creation processing in which the list managing unit 401 creates a transmission list when, in a transmission mode, a detail of the item "date" is "transmission date priority", a detail of the item "photographing order" is "reverse order", a detail of the item "photographing apparatus" is "no condition", and a detail of the item "photographing condition" is "automatic" will be explained with reference to FIG. 30. This transmission list creation processing is started when, for example, an un-transmitted clip is extracted.

Steps S241 to 245 are the same as the processing in FIG. 28 excluding step S243. Thus, explanations of processing other than step S243 are omitted.

In step S243, the list managing unit 401 rearranges the clip information registered in the transmission list in the immediately preceding step S242 in order from a clip with latest photographing time. For example, when clip information of the clips shown in FIG. 26 is registered in the transmission list, the list managing unit 401 rearranges this clip information in order from a clip with latest photographing time and creates the transmission list shown in FIG. 29.

In FIGS. 27 to 30, the option "transmission date priority" is selected in the item "date". However, when the option "photographing date order" is selected, in step S222 in FIG. 28 or step S224 in FIG. 30, the clip information of the clips is registered in the transmission list for each photographing date in order from a clip with earliest photographing date and time.

Figures 30, 31:
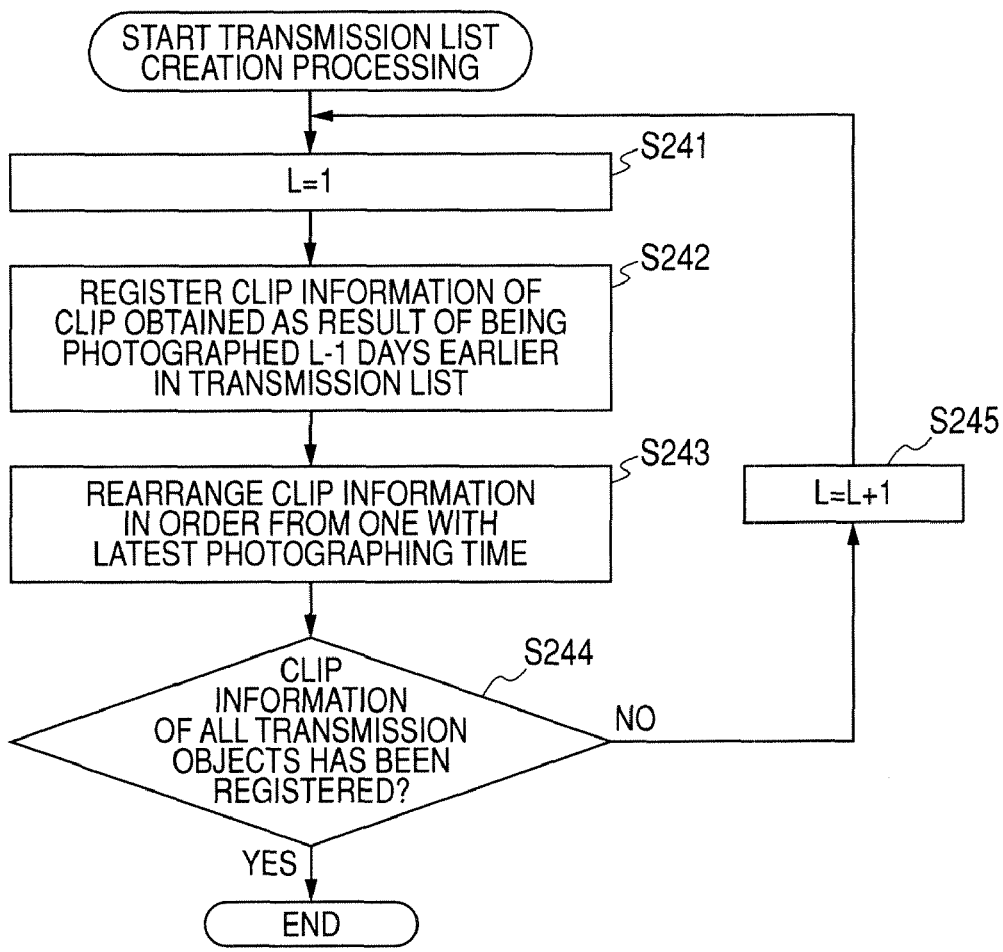
FIG. 30 is a flowchart for explaining another kind of transmission list creation processing.
FIG. 31 is a diagram showing still another example of the transmission list.

When, in a transmission mode, the option "this camcorder is given priority" is selected in the item "photographing apparatus" and the option "automatic" is selected in the item "priority condition" by the user, the list managing unit 401 creates a transmission list in FIG. 31 on the basis of the transmission mode. It is assumed that, in FIG. 31, an apparatus ID of the camcorder 21, for which a transmission list is created, is "CID#1".

All the transmission object clips in FIG. 26 are obtained as a result of being photographed on the same day, that is, that day. Thus, the list managing unit 401 creates a transmission list such that the priority is high for a clip corresponding to the apparatus ID of the camcorder 21 itself "CID#1" as shown in FIG. 31. In other words, in the transmission list in FIG. 31, a priority, a UMID, photographing time, and an apparatus ID of a transmission object clip are registered in order from the left side. Clip information of transmission object clips is arranged in an order of a clip with UMID#4 that is a clip corresponding to the apparatus ID "CID#1", a clip with UMID#2, a clip with UMID#1 that is a clip corresponding to an apparatus ID "CID#2" not "CID#1", and a clip with UMID#3.

When there are plural apparatus IDs corresponding to transmission object clips other than "CID#1", the clips corresponding to the apparatus IDs other than "CID#1" may be arranged in the transmission list in an order set by the user in advance.

In the transmission list in FIG. 31, the clips corresponding to the identical apparatus ID are arranged in order from one with earliest photographing time. However, the clips may be arranged in order from one with latest photographing time. An order in the clips corresponding to the identical apparatus ID may be set in advance or may be set by the user selecting an option of the item "date" of the transmission mode.

Transmission list creation processing in which the list managing unit 401 in FIG. 24 creates a transmission list when, in a transmission mode, a detail of the item "photographing apparatus" is "this camcorder is given priority" and a detail of the item "photographing condition" is "automatic" will be explained with reference to FIG. 32. This transmission list creation processing is started when, for example, an un-transmitted clip is extracted.

In step S261, the list managing unit 401 acquires, with an un-transmitted clip extracted as a transmission object, clip metadata of the clip from the transmitting unit 400 and registers clip information in a transmission list on the basis of the clip metadata.

After the processing in step S261, the list managing unit 401 proceeds to step S262. The list managing unit 401 rearranges the clip information registered in the transmission list in step S261 such that a clip corresponding to an apparatus ID of the camcorder 21 itself is given priority (a priority of the clip is high). For example, when clip information of the clips shown in FIG. 26 is registered in the transmission list, the list managing unit 401 rearranges this clip information such that a clip corresponding to "CID#1", which is the apparatus ID of the camcorder 21 itself, is given priority and creates the transmission list shown in FIG. 31.

Figures 32, 33:
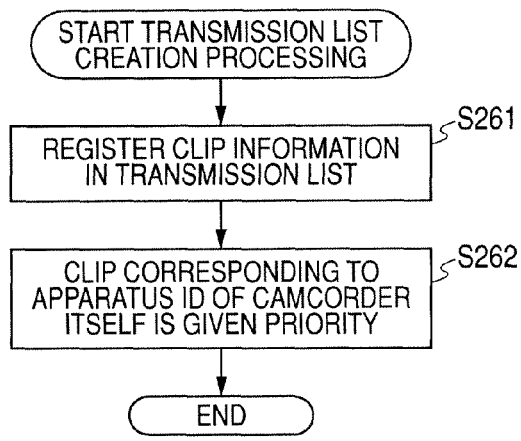
FIG. 32 is a flowchart for explaining still another kind of transmission list creation processing.
FIG. 33 is a diagram showing still another example of the transmission list.

When, in a transmission mode, the option "manual" is selected in the item "priority condition" by the user, the list managing unit 401 creates a transmission list in FIG. 33 on the basis of the transmission mode and an input from the user.

In other words, the list managing unit 401 causes the LCD 112 (FIG. 3) to display the transmission list in which the clip information of the transmission object clips in FIG. 26 is registered. The user operates the operation unit 131 to input priorities of the respective clips while looking at the transmission list. The list managing unit 401 creates the transmission list in FIG. 33 on the basis of a communication operation signal indicating the operation.

In the transmission list in FIG. 33, a priority, UMID, photographing time, an apparatus ID, and a priority inputted by the user (in FIG. 33, "manual input") are registered in order from the left side. In the example in FIG. 33, priorities 1, 2, 3, and 4 are inputted by the user with respect to clips with UMID#2, UMID#1, UMID#4, and UMID#3, respectively. In the transmission list in FIG. 33, the clips are arranged in an order of UMID#2, UMID#1, UMID#4, and UMID#3.

Figure 34:
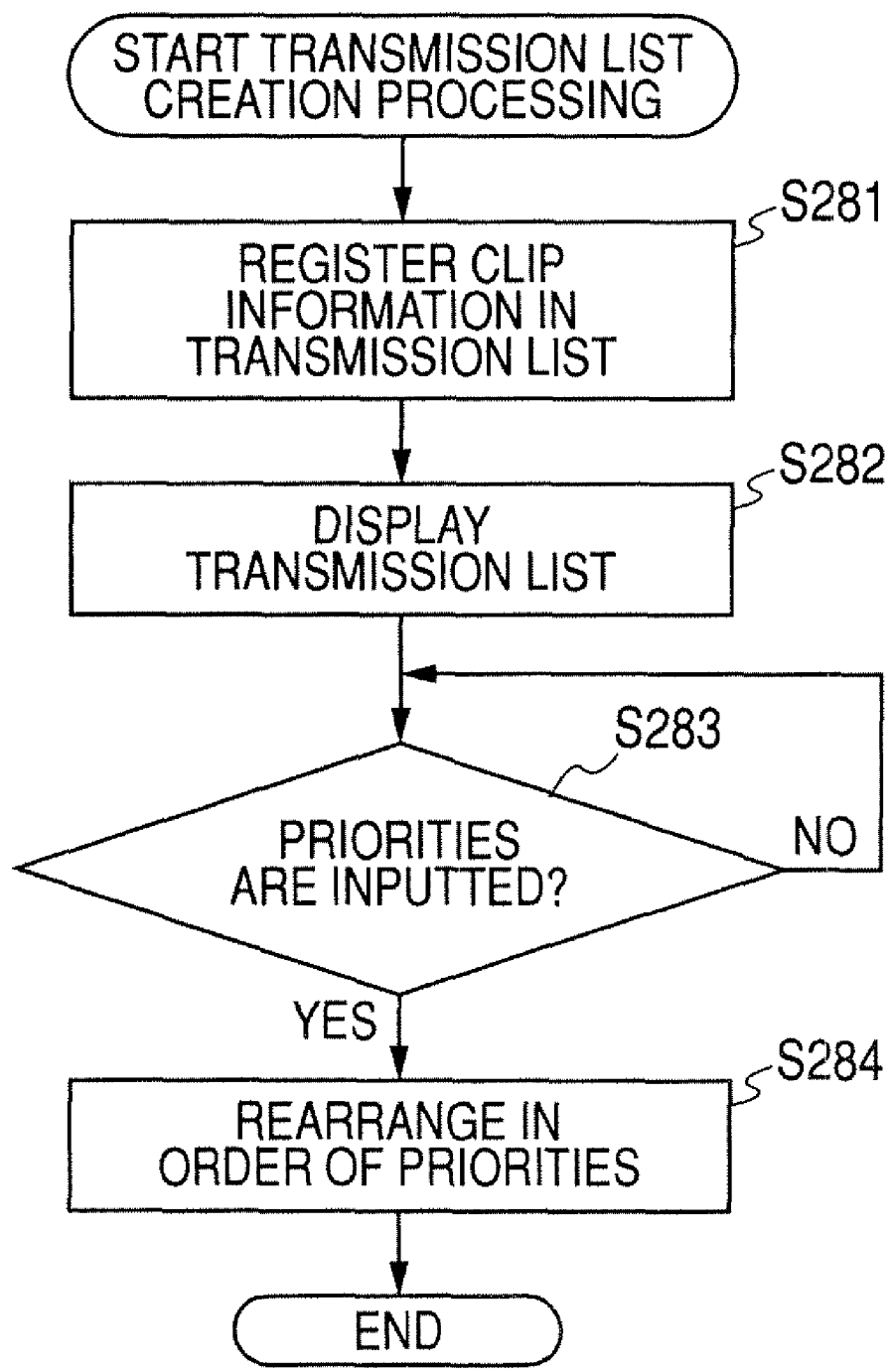
FIG. 34 is a flowchart for explaining still another kind of transmission list creation processing.

Transmission list creation processing in which the list managing unit 401 in FIG. 24 creates a transmission list when, in a transmission mode, a detail of the item "priority condition" is "automatic" will be explained with reference to FIG. 34. This transmission list creation processing is started when, for example, an un-transmitted clip is extracted.

In step S281, the list managing unit 401 acquires, with an un-transmitted clip extracted set as a transmission object, clip metadata of the clip from the transmitting unit 400 and registers clip information in a transmission list on the basis of the clip metadata. After the processing in step S281, the list managing unit 401 proceeds to step S282. The list managing unit 401 reads out the transmission list, in which the clip information of the transmission object clips is registered in step S281, from the list storing unit 310 and causes the LCD 112 to display the transmission list.

In this case, the user operates the operation unit 131 while looking at the transmission list displayed on the LCD 112 and inputs priorities with respect to the respective clips of the clip information registered in the transmission list.

After the processing in step 282, in step S283, the list managing unit 401 judges, on the basis of a communication operation signal from the operation unit 131, whether priorities have been inputted with respect to all the clips of the clip information registered in the transmission list. When it is judged that priorities have not been inputted with respect to all the clips, the list managing unit 401 stands by until priorities are inputted.

On the other hand, when it is judged in step S283 that priorities have been inputted with respect to all the clips of the clip information registered in the transmission list, the list managing unit 401 proceeds to step S284. The list managing unit 401 rearranges the clip information of the transmission object clips registered in the transmission list in step S281 in order from a clip with a highest priority inputted by the user. In this case, the list managing unit 401 adds the priorities inputted by the user to the clip information corresponding to the priorities in the transmission list.

For example, when clip information of the clips shown in FIG. 26 is registered in the transmission list, the list managing unit 401 rearranges the clip information in order from a clip with a highest priority inputted by the user and creates the transmission list shown in FIG. 33.

Recording processing in which the camcorder-information transmitting unit 291 in FIG. 24 records respective data of a clip obtained as a result of photographing when, in a transmission mode, a detail of the item "treatment of a file being transmitted at the start of recording" is "add later" will be explained with reference to FIG. 35. This recording processing is started when, for example, a control signal for recording a clip supplied from the material using apparatus 29 is supplied to the control unit 403.

In step S301, the transmitting unit 400 judges, according to a command from the control unit 403, whether data of a clip recorded in the removable medium 33 is being transmitted. When it is judged that the data of the clip is being transmitted, the transmitting unit 400 proceeds to step S302. The transmitting unit 400 calculates, on the basis of a size of the data of the clip being transmitted and communication speed in the network 31 and the intranet 32, a transmission time necessary for transmission of the data of the clip being transmitted.

After the processing in step S302, the transmitting unit 400 proceeds to step S303. The transmitting unit 400 judges whether remaining time of transmission, that is, time obtained by deducting time from the start of the transmission of the clip being transmitted until the present from the transmission time calculated in step S302 is equal to or longer than a set time (e.g., ten seconds). When it is judged in step S303 that the remaining time of transmission is equal to or longer than the set time, the transmitting unit 400 proceeds to step S304. The transmitting unit 400 stores a position where the transmission is suspended (e.g., a frame number) (hereinafter referred to as suspension position), gives a new UMID to a file of the clip for which the transmission is suspended, and transmits the UMID to the material using apparatus 29.

In this case, the data acquiring unit 324 (FIG. 15) of the material using apparatus 29 gives the new UMID transmitted from the transmitting unit 400 to the file of the clip, for which the transmission is suspended, received from the transmitting unit 400 and stored in the data recording unit 325.

On the other hand, when it is judged in step S303 that the remaining time of transmission is not equal to or longer than the set time, the transmitting unit 400 proceeds to step S305. The transmitting unit 400 judges whether the transmission of the file of the clip being transmitted has been completed. When it is judged in step S305 that the transmission of the file of the clip being transmitted has not been completed, the transmitting unit 400 stands by until it is judged that the transmission has been completed.

When it is judged in step S301 that the data of the clip is not being transmitted, after processing in step S304, or when it is judged in step S305 that the transmission of the file of the clip being transmitted has been completed, the control unit 403 proceeds to step S306. The control unit 403 performs recording of a clip obtained as a result of photographing and file transmission processing (FIG. 19) for the clip.

After the processing in step S306, the transmitting unit 400 proceeds to step S307. The transmitting unit 400 transmits the new UMID given in step S304 and the suspension position stored in step S304 to the material using apparatus 29 and proceeds to step S308.

In step S308, the transmitting unit 400 transmits data (untransmitted data) after the suspension position of the data of the clip for which the transmission is suspended, which are supplied from the material-data acquiring unit 300, the proxy-image-data acquiring unit 301, or the metadata acquiring unit 303, to the material using apparatus 29 and completes the processing.

Thereafter, the data acquiring unit 324 of the material using apparatus 29 records, on the basis of the new UMID and the suspension position transmitted from the transmitting unit 400 in step S307, the data transmitted in step S308 from the suspension position of the file to which the UMID is given.

Figure 36:
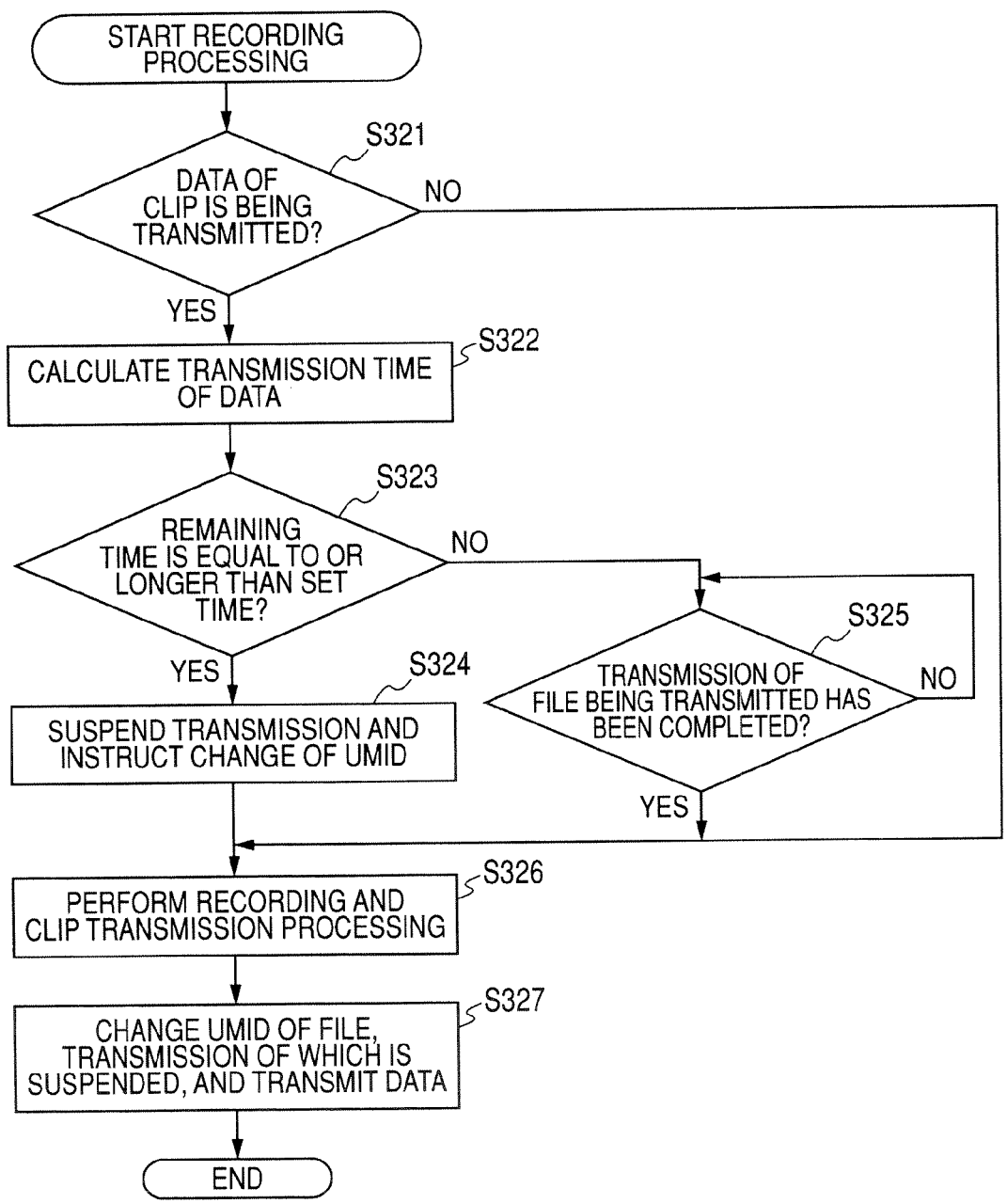
FIG. 36 is a flowchart for explaining another kind of recording processing.

Recording processing in which the camcorder-information transmitting unit 291 records respective data of a clip obtained as a result of photographing when, in a transmission mode, a detail of the item "treatment of a file being transmitted at the start of recording" is "transmit as a separate file later" will be explained with reference to FIG. 36. This recording processing is started when, for example, a control signal for recording a clip supplied from the material using apparatus 29 is supplied to the control unit 403.

Figure 35:
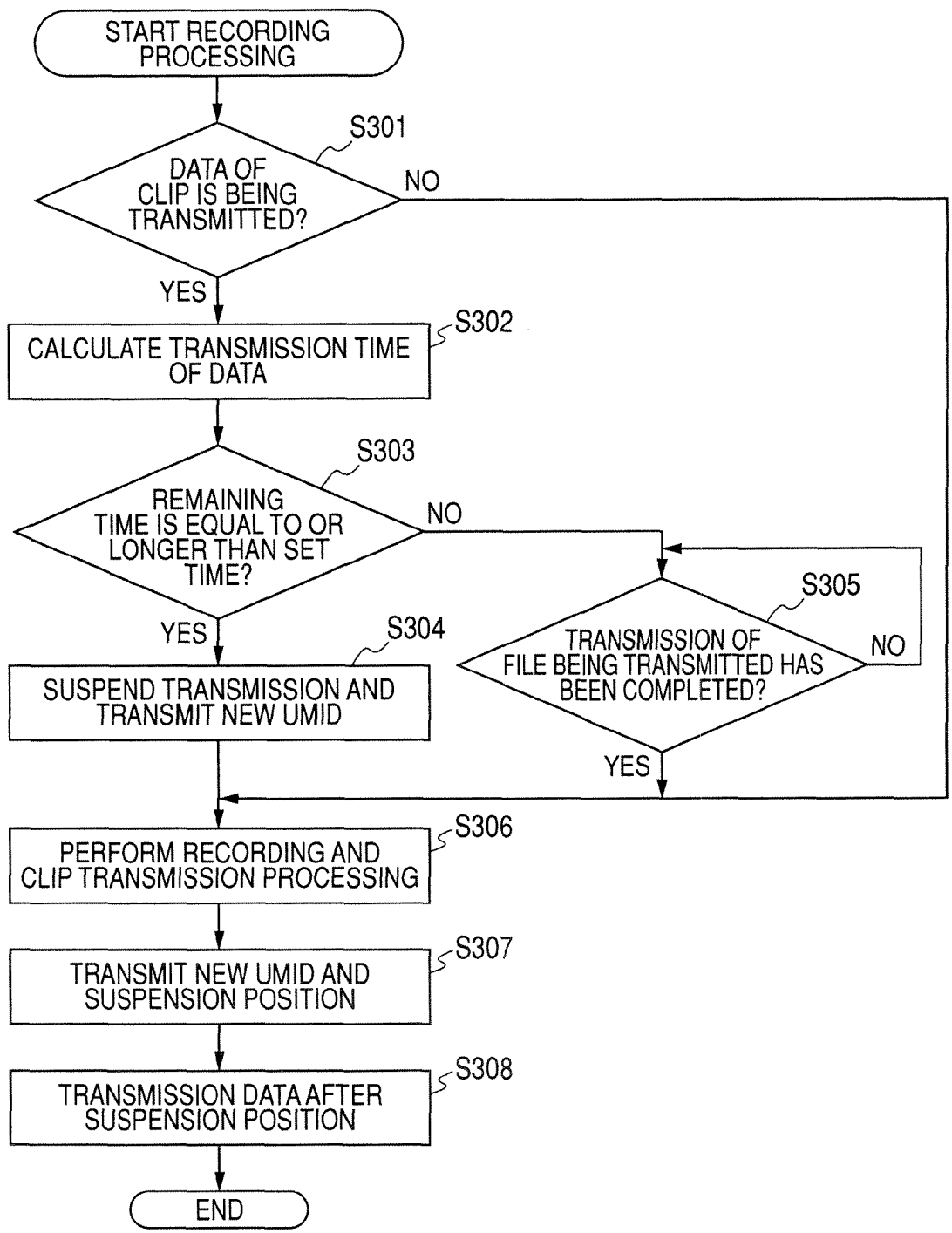
FIG. 35 is a flowchart for explaining recording processing.

Since processing in steps S321 to S323 and step S325 is the same as the processing in steps S301 to S303 and step S305 in FIG. 35, explanations of the steps are omitted.

In step S324, the transmitting unit 400 suspends the transmission and stores a suspension position and instructs the material using apparatus 29 to change an instance number of the UMID of the file of the clip, for which the transmission is suspended, to a number indicating the suspension. According to the instruction, the data acquiring unit 324 of the material using apparatus 29 changes the instance number of the UMID of the file of the clip for which the transmission is suspended, which is received from the transmitting unit 400 and recorded in the data recording unit 325, to a number indicating the suspension.

After the processing in step S324, the control unit 403 proceeds to step S326. The control unit 403 records a clip obtained as a result of photographing in the removable medium 33, controls the transmitting unit 400, and performs file transmission processing (FIG. 19) for the clip.

After the processing in step S326, the transmitting unit 400 proceeds to step S327. The transmitting unit 400 changes the UMID of the file for which the transmission is suspended, transmits data of the file to the material using apparatus 29 from the top of the data, and completes the processing.

Thereafter, the data acquiring unit 324 of the material using apparatus 29 records the file transmitted from the transmitting unit 400 in the data recording unit 325 as a file separate from the file for which the transmission is suspended.

In the item "treatment of a file being transmitted at the start of recording" of the transmission mode, an option "interrupt" for starting recording while continuing transmission of a file being transmitted at the start of recording may be provided. When the option "interrupt" is selected, the transmitting unit 400 continues the transmission of the file being transmitted at the start of recording and the control unit 403 records a clip obtained as a result of photographing in the removable medium 33 but does not perform file transmission processing for the clip. In other words, the clip obtained as a result of photographing is recorded but is not transmitted.

Figure 37:
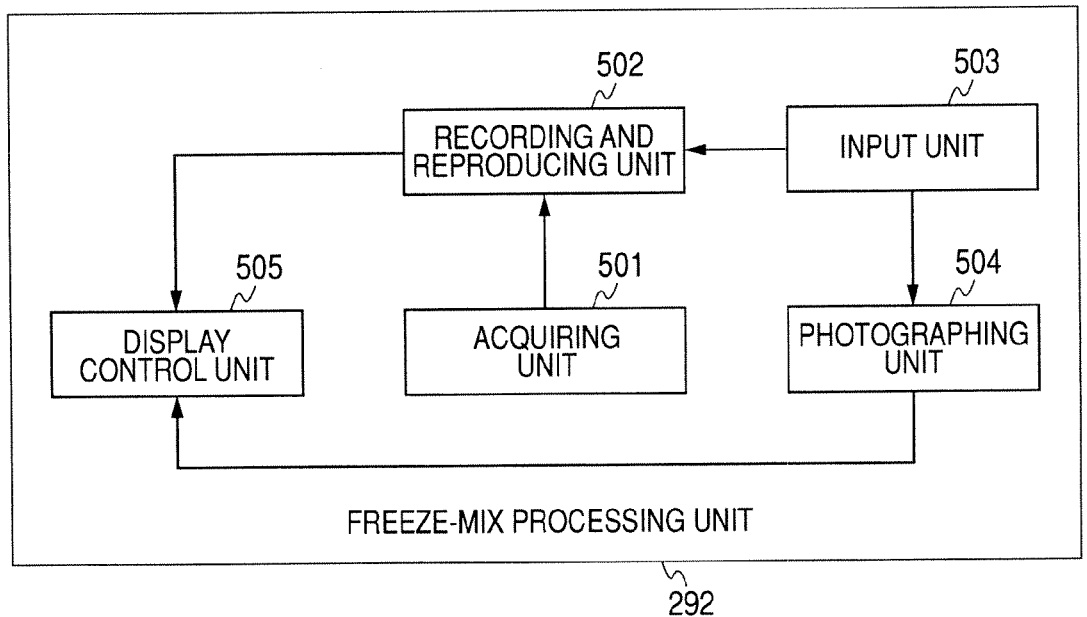
FIG. 37 is a block diagram showing an example of a detailed structure of a freeze-mix processing unit.

FIG. 37 is a block diagram showing an example of a detailed structure of the freeze-mix processing unit 292 in FIG. 12.

The freeze-mix processing unit 292 in FIG. 37 includes an acquiring unit 501, a recording and reproducing unit 502, an input unit 503, a photographing unit 504, and a display control unit 505. The acquiring unit 501 corresponds to, for example, the communication block 53 in FIG. 3. The recording and reproducing unit 502 corresponds to, for example, the recorder block 52. The input unit 503 corresponds to, for example, the operation unit 81. The photographing unit 504 and the display control unit 505 corresponds to, for example, the microcomputer 83.

The acquiring unit 501 acquires data concerning a freeze-mix image (hereinafter referred to as freeze-mix data), which is transmitted from the freeze-mix transmitting unit 312 (FIG. 14) of the material using apparatus 29, as information on photographing of a sample image and supplies the freeze-mix data to the recording and reproducing unit 502. The freeze-mix data includes grouping metadata, image data, non-real time metadata, and real time metadata of the freeze-mix image.

The recording and reproducing unit 502 causes the removable medium 33 to record the freeze-mix data from the acquiring unit 501. The recording and reproducing unit 502 reproduces, on the basis of a designation signal for designating a frame of a freeze-mix image designated as an object of freeze-mix by the user (hereinafter referred to as object frame) supplied from the input unit 503, image data of the object frame of the freeze-mix image from the removable medium 33 and supplies the image data to the display control unit 505.

The input unit 503 receives, for example, operation for designating a frame of a freeze-mix image desired by the user as an object frame of freeze-mix and supplies a designation signal to the recording and reproducing unit 502 according to the operation. The input unit 503 receives a command for photographing from the user and supplies the command to the photographing unit 504.

The photographing unit 504 acquires an image of a subject and supplies the image to the display control unit 505. The photographing unit 504 causes the removable medium 33 to record an image acquired according to the command for photographing supplied from the input unit 503.

The display control unit 505 controls display on the basis of the image data of the object frame of the freeze-mix image supplied from the recording and reproducing unit 502 to cause the viewfinder 80 to display the object frame in a translucent state and cause the viewfinder 80 to display the image from the photographing unit 504.

Figure 38:
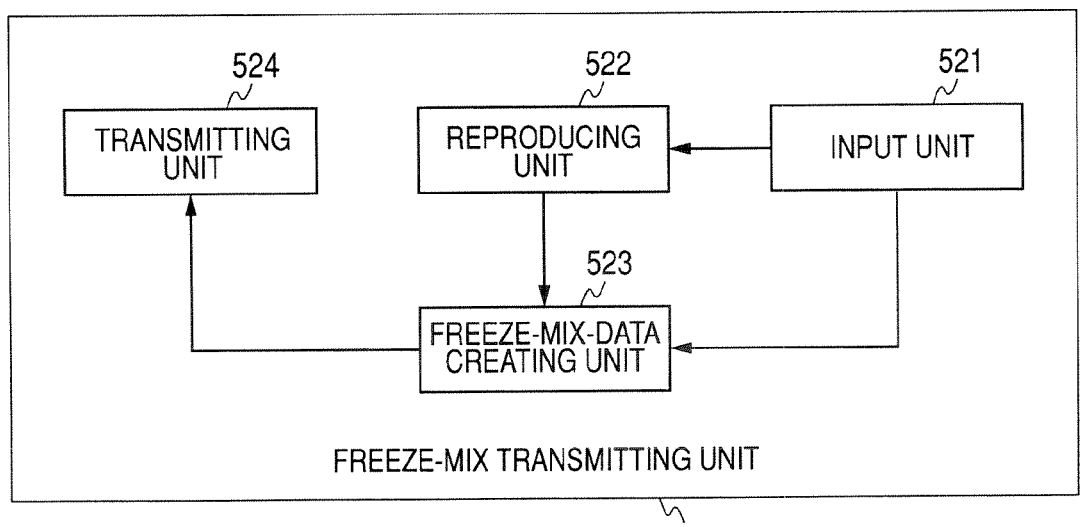
FIG. 38 is a block diagram showing an example of a detailed structure of a freeze-mix transmitting unit.

FIG. 38 is a block diagram showing an example of a detailed structure of the freeze-mix transmitting unit 312 in FIG. 14.

The freeze-mix transmitting unit 312 in FIG. 38 includes an input unit 521, a reproducing unit 522, a freeze-mix-data creating unit 523, and a transmitting unit 524. The input unit 521 corresponds to, for example, the input unit 206 in FIG. 4. The reproducing unit 522 and the freeze-mix-data creating unit 523 correspond to, for example, the CPU 201. The transmitting unit 524 corresponds to, for example, the communicating unit 209.

The input unit 521 receives, for example, operation for selecting an object frame of a freeze-mix image from the user and supplies a selection signal indicating the selection to the reproducing unit 522 and the freeze-mix-data creating unit 523. The input unit 521 receives operation from the user and supplies an operation signal indicating the operation to the freeze-mix-data creating unit 523.

The reproducing unit 522 reproduces, for example, according to the selection signal from the input unit 521, respective data of a clip corresponding to the freeze-mix image indicated by the selection signal from the recording unit 208 and supplies the data to the freeze-mix-data creating unit 523.

The freeze-mix-data creating unit 523 creates freeze-mix data on the basis of the respective data of the clip from the reproducing unit 522 and the selection signal from the input unit 521 and supplies the freeze-mix data to the transmitting unit 524. The transmitting unit 524 transmits the freeze-mix data from the freeze-mix-data creating unit 523 to the freeze-mix processing unit 292 of the camcorder 21.

An example of a screen indicating a directory structure of a file including a file of freeze-mix data recorded in the removable medium 33 in FIG. 1, which is displayed on the LCD 112 in FIG. 3, will be explained with reference to FIG. 39. Components identical with those in FIG. 5 are denoted by the identical reference numerals and signs and explanations of the components are omitted.

Figure 39:
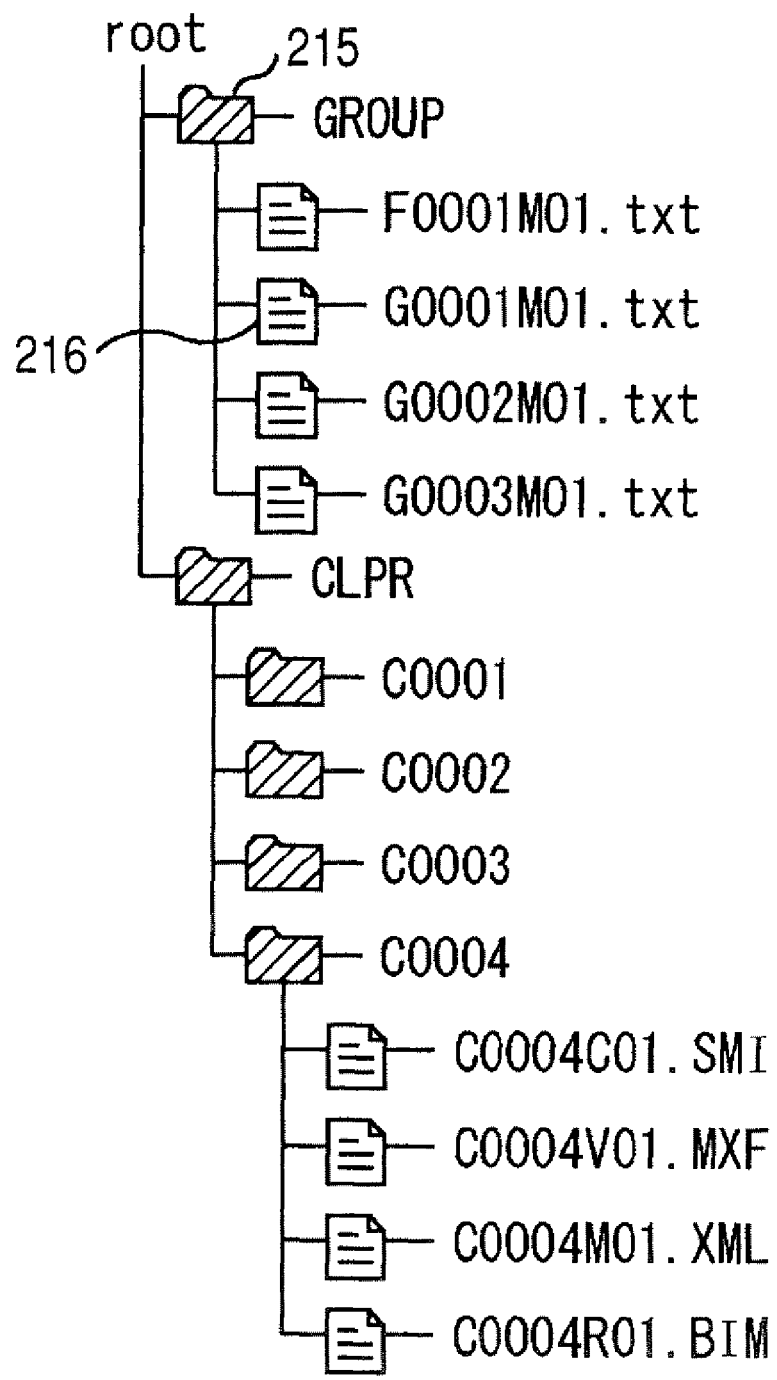
FIG. 39 is a diagram showing an example of a screen that shows a directory structure of files including files of freeze-mix data recorded in the removable medium.

In the example in FIG. 39, as in FIG. 5, the GROUP directory 215 and the clip root directory (CLPR) are provided in the removable medium 33.

A freeze-mix metadata file that is a file of grouping metadata of a freeze-mix image (hereinafter referred to as freeze-mix metadata) and grouping metadata files (G0001M01.txt to G0003M01.txt) identical with those in FIG. 5 are provided in the GROUP directory 215.

Specifically, for example, FIG. 39 shows an example in which image data of a freeze-mix image of one group is recorded in the removable medium 33. Freeze-mix metadata of the freeze-mix image is stored as a freeze-mix metadata file (F0001M01.txt).

In the clip root directory (CLPR), other than three clip directories (C0001 to C0003) identical with those in FIG. 5, one clip directory (C0004) for managing data of a clip corresponding to the freeze-mix image is provided.

In the clip directory (C0004), a master file (C0004C01.SMI) that is a file for managing this clip, an image file (C0004V01.MXF) that is a file including image data of this clip, a non-real time metadata file (C0004M01.XML) that is a file including, other than apparatus information of an apparatus that has acquired this clip, camera set values at the time of photographing (acquisition) of the clip, and a photographing date and time, non-real time metadata, which does not need to have a real time nature, such as information on an electronic mark (an essence mark) like an electronic mark list, and a real-time metadata file (C0004R01.BIM) that is a file including real time metadata, which needs to have a real time nature, of this clip are provided.

The electronic mark is data indication a characteristic of an image and is used for specifying an object frame of the freeze-mix image.

The freeze-mix metadata will be explained with reference to FIG. 40.

As shown in FIG. 40, the freeze-mix metadata is described in the same manner as grouping metadata.

Specifically, in the example in FIG. 40, in the freeze-mix metadata, following "title" indicating the item "group title", "Mt. Fuji", which is a detail of the item "group title", is described. After that, "category" indicating the item "classification", "Freeze Mix" indicating a freeze-mix image, which is a detail of the item "classification", "original" indicating the item "original", and "No" indicating non-original data, which is a detail of the item "original", are described in order.

After that, in the same manner, "date created" indicating the item "group creation date and time", "2004/8/16", which is a detail of the item "group creation date and time", "date directed" indicating the item "planned" of the item "photographing date and time", "2004/8/31", which is a detail of the item "planned", "date carried out" indicating the item "executed" of the item "photographing date and time", "2004/8/31", which is a detail of the item "executed", "place directed" indicating the item "planned" of the item "photographing place", "Lake Yamanaka Plain", which is a detail of the item "planned", "place carried out" indicating the item "executed" of the item "photographing place", and "Lake Yamanaka Plain", which is a detail of the item "executed", are described in order.

After that, "person directed" indicating the item "planned" of the item "photographer", "Koizumi, Okada", which is a detail of the item "planned", "person carried out" indicating the item "executed" of the item "photographer", "Koizumi, Okada", which is a detail of the item "executed", "description directed" indicating the item "instructed" of the item "photographing contents", "XXXX", which is a detail of the item "instructed", "description occurred" indicating the item "actual (memo)" of the item "photographing content", and "XXXX", which is a detail of the item "actual (memo)" are described in order.

Moreover, after that, "file title" indicating the item "title" of the item "photographed material (file)", "Mt. Fuji viewed from Lake Yamanaka", which is a title of a first file of a freeze-mix image classified into the group in a detail of the item "title", "file ID" indicating the item "UMID" of the item "photographed material", "XXXX", which is a UMID of the first file in a detail of the item "UMID", "memo" indicating the item "memo" of the item "photographed material", and "XXXX", which is a detail of the item "memo", are described in order.

After that, as in the first file, the item "title", the item "UMID", and the item "memo" of a second and subsequent files as well as details of the items are described.

Screens for designating an object frame of a desired freeze-mix image out of freeze-mix images recorded in the removable medium 33 will be explained with reference to FIGS. 41 and 42.

A screen in FIG. 41 is a screen for designating a desired freeze-mix image as an object of freeze-mix.

On this screen, on the basis of freeze-mix metadata of the freeze-mix metadata file (F0001M01.txt) recorded in the removable medium 33, a detail of the item "group title" of the freeze-mix metadata is described on a first line as a group name. In the example in FIG. 41, "Mt. Fuji", which is a detail of the item "group title", is displayed as a group name on the basis of the freeze-mix metadata shown in FIG. 40.

Under the group name, a list in which details of the item "title" of the item "photographed material" of the freeze-mix metadata are arranged is displayed as a clip list of a freeze-mix image. Specifically, in the example in FIG. 41, a clip list in which "Mt. Fuji viewed from Lake Yamanaka", "Mt. Fuji viewed from Lake Kawaguchi", "Mt. Fuji viewed from Lake Sai", "Mt. Fuji viewed from Lake Shinji", "Mt. Fuji viewed from Lake Motosu", and "Mt. Fuji viewed from Ohse-saki", which are details of the item "title" of the item "photographed material" are arranged is displayed.

One black circle mark is displayed at the left end of the clip list. The user operates the input unit 503 in FIG. 37 to move the black circle mark to a position corresponding to a desired title. In this way, the user can designate a freeze-mix image corresponding to the title as an object of freeze-mix. In the example in FIG. 41, a freeze-mix image corresponding to "Mt. Fuji viewed from Lake Yamanaka" is designated by the user.

A reproduce clip button 541 is displayed at the lower right on the screen in FIG. 41. The user operates the reproduce clip button 541 when the user reproduces the freeze-mix image designated by the black circle mark.

When the user operates the reproduce clip button 541 after selecting the group title "Mt. Fuji viewed from Lake Yamanaka", an image shown in FIG. 42 is displayed in the viewfinder 80 in FIG. 3.

Figure 42:
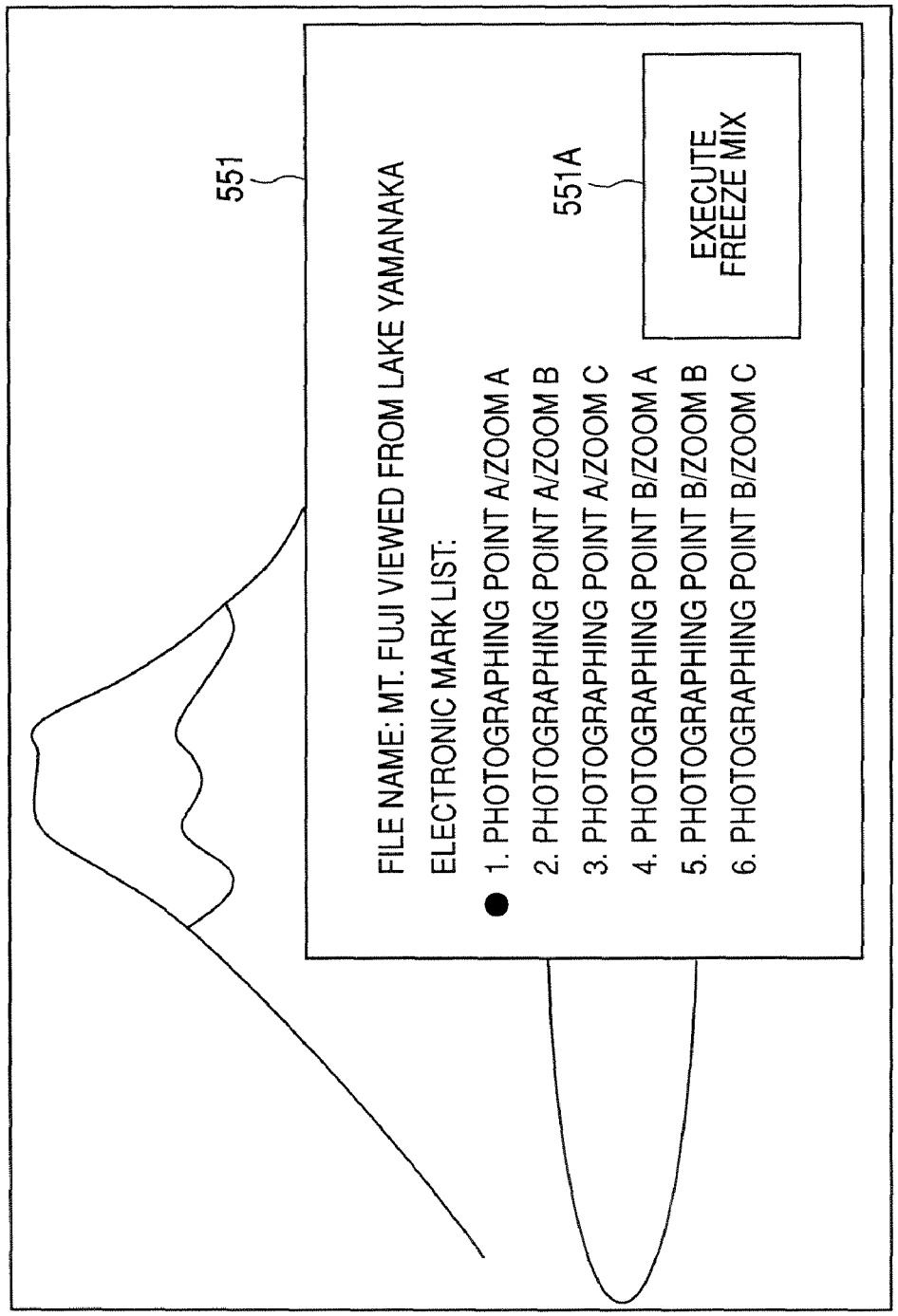
FIG. 42 is a diagram showing an example of another screen for designating a freeze-mix image.

As shown in FIG. 42, a freeze-mix image corresponding to freeze-mix metadata in which "Mt. Fuji viewed from Lake Yamanaka" is included in a detail of the item "title" of the item "photographed material" is displayed in the viewfinder 80.

Thereafter, when the user operates the input unit 503 and instructs display of an electronic mark list, as shown in FIG. 42, an electronic-mark-list display section 551 is displayed on the basis of an electronic mark list included in non-real time metadata corresponding to the freeze-mix image.

Specifically, the recording and reproducing unit 502 reproduces, on the basis of a detail of the item "UMID" of the freeze-mix metadata in which a detail of the item "group title" is "Mt. Fuji viewed from Lake Yamanaka", an image file of a clip of the freeze-mix image and supplies the image file to the display control unit 505. The recording and reproducing unit 502 extracts an electronic mark list from non-real time metadata file corresponding to the image file and supplies the electronic mark list to the display control unit 505. The display control unit 505 displays an image and the electronic-mark-list display section 551 on the basis of the image file and the electronic mark list from the recording and reproducing unit 502.

In the example in FIG. 42, in the electronic-mark-list display section 551, on the basis of metadata of a frame specified by an electronic mark registered in the electronic mark list of the non-real time metadata, a list of information indicating a photographing point of the frame and a mode of zoom (hereinafter referred to as frame information) is displayed as an electronic mark list. The metadata of the frame is metadata in frame units included in the non-real time metadata. As the metadata of the frame, for example, information indicating a photographing point, camera set values, and a title of the frame are recorded.

One black circle mark is displayed at the left end of the electronic mark list. The user operates the input unit 503 in FIG. 37 to move the black circle mark to a position corresponding to desired frame information. In this way, the user can designate a frame corresponding to the frame information as an object frame. In the example in FIG. 42, a frame corresponding to frame information "photographing point A/zoom A" is designated by the user.

Moreover, in the electronic-mark-list display section 551, an execute freeze-mix button 551A is displayed at the lower right. The user operates the execute freeze-mix button 551A when the user applies freeze-mix to an object frame designated by using the black circle mark.

In FIG. 42, the photographing point and the mode of zoom are displayed in the electronic mark list as frame information. However, a title of a frame may be displayed as frame information.

Processing for transmitting freeze-mix data will be explained with reference to FIG. 43.

First, a workflow of the user of the material using apparatus 29 will be explained.

In step S401, the user selects an image file of a freeze-mix image. Specifically, in step S421, the user operates the input unit 521 in FIG. 38 to display the screen (FIG. 8) indicating a directory structure of a file recorded in the recording unit 208 in FIG. 4, selects an image file in a desired clip directory 240 from the screen, and reproduces (displays) the image file as an image file of a freeze-mix image.

After the processing in step S401, the user proceeds to step S402. The user operates the input unit 521 while looking at the freeze-mix image currently displayed and selects a desired frame as an object frame.

After the processing in step S402, the user proceeds to step S403. The user operates the input unit 521 to input a title and an instruction with respect to the frame selected in step S402.

After the processing in step S403, the user proceeds to step S404. The user selects the camcorder 21, which performs freeze-mix, and transmits freeze-mix data to the camcorder 21. Specifically, in step S422, the user operates the input unit 521 to display the screen (FIG. 8) indicating a directory structure of a file recorded in the recording unit 208, selects the camcorder directory 233 of a desired camcorder 21, and arranges a clip directory and a freeze-mix metadata file of the freeze-mix image in the recorded image directory 252 of the camcorder directory 233.

Processing by the material using apparatus 29 will be explained.

In step S441, the reproducing unit 522 reproduces, on the basis of a selection signal corresponding to the operation of the input unit 521 by the user in step S421, the grouping metadata file 239 and the clip directory 240 corresponding to the image selected as the freeze-mix image by the user and supplies the grouping metadata file 239 and the clip directory 240 to the freeze-mix-data creating unit 523.

After the processing in step S441, the reproducing unit 522 proceeds to step S442. The reproducing unit 522 reproduces an image file of the freeze-mix image on the basis of the selection signal from the input unit 521, causes the display unit 207 in FIG. 4 to display the image file, and proceeds to step S443.

In step S443, the freeze-mix-data creating unit 523 records, on the basis of a selection signal corresponding to the operation of the input unit 521 by the user in step S402, an electronic mark list of an electronic mark for specifying a frame selected by the user as an object frame in a non-real time metadata file of the clip directory 237 supplied from the reproducing unit 522.

After the processing in step S443, the freeze-mix-data creating unit 523 proceeds to step S444. The freeze-mix-data creating unit 523 records, on the basis of an operation signal indicating the operation of the input unit 521 by the user in step S403, data indicating a title and an instruction of the object frame in the non-real time metadata file.

After the processing in step S444, the freeze-mix-data creating unit 523 proceeds to step S445. The freeze-mix-data creating unit 523 creates, on the basis of an operation signal indicating the operation of the input unit 521 by the user in step S422, a clip directory and a freeze-mix metadata file of the freeze-mix image in the recorded image directory 252 of the camcorder directory 233 of the camcorder 21 selected by the user. Specifically, the freeze-mix-data creating unit 523 creates a freeze-mix metadata file in the group directory 253 of the recorded image directory 252 and creates a clip directory of the freeze-mix image in the clip root directory 254.

The freeze-mix-data creating unit 523 creates a freeze-mix metadata file on the basis of the grouping metadata file 240 supplied from the reproducing unit 522. The freeze-mix-data creating unit 523 transmits the freeze-mix metadata file and an image file, a master file, a non-real time metadata file, and a real time metadata file of the freeze-mix image to the camcorder 21 as freeze-mix data.

Figure 44:
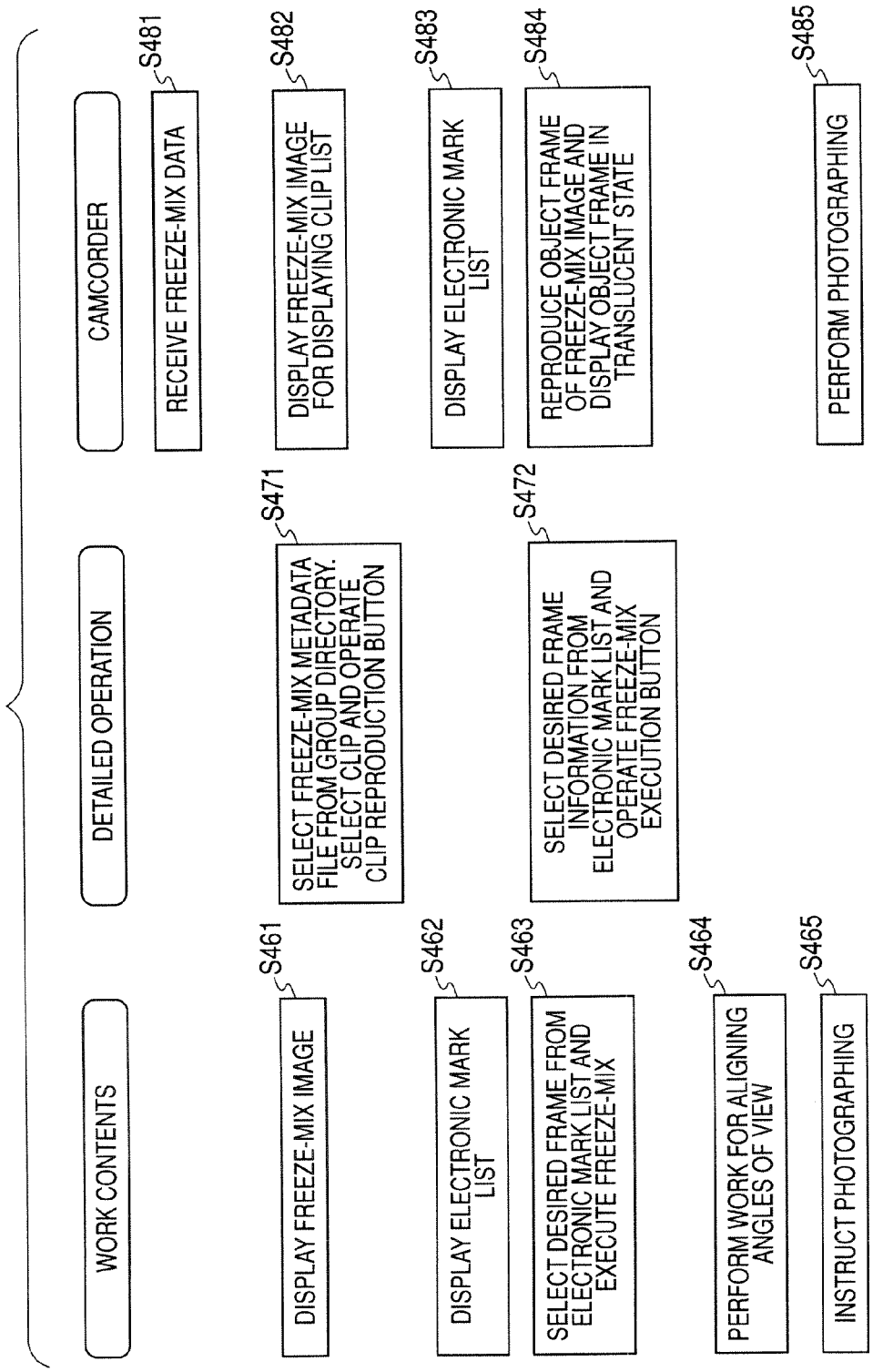
FIG. 44 is a diagram for explaining processing for performing freeze-mix.

Processing for performing freeze-mix will be explained with reference to FIG. 44.

First, a workflow of the user of the camcorder 21 will be explained.

In step S461, the user causes the viewfinder 80 in FIG. 3 to display a freeze-mix image. Specifically, in step S471, the user operates the input unit 503 in FIG. 37 to display the screen (FIG. 39) indicating a directory structure of a file recorded in the removable medium 33 and selects a desired freeze-mix metadata file (F0001M01.txt) from the group directory 215 displayed on the screen. The user operates the input unit 503 while looking at the screen (FIG. 41) displayed in the viewfinder 80 as a result of the operation to select a desired clip in a clip list and operates the reproduce clip button 541.

After the processing in step S461, the user proceeds to step S462. The user operates the input unit 503 to display the electronic-mark-list display section 551. As a result, a screen shown in FIG. 42 is displayed in the viewfinder 80.

After the processing in step S462, the user proceeds to step S463. The user selects a desired frame from an electronic mark list displayed in step S462 as an object frame and executes freeze-mix. Specifically, in step S472, the user operates the input unit 503 to select frame information corresponding to a desired frame from the electronic mark list in FIG. 42 and operates the execute freeze-mix button 551A.

After the processing in step S463, the user proceeds to step S464. The user performs, while looking at the freeze-mix image displayed in the viewfinder 80 according to the execution of freeze-mix, work for aligning an angle of view (a composition) of the freeze-mix image and an angle of view of an image being currently acquired (photographed) by the photographing unit 504. At this point, the user sets camera set values included in metadata of an object frame as camera set values in the current photographing when necessary. This makes it possible to photograph an image having atmosphere closer to that of the object frame of the freeze-mix image.

After the processing in step S464, the user proceeds to step S465. The user operates the input unit 503 and instructs photographing to perform photographing.

Processing by the camcorder 21 will be explained.

Figure 43:
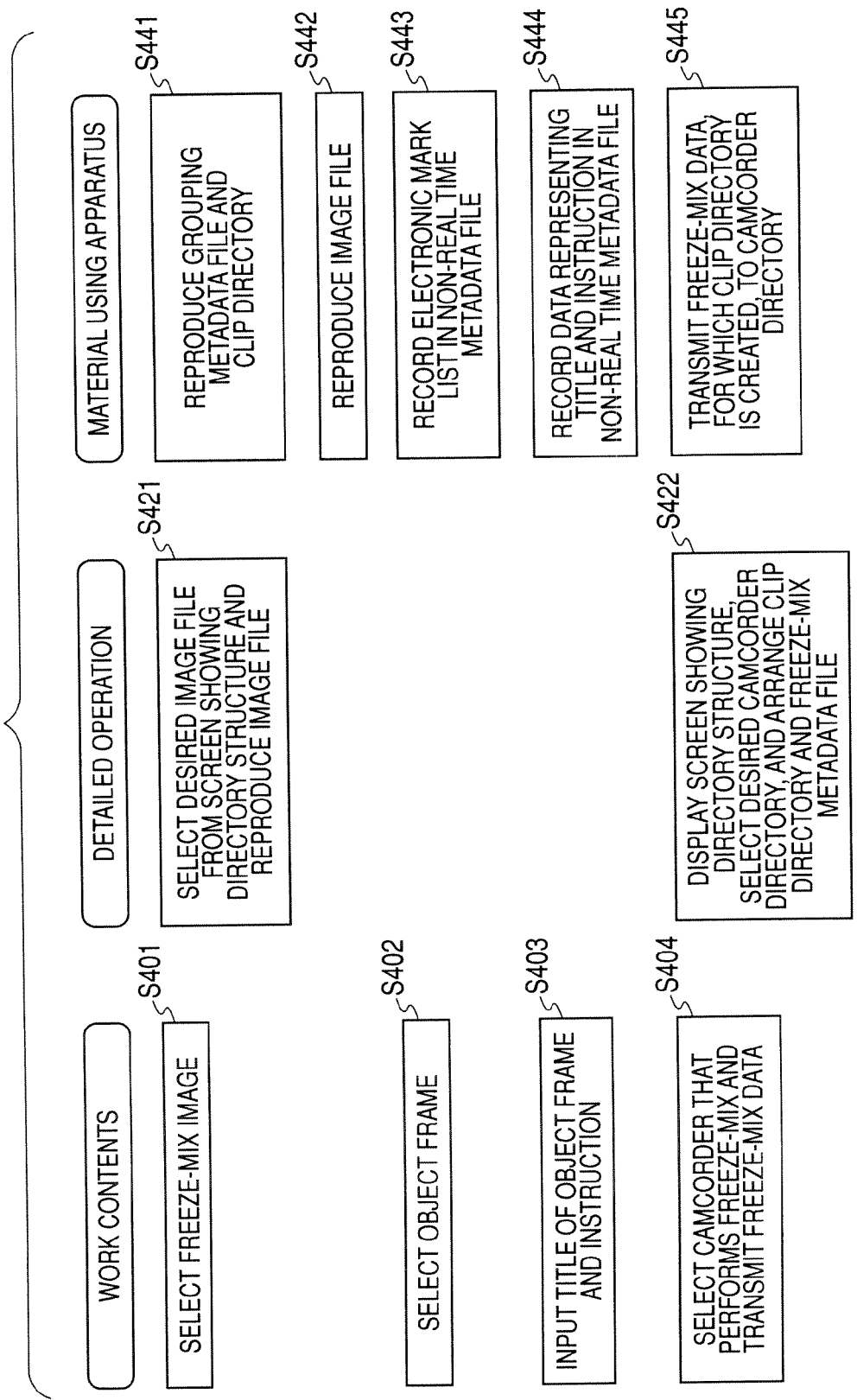
FIG. 43 is a diagram for explaining processing for transmitting freeze-mix data.

In step S481, the acquiring unit 501 receives the freeze-mix data transmitted from the material using apparatus 29 in step S445 in FIG. 43 and supplies the freeze-mix data to the recording and reproducing unit 502. The recording and reproducing unit 502 records the freeze-mix metadata file (F0001M01.txt) in the freeze-mix data from the acquiring unit 501 and records the other files as the clip directory (C0004) in the group directory 215 (FIG. 39).

After the processing in step S481, the recording and reproducing unit 502 proceeds to step S482. The recording and reproducing unit 502 reproduces, on the basis of a designation signal corresponding to the operation of the input unit 503 by the user in step S471, a freeze-mix metadata file of a freeze-mix image designated by the user. The recording and reproducing unit 502 controls the display control unit 505 on the basis of the freeze-mix metadata file to cause the viewfinder 80 to display a clip list. In other words, the recording and reproducing unit 502 displays the screen in FIG. 41.

The recording and reproducing unit 502 displays, on the basis of the designation signal from the input unit 503, the image file (C0004V01.MXF) of the clip directory (C0004) of the freeze-mix image designated by the user.

After the processing in step S482, the recording and reproducing unit 502 proceeds to step S483. The recording and reproducing unit 502 reproduces, on the basis of the designation signal from the input unit 503, the non-real time metadata file (C0004M01.XML) of the clip directory (C0004) of the freeze-mix image designated by the user. The recording and reproducing unit 502 controls the display control unit 505 on the basis of an electronic mark list described in the non-real time metadata file to cause the output unit 207 to display the electronic-mark-list display section 551A in the viewfinder 80. As a result, the screen in FIG. 42 is displayed in the viewfinder 80.

After the processing in step S483, the recording and reproducing unit 502 proceeds to step S484. The recording and reproducing unit 502 reproduces, on the basis of a designation signal corresponding to the operation of the input unit 521 by the user in step S472, image data of the object frame from the image file of the freeze-mix image. The recording and reproducing unit 502 controls the display control unit 505 to cause the viewfinder 80 to display an object frame of a freeze-mix image corresponding to the image data in a translucent state.

After the processing in step S484, the photographing unit proceeds to step S485. The photographing unit 504 performs photographing according to a command for photographing by the user supplied from the input unit 503.

In the explanations of to FIGS. 37 to 44, the user aligns an angle of view of an image being currently acquired and an angle of view of a freeze-mix image. However, the user may align a color temperature of an image being currently acquired and a color temperature of a sample image to acquire an image having a tone close to that of the sample image. In this case, for example, the sample image and the image being currently acquired are displayed in the viewfinder 80 as separate screens. The user compares the sample image and the image being currently acquired and adjusts the color temperatures.

The display control unit 505 may cause the viewfinder 80 to display camera set values and the user may adjust the color temperatures with reference to the camera set values displayed in the viewfinder 80.

As described above, the freeze-mix image is displayed in the viewfinder 80 in a translucent state. Thus, the user aligns, while looking at the freeze-mix image, an angle of view of an image being currently acquired with an angle of view of the freeze-mix image and instructs photographing. In this way, the user can acquire (photograph), using the freeze-mix image as a sample image, an image having atmosphere close to that of the sample image.

Figure 45:
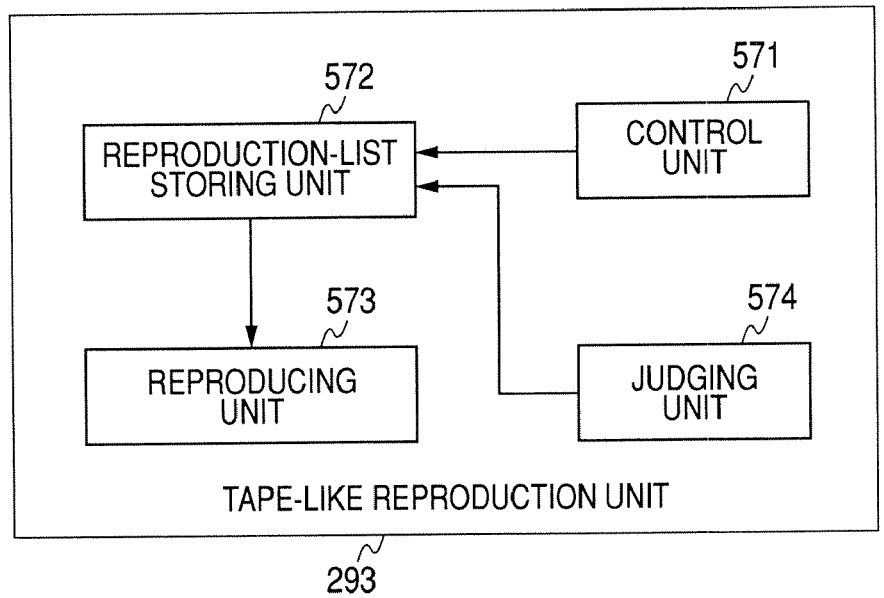
FIG. 45 is a diagram showing an example of a detailed structure of a tape-like reproduction unit.

FIG. 45 is a block diagram showing an example of a detailed structure of the tape-like reproduction unit 293 in FIG. 12.

The tape-like reproduction unit 293 in FIG. 45 includes a control unit 571, a reproduction-list storing unit 572, a reproducing unit 573, and a judging unit 574. The control unit 571, the recording unit 572, the reproduction-list storing unit 572, the reproducing unit 573, and the judging unit 574 correspond to, for example, the microcomputer 106 in FIG. 3.

The control unit 571 detects (judges) whether a new clip is recorded in the removable medium 33 and reads out a UMID of the clip recorded anew from the removable medium 33. The control unit 571 supplies the UMID to the reproduction-list storing unit 572. The reproduction-list storing unit 572 stores a reproduction list, which is a list of a reproduction object clip. The reproduction-list storing unit 572 registers the UMID supplied from the control unit 571 in a reproduction list.

The reproducing unit 573 reads out the reproduction list from the reproduction-list storing unit 572. The reproducing unit 573 reproduces a clip from the removable medium 33 in a tape-like manner on the basis of the reproduction list and outputs an image and sound corresponding to the clip.

The judging unit 574 judges, on the basis of the freeze-mix metadata file (F0001M01.txt) recorded in the removable medium 33, whether the UMID registered in the reproduction list of the reproduction-list storing unit 572 is a UMID of a clip of a freeze-mix image and deletes the UMID of the clip of the freeze-mix image.

The deletion of a UMID performed by the judging unit 574 will be explained with reference to FIGS. 46A and 46B.

Figure 46A:
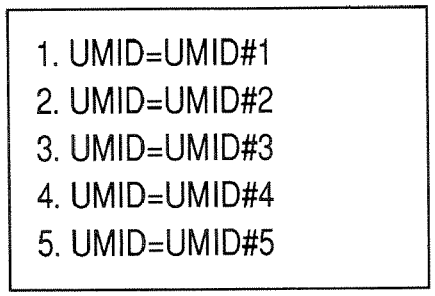
FIG. 46 is a diagram showing an example of a reproduction list.
Figure 46B:
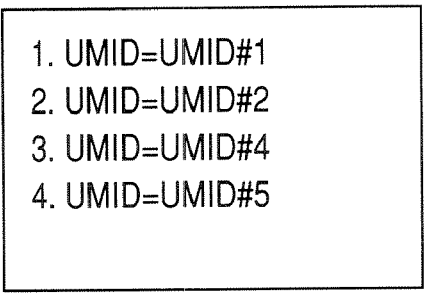

First, it is assumed that a reproduction list shown in FIG. 46A is stored in the reproduction-list storing unit 572. In other words, UMID#1 to UMID#5 are registered in the reproduction list stored in the reproduction-list storing unit 572.

When the judging unit 574 judges that a UMID of the clip of the freeze-mix image is UMID#3 on the basis of the freeze-mix metadata file (F0001M01.txt) recorded in the removable medium 33, the judging unit 574 deletes UMID#3 in the reproduction list in FIG. 46A. As a result, the reproduction list stored in the reproduction-list storing unit 572 changes to a reproduction list shown in FIG. 46B.

Figure 47:
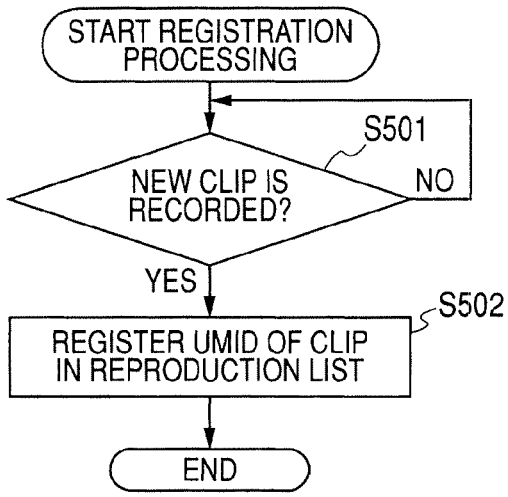
FIG. 47 is a flowchart for explaining registration processing.

Registration processing in which the tape-like reproduction unit 293 registers a UMID in the reproduction list will be explained with reference to FIG. 47.

In step S501, the control unit 571 judges whether a new clip has been recorded in the removable medium 33. When it is judged that a new clip has not been recorded, the control unit 571 stands by until it is judged that a new clip has been recorded.

On the other hand, when it is judged in step S501 that a new clip has been recorded, the control unit 571 supplies a UMID of the clip to the reproduction-list storing unit 572 and proceeds to step S502. In step S502, the reproduction-list storing unit 572 registers the UMID of the clip supplied from the control unit 571 in the reproduction list and completes the processing.

Figure 48:
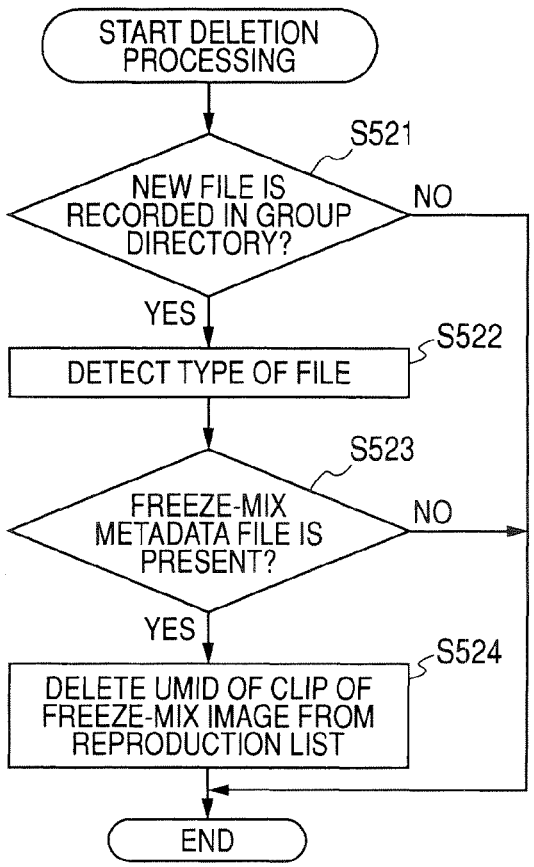
FIG. 48 is a flowchart for explaining deletion processing.

FIG. 48 is a flowchart for explaining deletion processing in which the tape-like reproduction unit 293 in FIG. 45 deletes a UMID from the reproduction list. This deletion processing is started when, for example, a new UMID is registered in the reproduction list in step S502 in FIG. 47.

In step S521, the judging unit 574 judges whether a new file has been recorded in the group directory 215 (FIG. 39) of the removable medium 33. When it is judged that a new file has not been recorded, the judging unit 574 completes the processing.

On the other hand, when it is judged in step S521 that a new file has been recorded in the group directory 215 of the removable medium 33, the judging unit 574 proceeds to step S522. The judging unit 574 detects a type of the file (a freeze-mix metadata file or a grouping metadata file) and proceeds to step S523.

In step S523, the judging unit 574 judges, on the basis of the type detected in step S522, whether there is a freeze-mix metadata file in the file recorded in the group directory 215 anew. When it is judged that there is no freeze-mix metadata file, the judging unit 574 completes the processing.

On the other hand, when it is judged in step S523 that there is a freeze-mix metadata file, the judging unit 574 proceeds to step S524. The judging unit 574 detects a UMID of the clip of the freeze-mix image on the basis of the freeze-mix metadata file and deletes the UMID from the reproduction list of the reproduction-list storing unit 572.

Communication between the camcorder 21 and the material using apparatus 29 will be explained with reference to FIGS. 49 to 51.

Figure 49:
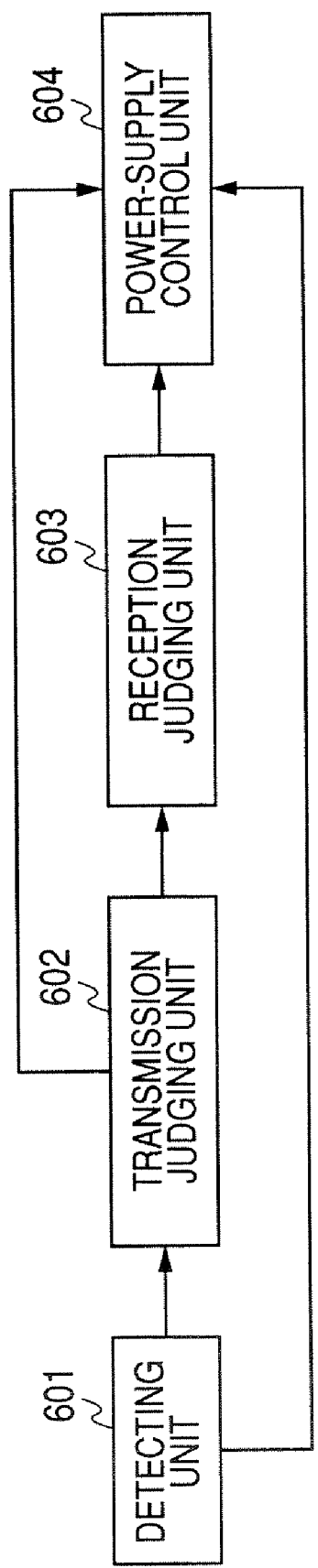
FIG. 49 is a block diagram showing an example of constitutions of functions for performing communication with the material using apparatus.

FIG. 49 is a block diagram showing an example of constitutions of functions of the camcorder 21 for performing communication with the material using apparatus 29. FIG. 49 shows all or a part of constitutions of functions of the transmitting unit 306 (400) and the receiving unit 307 of the camcorder-information transmitting unit 291 in FIG. 12 and the acquiring unit 501 in FIG. 37.

The camcorder 21 in FIG. 49 includes a detecting unit 601, a transmission judging unit 602, a reception judging unit 603, and a power-supply control unit 604. The detecting unit 601, the transmission judging unit 602, the reception judging unit 603, and the power-supply control unit 604 correspond to, for example, the microcomputer 134 in FIG. 3.

The detecting unit 601 detects the access point 23 and supplies a result of the detection to the transmission judging unit 602. The transmission judging unit 602 transmits, according to the detection result from the detecting unit 601, data that should be transmitted (e.g., state information and respective data of a clip) to the material using apparatus 29. The transmission judging unit 602 notifies the power-supply control unit 604 that there is the data that should be transmitted and notifies the reception judging unit 603 that the transmission is completed or there is no data that should be transmitted.

The reception judging unit 603 receives, according to the notification from the transmission judging unit 602, data (e.g., freeze-mix data) transmitted from the material using apparatus 29. The reception judging unit 603 notifies the power-supply control unit 604 that there is data to be transmitted from the material using apparatus 29 and that the reception is completed or there is no data to be transmitted from the material using apparatus 29.

The power-supply control unit 604 generates, according to the detection result from the detecting unit 601 or the notification from the transmission judging unit 602 or the reception judging unit 603, a power supply control signal for controlling supply of power to the recorder block 52 and supplies the power supply control signal to the power supply block 54.

Power supply control processing in which the camcorder 21 supplies power to the recorder block 52 will be explained with reference to FIG. 50. This power supply control processing is started when, for example, the power supply for the camcorder 21 is turned on, that is, when power is supplied to the power supply unit 151.

In step S601, the detecting unit 601 detects the access point 23 in FIG. 1, supplies a result of the detection to the transmission judging unit 602, and proceeds to step S602. In step S602, the detecting unit 601 judges whether the access point 23 has been successfully detected and supplies a result of the detection to the transmission judging unit 602. When it is judged in step S602 that the access point 23 has not been successfully detected, the detecting unit 601 stands by until the access point 23 is successfully detected.

On the other hand, when it is judged in step S602 that the access point 23 has been successfully detected, the transmission judging unit 602 proceeds to step S603. The transmission judging unit 602 starts connection to the network 31 via the access point 23 and proceeds to step S604.

In step S604, the transmission judging unit 602 requests the material using apparatus 29 to start communication and proceeds to step S605.

In step S605, the transmission judging unit 602 judges whether there is data that should be transmitted. When it is judged that there is data that should be transmitted, the transmission judging unit 602 proceeds to step S606.

In step S606, the power-supply control unit 604 generates a power supply control signal for turning on the power supply for the recorder block 52, supplies the power supply control signal to the power supply block 54 to turn on the power supply for the recorder block 52, and proceeds to step S607. In step S607, the transmission judging unit 602 notifies the material using apparatus 29 that there is the data that should be transmitted and proceeds to step S608.

In step S608, the transmission judging unit 602 transmits the data that should be transmitted to the material using apparatus 29 and proceeds to step S609. In step S609, the transmission judging unit 602 judges whether transmission of all data that should be transmitted has been completed. When it is judged that the transmission of all the data that should be transmitted has not been completed, the transmission judging unit 602 returns to step S608 and repeats the processing described above.

When it is judged in step S609 that the transmission of all the data that should be transmitted has been completed, the reception judging unit 603 proceeds to step S610. The reception judging unit 603 judges whether there is data to be received, that is, data to be transmitted from the material using apparatus 29. When it is judged in step S610 that there is no data to be received, the power-supply control unit 604 proceeds to step S611. The power-supply control unit 604 generates a power supply signal for turning off the power supply for the recorder block 52, supplies the power supply control signal to the power supply block 54 to turn off the power supply for the recorder block 52, and completes the processing.

On the other hand, when it is judged in step S605 that there is no data that should be transmitted, the transmission judging unit 602 proceeds to step S612. The transmission judging unit 602 notifies the material using apparatus 29 that there is no data that should be transmitted and proceeds to step S613.

In step S613, the reception judging unit 603 judges whether there is data to be received, that is, whether there is data to be transmitted from the material using apparatus 29. When it is judged that there is data to be received, the reception judging unit 603 proceeds to step S614.

In step S614, the power-supply control unit 604 turns on the power supply for the recorder block 52 and proceeds to step S615. In step S615, the reception judging unit 603 receives data transmitted from the material using apparatus 29 and proceeds to step S616.

In step S616, the reception judging unit 603 judges whether reception of all data transmitted from the material using apparatus 29 has been completed. When it is judged that the reception of all the data has not been completed, the reception judging unit 603 returns to step S615 and repeats the processing described above.

On the other hand, when it is judged in step S616 that the reception of the data transmitted from the material using apparatus 29 has been completed, the reception judging unit 603 proceeds to step S611. As described above, the power-supply control unit 604 turns off the power supply for the recorder block 52 and completes the processing.

When it is judged in step S610 that there is data to be received, the reception judging unit 603 proceeds to step S615 and performs the processing described above.

Moreover, when it is judged in step S613 that there is no data to be received, the reception judging unit 603 skips steps S614 to S616, proceeds to step S611, and performs the processing described above.

As described above, in the camcorder 21, when the access point 23 is detected, the power supply for the recorder block 52 is kept on while data is transmitted or received.

In the camcorder 21, when the access point 23 is not detected, that is, when it is difficult to perform communication via the network 31, the power supply for the recorder block 52, which reproduces or records data such as a clip to be a transmission or reception object. Thus, it is possible to reduce power consumption of the camcorder 21.

When the access point 23 has been successfully detected, the camcorder 21 automatically starts connection to the network 31. Thus, the user does not need to instruct start of connection to the network 31. It is possible to save time and labor for the user.

In the above explanation, the power supply for the recorder block 52, that is, power supplied to all the units constituting the recorder block 52 is turned on. However, power supplied only to the units used for recording and reproduction in the recorder block 52 may be turned on. In this case, when there is data that should be transmitted, power supplied only to the units used for reproduction is turned on. When there is data to be received, power supplied only to the units used for recording is turned on.

Communication processing in which the material using apparatus 29 performs communication with the camcorder 21 will be explained with reference to FIG. 51. This communication processing is performed in the state acquiring unit 321, the data acquiring unit 324, and the control unit 328 of the camcorder-information managing unit 311 and the transmitting unit 524 of the freeze-mix transmitting unit 312 in FIG. 14. However, in FIG. 51, for convenience of explanation, it is assumed that the communication processing is performed in the state acquiring unit 321.

Figure 50:
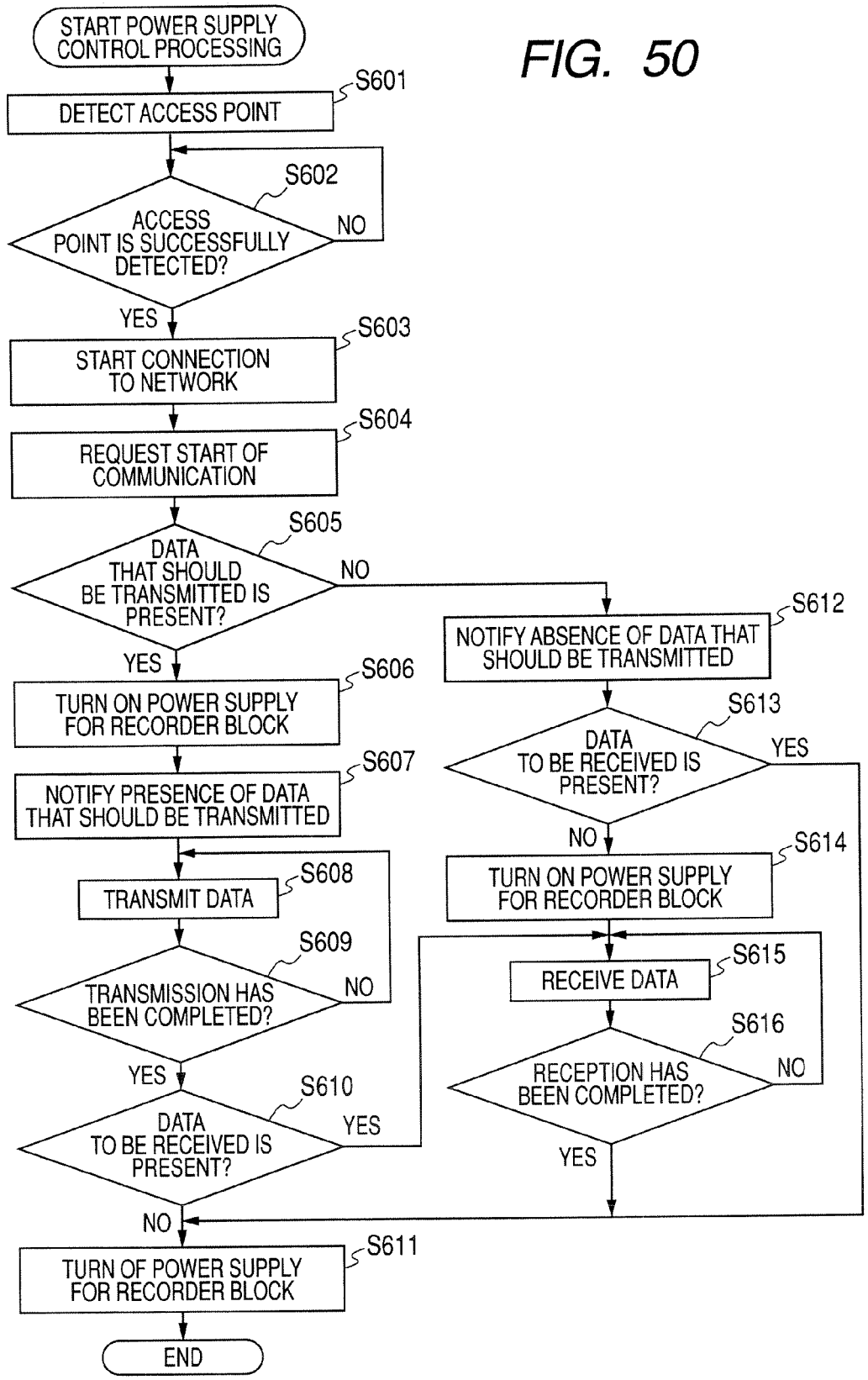
FIG. 50 is a flowchart for explaining power supply control processing.

In step S651, the state acquiring unit 321 judges whether the transmission judging unit 602 is requested to start communication in step S604 in FIG. 50. When it is judged that the start of communication is not requested, the state acquiring unit 321 stands by until start of communication is requested.

On the other hand when it is judged in step S651 that start of communication is requested, the state acquiring unit 321 proceeds to step S652. The state acquiring unit 321 starts communication with the camcorder 21 and proceeds to step S653.

In step S653, the state acquiring unit 321 judges whether there is data to be received, that is, whether it is notified by the transmission judging unit 602 in step S607 in FIG. 50 that there is data that should be transmitted. When it is judged in step S653 that there is data to be received, the state acquiring unit 321 proceeds to step S654. The state acquiring unit 321 receives the data transmitted from the transmission judging unit 602.

After the processing in step S654, the state acquiring unit 321 proceeds to step S655. The state acquiring unit 321 judges whether reception of all data transmitted from the transmission judging unit 602 has been completed. When it is judged that the reception has not been completed, the state acquiring unit 321 returns to step S654 and repeats the processing described above.

On the other hand, when it is judged in step S655 that the reception has been completed, the state acquiring unit 321 proceeds to step S656. The state acquiring unit 321 judges whether there is data that should be transmitted to the camcorder 21. When it is judged that there is no data that should be transmitted, the state acquiring unit 321 proceeds to step S657.

In step S657, the state acquiring unit 321 notifies the camcorder 21 that there is no data that should be transmitted and completes the processing.

When it is judged in step S653 that there is no data to be received, in step S658, as in step S656, the state acquiring unit 321 judges whether there is data that should be transmitted to the camcorder 21. When it is judged that there is data that should be transmitted, the state acquiring unit 321 proceeds to step S659.

In step S659, the state acquiring unit 321 notifies the camcorder 21 that there is data that should be transmitted. When the camcorder 21 is notified that there is data that should be transmitted in this way, it is judged in step S610 or S613 in FIG. 50 that there is data to be received. After the processing in step S659, the state acquiring unit 321 proceeds to step S660. The state acquiring unit 321 transmits the data that should be transmitted to the camcorder 21 and proceeds to step S661. In step S661, the state acquiring unit 321 judges whether transmission of all data that should be transmitted has been completed. When it is judged that the transmission has not been completed, the state acquiring unit 321 returns to step S660 and repeats the processing described above.

On the other hand, when it is judged in step S661 that the transmission has been completed, the processing is completed. When it is judged in step S658 that there is no data that should be transmitted, the state acquiring unit 321 proceeds to step S662. As in step S657, the state acquiring unit 321 notifies that there is no data that should be transmitted. When it is notified in step S657 or S662 that there is no data that should be transmitted as described above, it is judged in step S610 or S613 in FIG. 50 that there is no data to be received.

When it is judged in step S656 that there is data that should be transmitted, the state acquiring unit 321 proceeds to step S659 and performs the processing described above.

Figure 51:
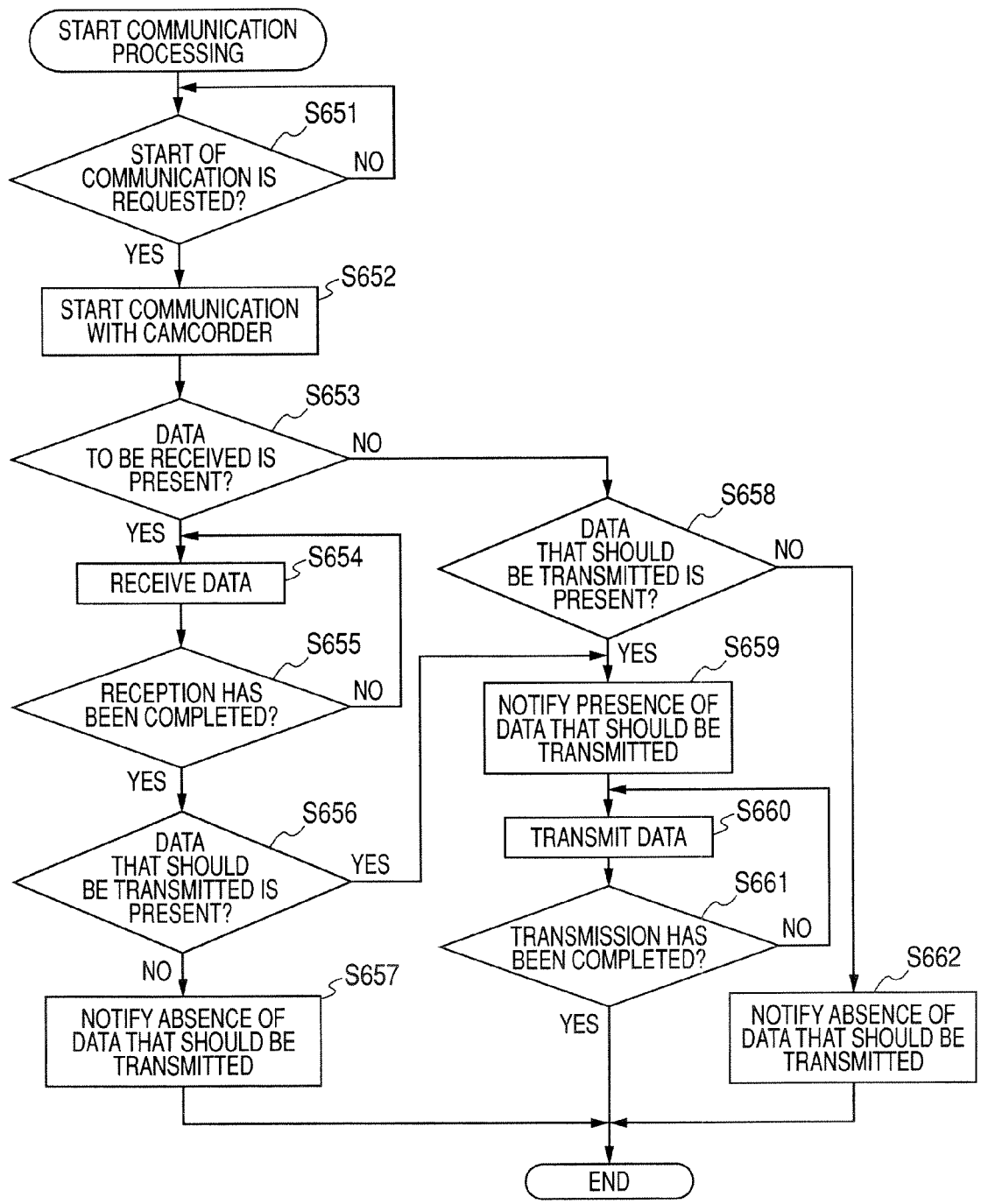
FIG. 51 is a flowchart for explaining communication processing.

In the explanations of FIGS. 49 to 51, when the detecting unit 601 detects the access point 23, the transmission judging unit 602 automatically starts connection to the network 31. However, connection to the network 31 may be started manually. In other words, it is also possible that, when the camcorder 21 detects the access point 23, the camcorder 21 notifies the user that an access point is detected using the LCD 112 or the like in FIG. 3 and, when the user having received the notification instructs start of connection to the network 31, the camcorder 21 starts connection to the network 31.

The user may choose whether connection to the network 31 is started automatically or manually.

In the above explanation, the item "transmission history" is provided in the grouping metadata in FIG. 6. However, the item "transmission history" does not have to be provided. In this case, for example, the transmitting unit 306 (400) records data indicating that a clip has been transmitted in the non-real time metadata file (C0001M01.XML) of the clip transmitted or changes an instance number of a UMID of the clip transmitted.

An item "FTP site URL" in which a URL of an FTP site is described may be provided in the item "transmission destination" (FIG. 6) of the detail of the grouping metadata instead of the item "website URL".

As described above, in the material using apparatus 29, the state acquiring unit 321 acquires state information from the camcorder 21 on a real time basis, the data acquiring unit 324 acquires respective data of a clip recorded in the camcorder 21, the data recording unit 325 records the data in the accumulation directory 236, and the display control unit 326 present the state information on a real time basis. Thus it is possible to acquire and record data obtained as a result of being photographed by other apparatuses and present states of the other apparatuses on a real time basis.

In this specification, the step of describing a computer program stored in a program recording medium includes not only processing performed in time series according to an order described but also processing executed in parallel or individually, although not always processed in time series.

In this specification, the system indicates an entire apparatus including plural apparatuses.

Embodiments of the invention are not limited to the embodiment described above. Various modifications of the invention are possible without departing from the spirit of the invention.

As described above, according to an embodiment of the invention, it is possible to acquire and record data obtained as a result of being photographed by other apparatuses.

According to another embodiment of the invention, it is possible to acquire and record data obtained as a result of being photographed by other apparatuses and present states of other apparatuses on a real time basis.

It should be understood by those skilled in the art that various modifications, combinations, sub-combinations, and alterations may occur depending on design requirements and the other factors insofar as they are within the scope of the appended claims or the equivalents thereof.

What is claimed is:

1. An information processing apparatus that acquires, from a photographing apparatus that photographs a subject and records image data obtained as a result of the photographing on a storage medium, state information indicating a present state of the photographing apparatus, the information processing apparatus comprising:
   a state acquiring unit configured to acquire real-time state information from the photographing apparatus on a real time basis, wherein the real-time state information includes information indicating a present operation state of the photographing apparatus and at least one setting value used by the photographing apparatus to record the image data;
   a data acquiring unit configured to acquire image data previously recorded on the storage medium in the photographing apparatus, non-real-time state information including information indicating an operation state of the photographing apparatus at a time of recording the stored image data and at least one setting value used by the photographing apparatus to record the stored image data, and grouping metadata associated with a plurality of data segments included in the image data previously recorded on the storage medium;
   a recording control unit configured to cause an accumulating unit configured to accumulate the image data, the corresponding non-real-time state information, and the grouping metadata acquired by the data acquiring unit to record the image data, the corresponding non-real-time state information, and the grouping metadata; and
   a display unit configured to display the real-time state information acquired by the state acquiring unit on a real time basis.

2. An information processing apparatus according to claim 1, wherein the recording control unit further causes a recording unit configured to temporarily store the image data to record a copy of the image data recorded by the accumulating unit.

3. An information processing apparatus according to claim 2, further comprising:
    a deleting unit configured to delete image data, which is deleted from the photographing apparatus, from the recording unit.

4. An information processing apparatus according to claim 1,
    wherein the photographing apparatus setting value is one of a white balance, a gain, a filter, an aperture, a shutter speed, a zoom, or a focus of the photographing apparatus.

5. An information processing apparatus according to claim 1, wherein the state acquiring unit is further configured to acquire, from the photographing apparatus, directory information, thumbnail image data of recorded image data, and thumbnail image data of image data being currently recorded by the photographing apparatus.

6. An information processing application according to claim 1, wherein the grouping metadata includes at least one of a group title, a recording ID, a classification, a group creation date and time, a transmission destination, a photographing date and time, a photographing place, a photographer, and photographing contents.

7. An information processing application according to claim 1, wherein the data acquiring unit acquires the grouping metadata prior to acquiring the non-real time state information and acquires the non-real time state information prior to acquiring the image data previously recovered on the storage medium.

8. An information processing method for an information processing apparatus that acquires, from a photographing apparatus that photographs a subject and records image data obtained as a result of the photographing on a storage medium, state information indicating a present state of the photographing apparatus, the information processing method comprising:
    acquiring, at the information processing apparatus, real-time state information from the photographing apparatus on a real time basis, wherein the real-time state information includes information indicating a present operation state of the photographing apparatus and at least one setting value used by the photographing apparatus to record the image data;
    acquiring, at the information processing apparatus, image data previously recorded on the storage medium in the photographing apparatus non-real-time state information including information indicating an operation state of the photographing apparatus at a time of recording the stored image data and at least one setting value used by the photographing apparatus to record the stored image data, and grouping metadata associated with a plurality of data segments included in the image data previously recorded on the storage medium;
    causing, at the information processing apparatus, an accumulating unit configured to accumulate the image data, the corresponding non-real-time state information, and the grouping metadata acquired to record the image data, the corresponding non-real-time state information, and grouping metadata; and
    displaying, at the information processing apparatus, the real-time state information acquired on a real time basis.

9. A non-transitory computer readable storage medium including computer executable instructions for acquiring, from a photographing apparatus that photographs a subject and records image data obtained as a result of the photographing on a storage medium, state information indicating a present state of the photographing apparatus, where the instructions, when executed by a processor, cause the processor to perform a method comprising:
    acquiring real-time state information from the photographing apparatus on a real time basis, wherein the real-time state information includes information indicating a present operation state of the photographing apparatus and at least one setting value used by the photographing apparatus to record the image data;
    acquiring image data previously recorded on the storage medium in the photographing apparatus, non-real-time state information including information indicating an operation state of the photographing apparatus at a time of recording the stored image data and at least one setting value used by the photographing apparatus to record the stored image data, and grouping metadata associated with a plurality of data segments included in the image data previously recorded on the storage medium;
    causing an accumulating unit configured to accumulate the image data, the corresponding non-real-time state information, and the grouping metadata acquired to record the image data, the corresponding non-real-time state information, and the grouping metadata; and
    displaying the real-time state information acquired on a real time basis.

* * * * *